US010484328B2

(12) United States Patent
Kimura et al.

(10) Patent No.: US 10,484,328 B2
(45) Date of Patent: Nov. 19, 2019

(54) MESSAGE-BROWSING SYSTEM, SERVER, TERMINAL DEVICE, CONTROL METHOD, AND RECORDING MEDIUM

(71) Applicant: KONAMI DIGITAL ENTERTAINMENT CO., LTD., Tokyo (JP)

(72) Inventors: Koki Kimura, Tokyo (JP); Erika Nakamura, Tokyo (JP); Takashi Suenaga, Tokyo (JP); Takashi Hamano, Tokyo (JP); Wataru Ito, Tokyo (JP); Fumiaki Oshita, Tokyo (JP)

(73) Assignee: KONAMI DIGITAL ENTERTAINMENT CO., LTD., Minato-ku, Tokyo (JP)

( * ) Notice: Subject to any disclaimer, the term of this patent is extended or adjusted under 35 U.S.C. 154(b) by 822 days.

(21) Appl. No.: 14/581,402

(22) Filed: Dec. 23, 2014

(65) Prior Publication Data

US 2015/0113084 A1 Apr. 23, 2015

Related U.S. Application Data

(63) Continuation of application No. PCT/JP2013/058392, filed on Mar. 22, 2013.

(30) Foreign Application Priority Data

| Jun. 25, 2012 | (JP) | 2012-141816 |
| Mar. 15, 2013 | (JP) | 2013-052836 |
| Mar. 15, 2013 | (JP) | 2013-052837 |

(51) Int. Cl.
  *G06F 15/16* (2006.01)
  *H04L 12/58* (2006.01)
  (Continued)

(52) U.S. Cl.
  CPC ............ *H04L 51/32* (2013.01); *G06F 3/0486* (2013.01); *G06F 3/04817* (2013.01);
  (Continued)

(58) Field of Classification Search
  CPC ..... H04L 51/32; H04L 51/16; G06F 3/04817; G06F 3/04883; G06F 3/0486; G06Q 10/107
  See application file for complete search history.

(56) References Cited

U.S. PATENT DOCUMENTS

| 8,954,849 B2 | 2/2015 | Doi et al. |
| 2002/0109719 A1 | 8/2002 | Hata et al. |

(Continued)

FOREIGN PATENT DOCUMENTS

| JP | 2000-132509 A | 5/2000 |
| JP | 2002-190034 A | 7/2002 |

(Continued)

OTHER PUBLICATIONS

Hirano, Aya. "mixi Facebook Twitter—It's Now to Get to Know Them—an SNS Guide: Domestically the Largest, mixi Has Come to Represent Japanese SNSs." Nikkei Pasokon, Nikkei BP, Japan Jan. 24, 2011, No. 618, pp. 48-49. 8 pages total.

(Continued)

*Primary Examiner* — Suraj M Joshi
*Assistant Examiner* — Jaren Means
(74) *Attorney, Agent, or Firm* — Sughrue Mion, PLLC

(57) ABSTRACT

A browsing service of messages exchanged through posts and responses to the posts among multiple users is provided in a message-browsing system. A terminal device includes an assigning unit assigning user images corresponding to multiple specific users who are a subset or all of the multiple users to respective ones of a number of reference positions that is equal to the number of the user images on a screen according to a predetermined rule, a position determining unit determining the reference positions assigned to the user images corresponding to the multiple specific users as display positions displaying the respective user images, and (Continued)

a position changing unit changing a display position of a user image corresponding to a user responding to a post another user has contributed to a position close to a user image corresponding to another user who has contributed the post.

20 Claims, 54 Drawing Sheets

(51) Int. Cl.
  *G06F 3/0486* (2013.01)
  *G06Q 10/10* (2012.01)
  *G06F 3/0488* (2013.01)
  *G06F 3/0481* (2013.01)

(52) U.S. Cl.
  CPC ....... *G06F 3/04883* (2013.01); *G06Q 10/107* (2013.01); *H04L 51/16* (2013.01)

(56) References Cited

U.S. PATENT DOCUMENTS

| | | | |
|---|---|---|---|
| 2005/0081163 A1 | 4/2005 | McLennan et al. | |
| 2008/0171573 A1 | 7/2008 | Eom et al. | |
| 2009/0138943 A1 | 5/2009 | Kawanaka | |
| 2009/0158175 A1 | 6/2009 | Doi et al. | |
| 2011/0173553 A1* | 7/2011 | Karmon | G06Q 10/107 715/767 |
| 2012/0011453 A1* | 1/2012 | Shimono | G06Q 10/107 715/753 |
| 2013/0159919 A1 | 6/2013 | Leydon | |

FOREIGN PATENT DOCUMENTS

| | | |
|---|---|---|
| JP | 2005-276103 A | 10/2005 |
| JP | 2007-13622 A | 1/2007 |
| JP | 2008-242693 A | 10/2008 |
| JP | 2009-129154 A | 6/2009 |
| JP | 2009-146041 A | 7/2009 |
| JP | 2010-009445 A | 1/2010 |
| JP | 2010-009512 A | 1/2010 |
| JP | 2010-113703 A | 5/2010 |
| JP | 2012-18569 A | 1/2012 |
| JP | 2012-64166 A | 3/2012 |
| JP | 2012-109795 A | 6/2012 |

OTHER PUBLICATIONS

Notice of Reasons for Rejection of JP 2013-052837 dated Nov. 11, 2014.
Notification of Reasons for Rejection of JP 2013-052836 dated Nov. 18, 2014.
International Search Report of PCT/JP2013/058392 dated Apr. 16, 2013.
Notification of Reason for Refusal dated Nov. 5, 2015, issued by the Korean Intellectual Property Office in counterpart application No. 10-2015-7001622.
Notification of Reasons for Refusal dated Apr. 7, 2015 issued by the Japanese Patent Office in application No. 2013-052836.
Decision of Refusal dated Jun. 23, 2015, issued by the Japanese Patent Office in application No. 2013-052836.
Notification of Reason for Refusal dated Nov. 6, 2015, issued by the Korean Intellectual Property Office in counterpart application No. 10-2015-7001621.
International Search Report with Written Opinion dated Apr. 16, 2013, issued by the International Bureau in International Application No. PCT/JP2013/058393.
Notification of Reasons for Refusal dated Jan. 6, 2015, issued by the Japanese Patent Office in application No. 2013-052838.
Notification of Reasons for Refusal dated Feb. 24, 2015, issued by the Japanese Patent Office in application No. 2013-052839.
Notification of Reasons for Refusal dated Aug. 11, 2015, issued by the Japanese Patent Office in application No. 2013-052839.
Notice of Final Rejection dated Apr. 21, 2016, issued by the Korean Intellectual Property Office in counterpart application No. 10-2015-7001583.
International Search Report with Written Opinion dated May 28, 2013, issued by the International Bureau in International Application No. PCT/JP2013/058394.
Notification of Reasons for Refusal dated Jun. 2, 2015, issued by the Japanese Patent Office in application No. 2013-052840.
Notification of Reasons for Refusal dated Mar. 31, 2015, issued by the Japanese Patent Office in application No. 2013-052841.
Decision of Refusal dated Nov. 10, 2015, issued by the Japanese Patent Office in application No. 2013-052841.
Notification of Reason for Refusal dated Oct. 2, 2015, issued by the Korean Intellectual Property Office in counterpart application No. 10-2015-7001583.
Communication dated Mar. 10, 2017, issued by the United States Patent and Trademark Office in U.S. Appl. No. 14/582,558.
Communication dated Feb. 21, 2017, issued by the United States Patent and Trademark Office in U.S. Appl. No. 14/582,711.
Communication dated Jan. 26, 2018 from the United States Patent and Trademark Office in counterpart U.S. Appl. No. 14/582,558.
Notice of Allowance dated Oct. 25, 2017 issued by United States Patent and Trademark Office in U.S. Appl. No. 14/582,711.
Bailenson et al, "Virtual Reality and Social Networks Will Be a Powerful Combination", Stanford University, Jun. 2011, https://vhil.stanford.edu/mm/2011/bailenson-ieee-vr-social.pdf.

* cited by examiner

FIG.5

<User registration table>

| Member ID | User ID |
|---|---|
| d4u6esA346 | 1 |
| f7p8asK128 | 2 |
| qWrt8tf651 | 3 |
| ·········· | 4 |
| ⋮ | ⋮ |

FIG.6

<Group table>

| (Main person) User ID | Group ID | Group name | Friend a | Friend b | Friend c | Friend d | Friend e | Friend f | Friend g | Friend h | Friend i |
|---|---|---|---|---|---|---|---|---|---|---|---|
| 1 | 1 | Team A | ????? | ????? | ????? | ????? | ????? | ????? | ????? | ????? | ????? |
| 1 | 2 | 87Pro | ????? | ????? | ????? | ????? | ????? | ????? | ????? | ????? | |
| 2 | 1 | Yanagi | ????? | ????? | ????? | ????? | ????? | ????? | | | |
| ...... | ...... | ...... | ...... | ...... | ...... | ...... | ...... | ...... | ...... | ...... | ...... |

(Friends around main person)

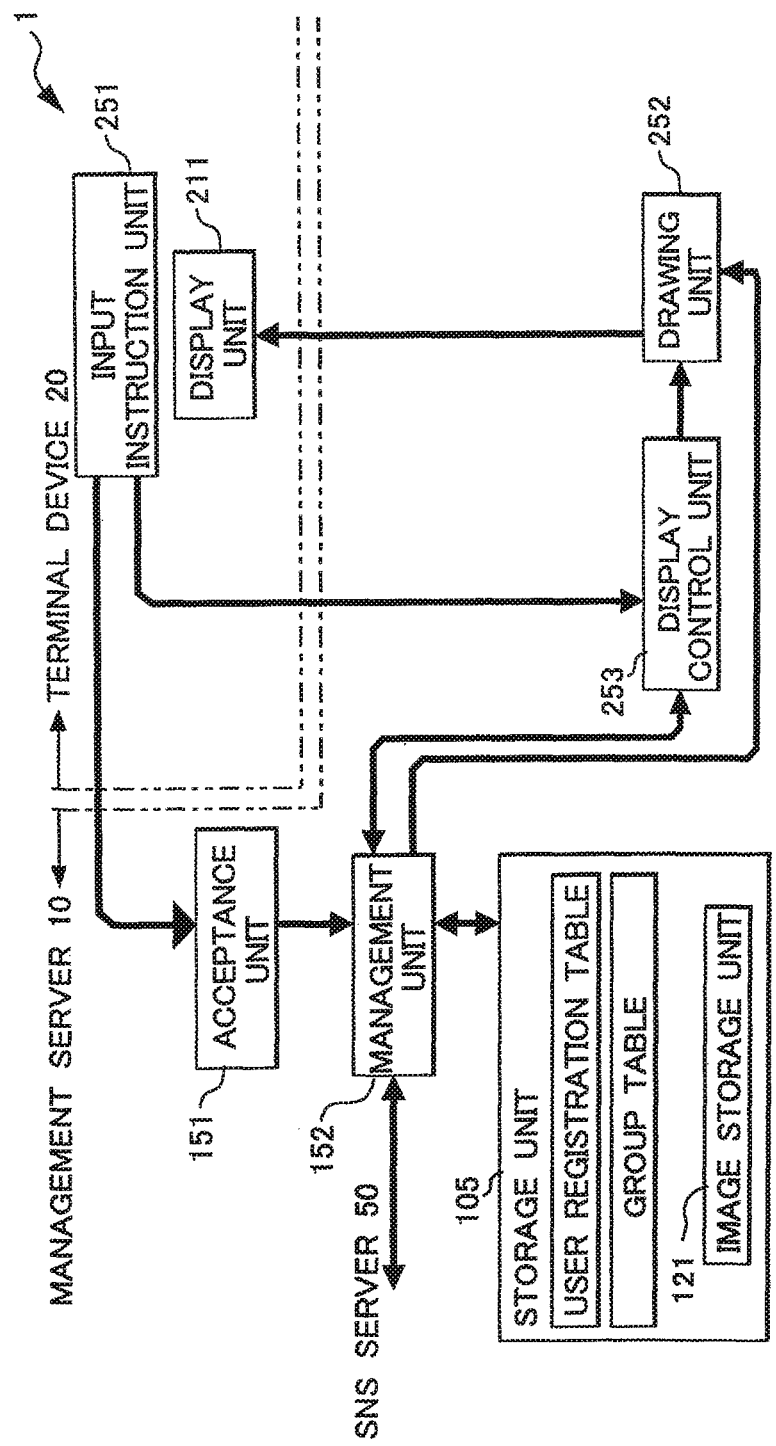

FIG.15

<Intimacy level table>

| Reference user ID | Target user ID | Intimacy level | Last update time (date hr. min. sec.) |
|---|---|---|---|
| 1 | 2 | 22 | 2011-11-18 14:25:50 |
| 1 | 3 | 10 | 2011-11-12 10:36:25 |
| ⋮ | ⋮ | ⋮ | ⋮ |
| 2 | 1 | 2 | 2011-10-31 19:44:09 |
| 2 | 3 | 8 | 2011-11-07 09:18:12 |
| ⋮ | ⋮ | ⋮ | ⋮ |
| 3 | 1 | 12 | 2011-11-15 20:07:30 |
| 3 | 2 | 9 | 2011-11-10 08:59:45 |
| ⋮ | ⋮ | ⋮ | ⋮ |

FIG.16

<Increase-level condition>

(1) When a friend provides a response to a post of a contributor in a form of a comment, the intimacy level in the direction from the contributor (reference user) to the friend (target user) is increased by a value of "5".

(2) When a friend provides a response to a post of a contributor in a form except for a comment, the intimacy level in the direction from the contributor (reference user) to the friend (target user) is increased by a value of "3".

(3) When a friend provides a response to a post of a contributor in a form of a comment, and the contributor provides a response to the friend's response, the intimacy level in the direction from the contributor (reference user) to the friend (target user) is increased by a value of "3".

(4) When a friend provides a response to a post of a contributor in a form except for a comment, and the contributor provides a response to the friend 's response, the intimacy level in the direction from the contributor (reference user) to the friend (target user) is increased by a value of "2".

(5) In (3), (4), when the contributor provides a response again, the intimacy level in the direction from the contributor (reference user) to the friend (target user) is increased by a value of "1".

<Decrease-level condition>

(6) The intimacy levels for all users are decreased by a value of "1" upon lapse of every day.

(7) When a friend does not provide a response to a post by another friend within a certain period of time, the intimacy level in the direction from the friend (reference user) to the other friend (target user) is decreased by a value of "3".

The Stage of changing avator positions

Slight modification of avator positions

Display avatars

FIG.28

⟨Assignment of reference positions of friends (fixed)⟩
Friend a ⟶ Reference position C1
Friend b ⟶ Reference position C2
Friend c ⟶ Reference position C3
Friend d ⟶ Reference position C4
Friend e ⟶ Reference position C5
Friend f ⟶ Reference position C6
Friend g ⟶ Reference position C7
Friend h ⟶ Reference position C8
Friend i ⟶ Reference position C9

FIG.33

<List of motions>

| | | | | | |
|---|---|---|---|---|---|
| In a case in which there is a post | When a feeling keyword can be extracted ▶ | Emotional expression motion | Delight | | |
| | | | Pleasure | | |
| | | | Anger | | |
| | | | Sadness | | |
| | | | Doubt | | |
| | | | Impatience | | |
| | When a feeling keyword cannot be extracted or When a feeling keyword is not extracted ▶ | Posting motion | Mumbling | | |
| | | | Diary | | |
| | | | Photo | | |
| | | | Check-in ▶ | Spot category motion | Eating & drinking |
| | | | | | Shopping |
| | | | | | others |
| In a case in which there is no post for a certain period | | ▶ Stand-by motion | Setting-up exercise, etc. | | |

FIG.34

<Keyword storage unit>

| Priority | Feelings | Feelings keywords |
|---|---|---|
| (High) ↑ ⋮ ⋮ ↓ (Low) | Delight | glad, delighted, welcome, fun, desire, aggressive, positive, effort, desperate, proud, triumphant, thank you, thanks, thanks for the meal, Congratulations, hurrah, (^o^)、(^u^)、(^-^)、… |
| | Pleasure | happy, cheerful, sunny, fresh, refreshed, pleasant, feel good, good feeling, joy, interesting, nostalgic, releaved, obsessed, feel at ease, comfortable, calm, easygoing, laugh, lol, www, smile, grin, smirking, simper, broad grin, boisterous, excited, thrilled, (*^_^*)、… |
| | Anger | anger, sullen, complain, nervous, vexed, offense, sly, selfish, self-centered, unpleasant, disgusting, irritated, in a huff, (-_-メ)、… |
| | Sadness | sad, trying, painful, lonely, helpless, dull, heartbreaking, intolerable, disappointing, regret, sorry, guilty, reflect, unfortunate, depressed, disheartened, bored, gross, unhappy, dejected, (T_T)、(>_<)、… |
| | Doubt | ?, (?_?), … |
| | Impatience | sweat, too eager, got impatient, oops, MJY (^_;)、(-_-;)、… |

FIG.36A    FIG.36B    FIG.36C
<Emotional expression>
Delight    Pleasure    Anger
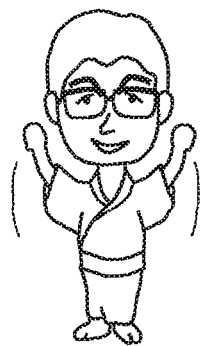  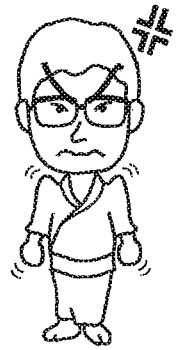
hurrah    swinging the body    trembling
FIG.36D    FIG.36E    FIG.36F
Sadness    Doubt    Impatience
  
shedding tears    twisting its head on one side    sweating FIG.37A  FIG.37B  FIG.37C  FIG.37D
<Post motion>
Mumbling    Diary    Photo    Check-in
To spot
category
motion
moving mouth    moving the pen    performing
a release operation

FIG.38A  FIG.38B  FIG.38C
<Spot category motion>
Eating and drinking   Shopping   others
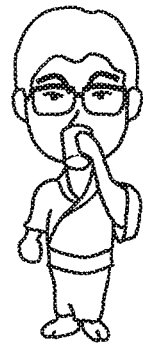  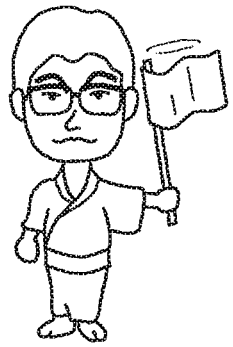
drinking coffee   swinging the body   waving a flag
FIG.39A  FIG.39B  FIG.39C
<Stand-by motion>
setting-up exercise   greeting   sleeping
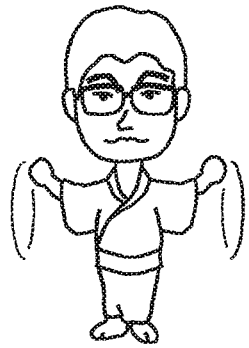  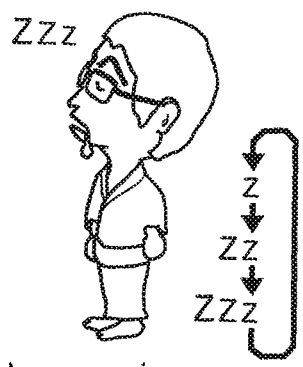
twirling arms   raising the right hand   snoring

FIG. 45

<Reaction table>

| Mumble ID | Post user ID | Response user ID | Total number of each reaction | | | | | | | |
|---|---|---|---|---|---|---|---|---|---|---|
| | | | cracker | Gee! | heart shape | punching | tossing an avatar | twirling | stroking |
| Czb?121 | 1 | 2 | 4 | 1 | 2 | 1 | 20 | 32 | 18 |
| | | 3 | 1 | 4 | 0 | 0 | 15 | 10 | 5 |
| | | 5 | 3 | 2 | 4 | 0 | 12 | 28 | 17 |
| Kha?536 | 2 | 1 | 5 | 12 | 7 | 8 | 6 | 15 | 9 |
| | | 3 | 1 | 5 | 3 | 12 | 14 | 21 | 13 |
| ... | ... | ... | ... | ... | ... | ... | ... | ... | ... |

FIG. 46

<Reaction table>

| Diary ID | Post user ID | Response user ID | Total number of each reaction ||||||||
| --- | --- | --- | --- | --- | --- | --- | --- | --- | --- |
| | | | cracker | Gee! | heart shape | punching | tossing an avatar | twirling | stroking |
| Lyc?214 | 1 | 2 | 1 | 2 | 0 | 1 | 0 | 1 | 1 |
| ... | ... | ... | ... | ... | ... | ... | ... | ... | ... |

| Photo ID | Post user ID | Response user ID | Total number of each reaction ||||||||
| --- | --- | --- | --- | --- | --- | --- | --- | --- | --- |
| | | | cracker | Gee! | heart shape | punching | tossing an avatar | twirling | stroking |
| Mxg?363 | 1 | 2 | 0 | 1 | 1 | 0 | 0 | 1 | 0 |
| ... | ... | ... | ... | ... | ... | ... | ... | ... | ... |

| Check-in ID | Post user ID | Response user ID | Total number of each reaction ||||||||
| --- | --- | --- | --- | --- | --- | --- | --- | --- | --- |
| | | | cracker | Gee! | heart shape | punching | tossing an avatar | twirling | stroking |
| Nda?763 | 1 | 2 | 1 | 0 | 0 | 1 | 1 | 1 | 0 |
| ... | ... | ... | ... | ... | ... | ... | ... | ... | ... |

MESSAGE-BROWSING SYSTEM, SERVER, TERMINAL DEVICE, CONTROL METHOD, AND RECORDING MEDIUM

CROSS-REFERENCES TO RELATED APPLICATION

This application is a Continuation Application of PCT Application No. PCT/JP2013/58392, filed Mar. 22, 2013 and based upon and claiming the benefit of priority from prior Japanese Patent Applications Serial No. 2012-141816 filed Jun. 25, 2012, Serial No. 2013-052836 filed Mar. 15, 2013, and Serial No. 2013-052837 filed Mar. 15, 2013, the entire contents of all of which are incorporated herein by reference.

TECHNICAL FIELD

The present invention relates to a technique of providing services in a site such as an SNS (Social Networking Service).

BACKGROUND

In recent years, services, in which it is possible to share, exchange, or browse various messages using the Internet, have come into wide use. Since it is difficult to recognize individuals on a network, users are identified by displaying a user image such as an icon, an avatar, etc., corresponding to each of the users. A technique to determine the arrangement of user images based on relationships between users has been proposed because relationships between users are not recognizable using just a simple list (e.g., refer to Patent Document 1).

CITATION LIST

Patent Document

[Patent Document 1] Japanese Published Unexamined Patent Application: JP-A-2000-132509

SUMMARY OF INVENTION

Technical Problem

In recent years, there have been many cases in which, in response to a post by a user, responses from other users are associated to the post one after another in a short period of time in an SNS that promotes and supports communication between users. In this case, what is interesting is what kind of relationships other users have when writing posts and the responses in a group multiple users belong to. The present invention is made in view of circumstances described above, so that one object of the present invention is to provide a technique to easily grasp relationships between other users in the posts and the responses.

Solution to Problem

Means that the present invention adopts to solve the problem will be described.

In order to achieve the above-mentioned object, a message-browsing system according to the present invention provides a browsing service of messages exchanged through a post and responses to the post among multiple users. The system includes: an assigning unit that assigns user images corresponding to multiple specific users, who are a subset or all of the multiple users, to respective ones of a number of reference positions that is equal to the number of the user images on a screen, in accordance with a predetermined rule; a position determining unit that determines the reference positions assigned to the user images corresponding to the multiple specific users as display positions displaying the respective user images; and a position changing unit that changes a display position of a user image corresponding to one of the multiple specific users responding to a post, which another user of the multiple specific users has contributed, to a position close to a display position of a user image corresponding to the other user who has contributed the post.

Note that the message-browsing system includes a management server and a terminal device, and the screen is displayed on a display unit of the terminal device that the user operates. A message is character information that is the main body, but this is not limited to the character information, and it may be a still image, a moving image, voice and may include multiple types of such information. Therefore, the reading of a message may include the playing back of a moving image and voice. Furthermore, the post and the response from the user means the posting of a message and sending of a message as a response from the terminal device that a user operates.

In the present invention, the assigning unit may select the subset of the multiple users that satisfy a predetermined selection condition among the multiple users as the multiple specific users. In the present invention, the position determining unit may determine each display position displaying respective ones of the user images corresponding to the multiple specific users, within a predetermined range including a corresponding reference position assigned to each user image, and the position changing unit may change the display position of the user image corresponding to the other user who has contributed the post to a position beyond the predetermined range.

Furthermore, in the present invention, it is preferable that the system include a management unit that manages a storage unit that stores intimacy levels among the multiple users in association with respective pairs of a user being a reference and another user being a target, updates an intimacy level that is stored in the storage unit so that the intimacy level is higher if a first condition occurs, and updates an intimacy level that is stored in the storage unit so that the intimacy level is lower if a second condition occurs, in which the position determining unit determines, for each of the multiple specific users, a display position of each specific user on the basis of the intimacy level between each specific user and another user.

In this configuration, it is preferable that the position determining unit determine the display positions so that, as the intimacy level between one user and another user is higher in the predetermined range corresponding to the one user, a distance between a user image corresponding to the one user and a user image corresponding to the other user is shortened. In this configuration, the first condition is that a user being the reference of one of the pairs contributes a response to a post of a user being the target of the same pair, and the management unit may update the intimacy level between the user being the reference and the user being the target so that the intimacy level is higher. Furthermore, in this configuration, the second condition is that a predetermined time has elapsed, and the management unit may update the intimacy levels among the multiple users so that the intimacy levels are lowered by the same amount. Note that various kinds of conditions may be considered as the first condition and the second condition.

In the present invention, it is preferable that the multiple users include a main person receiving the browsing service and one or more friends having a predetermined relationship with the main person, and the assigning unit assigns one or more reference positions of one or more user images corresponding to the respective one or more friends, so that the reference positions are radially arranged around the reference position corresponding to the main person. Furthermore, in this configuration, it may be adopted that the assigning unit may assign one or more reference positions of one or more user images corresponding to the respective one or more friends, in such a manner that the reference positions are arranged so that apparent distances from the user image corresponding to the main person to the user images corresponding to the friends are all of the same distances.

In the predetermined rule, correspondence of each of the user images corresponding to the multiple specific users with each of the multiple reference positions may be fixed with respect to time elapsed, or may be changed in an order of update dates of posts by the multiple users. An update date may be a date and time when each of the posts was conducted, and may be a latest date and time among the dates and times when each of the posts was contributed or dates and times when each of responses to the posts was contributed. Furthermore, in the predetermined rule, an update date that is before a predetermined period of time from a current time may be excluded from the update dates of the posts by the multiple users. It is preferable that the position determining unit or the position changing unit determine or change the display positions of the respective user images corresponding to the multiple specific users, in correspondence with grids set on the screen.

The present invention can be comprehended as a server constituting the system, a control method for the server, and a program to cause a computer to function as the server as well as the message-browsing system, and can be comprehended as a terminal device constituting the system, a control method of the terminal device, and a program to cause a computer to function as the terminal device. The program that causes the computer to function as the server may be recorded in a recording medium. If a recording medium is used, the program can be installed, for example, in the computer. The recording medium in which the program is stored may be a non-transitory recording medium, such as a CD-ROM, etc.

Furthermore, the program for causing the computer to function as the terminal device may be also recorded in the recording medium. The recording medium for recording the program for causing the computer to function as the terminal device includes a recording medium that is provided internally or externally and can be accessed from a distribution server to deliver the program. A code of the program stored in the recording medium of the distribution server may be different from a code of the program executable in the terminal device. That is to say, it does not matter in which form the code is stored in the distribution server if the code is downloaded from the distribution server and can be installed so as to be executable in a terminal device. Note that it may be adopted so that the program is divided into multiple programs, and after downloading the multiple programs each at a different time, the multiple programs are combined in the terminal device, or the multiple programs may be distributed by different distribution servers, respectively.

Furthermore, the following configuration may be adopted when the present invention is comprehended as a terminal device. That is, a terminal device obtains messages transmitted in a group in which a first user using a terminal device and multiple second users using other devices are registered, in a first service from a service device corresponding to the first service to display the messages on a display unit. The terminal device may include: a service providing unit that provides a second service, different from the first service, to a user who has registered a user image; a display control unit that causes the display unit to display user images corresponding to respective specific users who are a subset or all of the multiple second users and a user image corresponding to the first user. The display control unit may cause the display unit to display a prescribed image as a user image of a user to whom the second service is not provided, from among the specific users.

The first user corresponds to a member (main person) in an embodiment, a user to whom the second service is provided among the second users corresponds to a user in the embodiment, and another user to whom the second service is not provided corresponds to a non-user in the embodiment.

Furthermore, in such a terminal device, the specific users may be a subset of users that satisfy a predetermined selection condition among the multiple users. As the predetermined selection condition, it may be one having a property that the specific users change as time elapses, in which a user is a person of high rank in the number of recent posts and responses, or is a person of high rank in the number of total posts and responses, among the multiple users, for example. It may be one having a property that a specific user does not change as time elapses, in which the specific user is preselected by any user among the multiple users, for example.

Furthermore, in the terminal device, it is preferable that the service providing unit provide, when a user image except for the prescribed image from among the user images corresponding to the specific users is selected, the second service in which the first user interacts with a specific user corresponding to the selected user image, and the service providing unit does not provide the second service when the prescribed image corresponding to the specific user is selected. In this configuration, when the prescribed image is selected, the display control unit may cause the display unit to display a screen indicating that the second service cannot be provided, may invalidate the selection of the prescribed image, or may cause the display unit to display a confirmation screen confirming whether or not the first user invites the specific user corresponding to the selected prescribed image to the second service.

BRIEF DESCRIPTION OF DRAWINGS

FIG. 5 is a table showing an example of a user registration table, FIG. 6 is a table showing an example of a group table, FIG. 13 is a diagram showing another function block built when grouping users, FIG. 15 is a table showing an example of an intimacy level table, FIG. 16 is a drawing showing an example of the condition of an increase and the condition of a decrease in intimacy level, FIG. 28 is a drawing showing other relationships between reference positions and avatars assigned in order of time when a post is conducted, FIG. 33 is a drawing showing a list of motions, FIG. 34 is a drawing showing example contents in a keyword storage unit, FIG. 36A is a drawing showing an example of a motion of an avatar according to emotional expression, FIG. 36B is a drawing showing an example of a motion of an avatar according to emotional expression, FIG. 36C is a drawing showing an example of a motion of an avatar according to emotional expression, FIG. 36D is a drawing showing an example of a motion of an avatar according to emotional expression, FIG. 36E is a drawing showing an example of a motion of an avatar according to emotional expression, FIG. 36F is a drawing showing an example of a motion of an avatar according to emotional expression, FIG. 37A is a drawing showing an example of a motion of an avatar according to a form of a post, FIG. 37B is a drawing showing an example of a motion of an avatar according to a form of a post, FIG. 37C is a drawing showing an example of a motion of an avatar according to a form of a post, FIG. 37D is a drawing showing an example of a motion of an avatar according to a form of a post, FIG. 38A is a drawing showing an example of a motion of an avatar according to a spot category, FIG. 38B is a drawing showing an example of a motion of an avatar according to a spot category, FIG. 38C is a drawing showing an example of a motion of an avatar according to a spot category, FIG. 39A is a drawing showing an example of a motion of an avatar that is waiting, FIG. 39B is a drawing showing an example of a motion of an avatar that is waiting, FIG. 39C is a drawing showing an example of a motion of an avatar that is waiting, FIG. 45 is a table showing an example of a reaction table, FIG. 46 is a table showing an example of a reaction table.

DESCRIPTION OF EMBODIMENTS

An embodiment of the present invention will be described with reference to the drawings.

Figure 1:
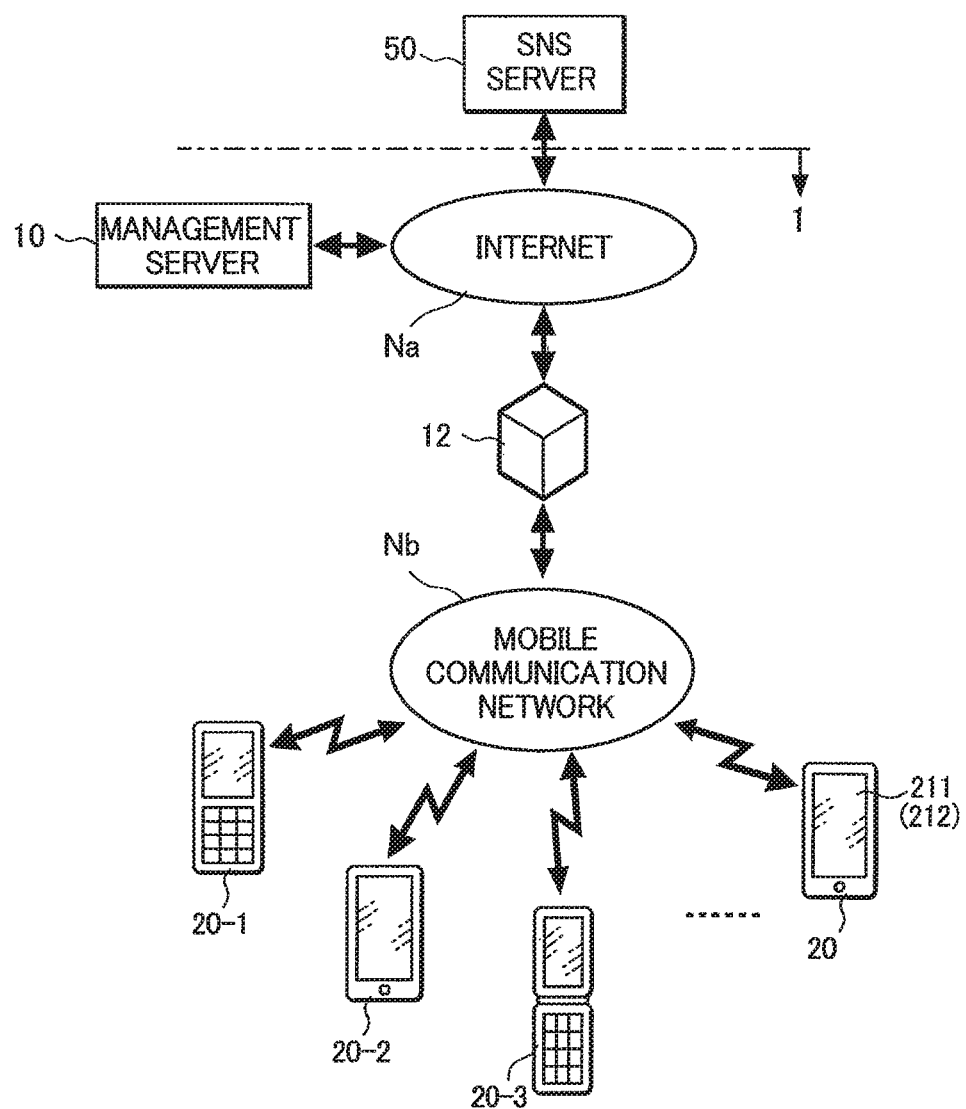
FIG. 1 is a block diagram showing a message-browsing system according to an embodiment.

FIG. 1 is a block diagram showing a general configuration including a message-browsing system 1 relating to the embodiment. As shown in the figure, it is configured so that a management server 10, an SNS server 50, and multiple terminal devices 20-1, 20-2, 20-3 are connected with each other through the Internet Na, a gateway 12 and a mobile communication network Nb in message-browsing system 1. The SNS server 50 is run by an SNS administrator and is provided outside the message-browsing system 1. The SNS server 50 manages posts by a member and information relating to the member to provide an SNS (first service) in which an SNS member (hereinafter, it is simply called a "member") interacts with others. In this embodiment, the management server 10 provides a service (second service) from a first function to a fourth function described below to a user satisfying a condition described below. Therefore, the management server 10 manages information necessary to provide the service from the first function to the fourth function. Note that as for the terminal devices 20-1, 20-2, 20-3 which are operated by users, who receive the service from the first function to the fourth function, in the member, the "-" (hyphen) and the numeral following the hyphen are omitted and a reference sign "20" will be simply used to generally describe a terminal device without specifying any terminal device.

The terminal device 20 is a cellular telephone that a user operates, for example. Details of the terminal device 20 will be described below, but it is configured so that the terminal device 20 includes a display unit 211, and a touch panel 212 put on the display unit 211, an input of necessary information and various instructions are given by a user's touch operation to a screen of the display unit 211. The terminal device 20 is not limited to connect to the mobile communication network Nb, and may connect to a wireless LAN (Local Area Network). In a configuration that the terminal device 20 is connected to the wireless LAN, the terminal device 20 is connected to the SNS server 50 and the management server 10 via a radio base station (access point) and the Internet Na. Furthermore, the terminal device 20 is not limited to a cellular telephone, and a tablet computer and a PDA (Personal Digital Assistant) are preferable.

Note that, in FIG. 1, the SNS server 50 is provided outside the message-browsing system 1, but it may be provided inside. Furthermore, in FIG. 1, each of the SNS server 50 and the management server 10 is configured as a single server, but the functions of the management server 10 may be distributed to two or more servers (so as to be composed of one virtual server). The SNS server 50 and the management server 10 may be configured as a single server. Furthermore, it may be configured so that the management server 10 serves as a relay between the SNS server 50 and the terminal device 20. The messages posted by members managed by the SNS server 50 are accessible from an external computer, connected through the Internet Na, except for the terminal device 20 according to the message-browsing system 1. However, it is possible to receive the service from the first function to the fourth function described below when accessing from the terminal device 20 according to the message-browsing system 1.

Figure 2:
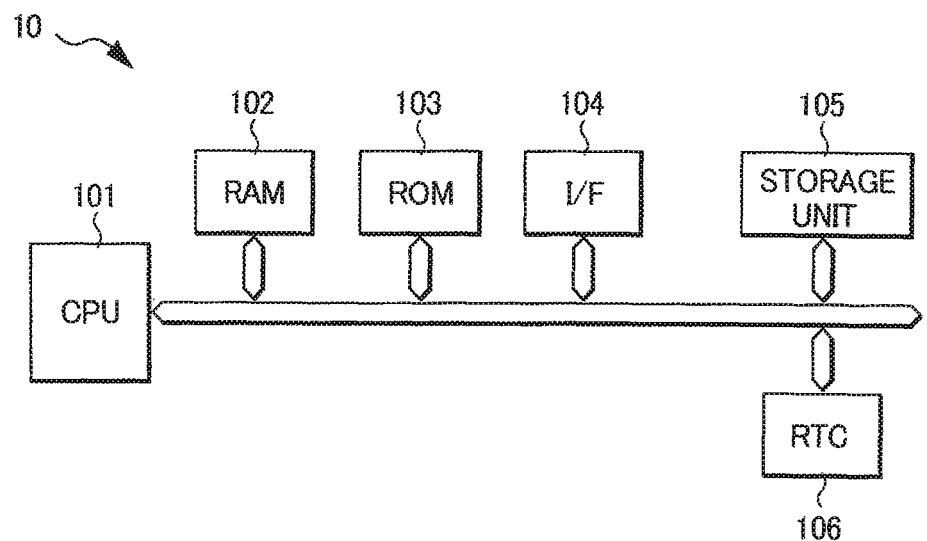
FIG. 2 is a block diagram showing a configuration of a server in the system.

FIG. 2 is block diagram showing a hardware-like configuration of the management server 10. As shown in the figure, the management server 10 includes a CPU (Central Processing Unit) 101 controlling an overall apparatus, a RAM (Random Access Memory) 102 functioning as a main storage unit of the CPU 101, a ROM (Read Only Memory) 103 storing a boot program, etc., an interface (I/F) 104 to communicate through a network, a storage unit 105 as a sub-storage unit storing various programs and data, and a real-time clock (RTC) 106 outputting time information about current time. The storage unit 105 is a hard disk drive, etc., and stores a service program to provide the service to the user and various tables as a database described below.

Figure 3:
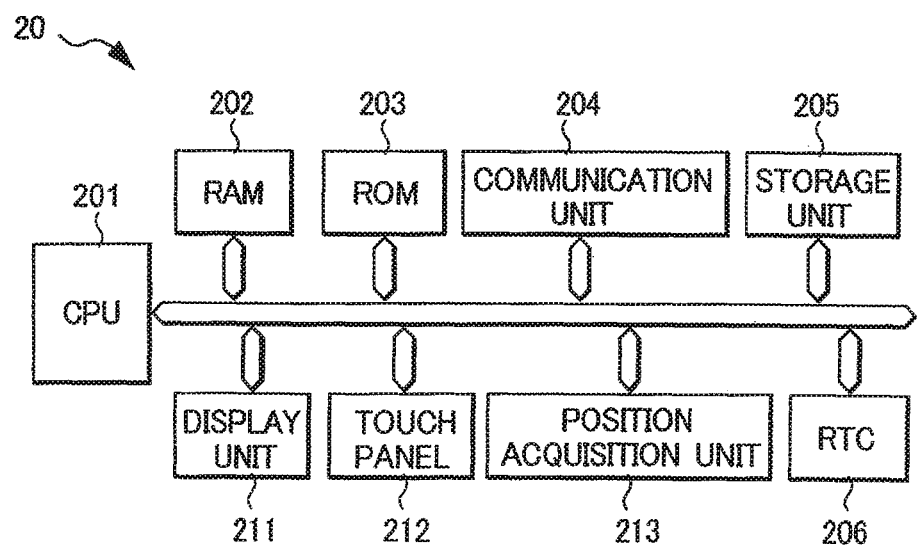
FIG. 3 is a block diagram showing a configuration of a portable terminal in the system.

FIG. 3 is a block diagram showing a hardware-like configuration of the terminal device 20. As shown in the figure, the terminal device 20 includes a CPU 201, a RAM 202, a ROM 203, a communication unit 204, a storage unit 205, an RTC 206, a display unit 211, a touch panel 212 and a position acquisition unit 213. The CPU 201 controls each part of the terminal device 20 by executing various programs stored in the storage unit 205. The storage unit 205 is a nonvolatile memory, etc., and stores an application program to provide the service and an avatar (user image), etc., described below. The application program is downloaded from a particular delivery site and is installed in the terminal device 20. The communication unit 204 communicates with the management server 10 through the mobile communication network Nb and the wireless LAN. The RTC 206 outputs time information of current time.

The display unit 211 is a display panel, such as a liquid crystal display device, an organic EL (Electro Luminescence) device, for example. Details of the touch panel 212 are omitted, but it is configured so as to be integrated with the display unit 211, and detects a touch position (XY coordinate value) of a displayed screen to output location information indicating the detected touch position to the CPU 201. The CPU 201 detects a movement direction of the touch position and a movement speed of the touch position, and a type of the touch operation based on location information from the touch panel 212. The types of the touch operations that is detectable include, for example, a tap, a flick, a drag, a pinch, etc. The tap is an operation to touch a display screen with a finger lightly. The flick is an operation to sweep an object displayed on a screen with a finger lightly. The drag is an operation to move an object displayed on a screen in a state in which a finger is touching the object. The pinch is an operation to pinch or widen two fingers with the fingers touching the display screen.

The position acquisition unit 213 acquires, for example, location information of the terminal device 20 by GPS (Global Positioning System). Note that the location information is used by check-in, etc., as described below. Furthermore, the location information is longitude and latitude, but this may also include altitude. The location information may be acquired by comparing electric wave strength or electric wave arrival time, etc., in multiple radio base stations with each other or may be acquired in combination of these and the GPS without being limited to the GPS.

Function blocks to provide a service of each function from the first function to the fourth function to a user (main person) are appropriately built by executing the service program in the management server 10 and executing the application program in the terminal device 20 in the message-browsing system 1 according to the embodiment. In the first function, multiple persons including the main person are grouped in the terminal device 20. Upon performing this grouping, the main person who is a user of the terminal device 20 edits the group by registering other members in the group, or conversely, deleting other members. Upon performing this editing, a service in which an avatar corresponding to the member is displayed in the display unit 211 is provided to the main person. Then, in the second function, a service in which avatars corresponding to members of the group are displayed in an arrangement corresponding to posts and responses of the members is provided. Furthermore, in the third function, a service in which each avatar is displayed with motion corresponding to contents and a form of a post of the corresponding member is provided. In the fourth function, a service in which an avatar of a friend is displayed with motion corresponding to a response operation is provided when the main person performs a tap operation to an icon, a touch operation to an avatar of a user, or the like, in response to a post of the friend. When another friend gives a response to a post of the main person, motion or an icon corresponding to contents of the response is added to an avatar corresponding to the main person.

Details of the group will be described below, but it is comprised of the main person receiving services and a friend who is a member chosen by the main person. Therefore, both the main person and the friend are included in the members of the group. Furthermore, as for the members of the group, users having predetermined relationships (for example, a friendship) may be assigned to the member in the SNS (first service) without being assigned through the editing by the main person. A user in the service (second service) from the first function to the fourth function, from among the users in the SNS, may be assigned to the member. A user communicating with the main person in a predetermined period from among the users in the SNS may be assigned to the member. That is, as for the member of the group, a user may be fixed as time elapses, and a user may be changed as time elapses. Note that an operation for providing the service of the functions will be separately explained when it is appropriate explain the respective functions.

A "post" means that the main person and the other user (friend) send information, and both conscious and unconscious (automatic) ones are included in sending of the information. The post has the following four forms for convenience of explanation in the embodiment. That is, the four forms include "mumbling" to send a sentence within a predetermined number of letters (e.g., 140 characters), "diary" to send contents written in a predetermined form, "photo" to upload image data, and "check-in" to share the information of a place (a spot such as a shop) identified in the location information between users.

Furthermore, a "response" means that a user replies to a "post" of another user in any way. That is, the "response" is premised on an original "post" in every case. Furthermore, there may be one or more "responses" to one "post", but there also may not be any "response" at all. The "response" has the following four forms for convenience of explanation in the embodiment. That is, the four forms include "cracker" indicating surprise to a post, "Gee!" indicating admiration to a post, "like" indicating agreement, praise, etc., for a post, and "comment" to reply by text to a post. Note that it is natural that a form other than "post" and "response", for example, "transfer", may be added.

When a certain user contributes a "post", the "post" is associated with a member ID of the user who has contributed the post, a post ID (mumble ID, etc.) corresponding to a form of the post, contents (text), and transmission time and date (date and time), and is stored in a storage unit of the SNS server 50. Furthermore, a "response" is associated with a post ID of the post that is the origin "post" of the "response" and a member ID of the user who has contributed the post, and is also associated with a member ID of the user giving the response, a post ID corresponding to a form of the response, contents of the response, and transmission time and date. Then, the response is stored in the storage unit of the SNS server 50 or a storage unit 105 of the management server 10. Specifically, "post" and "comment" among the "responses" are associated with a post ID and stored in the storage unit of the SNS server 50. Forms other than "comment" among the "responses" are stored in the storage unit 105 of the management server 10. That is, the "post" and the "comment" stored in the storage unit of the SNS server 50 are accessible even from an external computer connected to the SNS server 50 through the Internet Na. Responses other than "comment" from among the "responses" can be accessed only from the terminal device 20 according to the message-browsing system 1, namely, the terminal device 20 operated by a user receiving the services from the first function to the fourth function among the members. Note that, when "post" and "response" are sent to the member of a certain group, the "post" and the "response" are associated with information (group ID) to identify the group. Furthermore, a post-response history is formed by stored contents, in which "post" stored in the storage unit of the SNS server 50 is associated with "comment" among the "responses", and responses other than the "comment" stored in the storage unit 105 of the management server 10. An example of a screen using the post-response history will be described later.

<First Function>

First, in the message-browsing system 1 according to the embodiment, an operation upon providing a service of the first function will be described.

Figure 4:
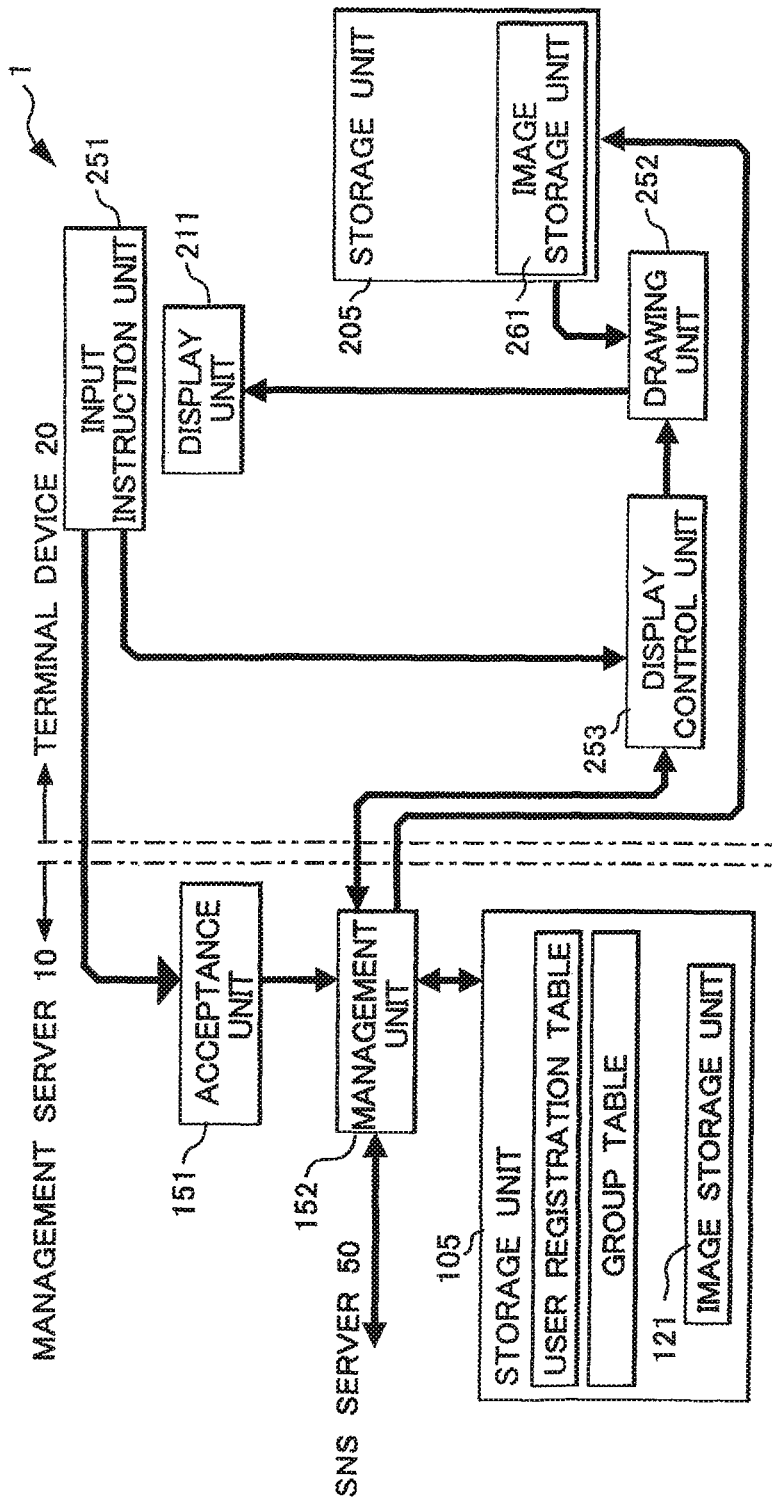
FIG. 4 is a diagram showing a function block built when grouping users.

FIG. 4 is a drawing showing a function block built to provide the service of the first function in the message-browsing system 1. As shown in the drawing, in the management server 10 side, the CPU 101 executes a service program, so that an acceptance unit 151 and a management unit 152 are built. In the terminal device 20 side, the CPU 201 executes an application program, so that an input instruction unit 251, a drawing unit 252 and a display control unit 253 are built. Specifically, the function block shown in FIG. 4 is built by the management server 10 and the terminal device 20 when the main person performs an operation to mainly receive the service of the first function. Note that, in the drawing, the Internet Na, the gateway 12 and the mobile communication network Nb are omitted because they merely relay data.

In the drawing, the input instruction unit 251 outputs operation information such as an instruction and a text input by a touch operation on the touch panel 212, etc. The acceptance unit 151 accepts the operation information by the input instruction unit 251 from the terminal device 20. The management unit 152 manages the stored contents in the storage unit 105 according to information by the input instruction unit 251 and controls each unit. Note that, in FIG. 4, focusing on a certain terminal device 20 for convenience of explanation, giving and receiving information or a message between the terminal device 20 and the management server 10 are described. In reality, the acceptance unit 151 and the management unit 152 of the management server 10 accept (or receive) information from multiple terminal devices 20, and the management unit 152 transmits information to the multiple terminal devices 20.

In performing the first function, a user registration table shown in FIG. 5 and a group table shown in and FIG. 6 are managed in the storage unit 105. The user registration table is one for associating a member ID, which uniquely identifies a user receiving the services from the first function to the fourth function among members registered in the SNS in the SNS server 50 by multiple alphanumeric characters as shown in FIG. 5, with a corresponding user ID identifying the user by serial number and for storing the member ID and the user ID. Because not necessarily all of the members using an existing service provided by the SNS use the services from the first function to the fourth function in the embodiment, user IDs are assigned to users in order to provide the services from the first function to the fourth function. As a result, even if a member is one to whom a member ID is given, the member is not a user who can receive the services from the first function to the fourth function if a user ID is not registered in the user registration table. In other words, if the member ID is associated with the user ID in the user registration table, the management unit 152 can determine that the member is the user to whom the services from the first function to the fourth function can be provided.

A user can set one or more groups in the embodiment. One group is composed of a user as the main person and members as friends who are other users fewer than nine persons under the condition that each member is a member of the SNS. It is a group table to manage such a group. In the group table, one or more groups identified by a group ID relative to the main person as shown in FIG. 6 are registered. A group name is given to each group, and member IDs of the SNS are set from a friend a to a friend i around the main person. As for a member ID of a user with whom a friendship is built on the SNS, the management unit 152 inquires the SNS server 50 about the member ID, so that the member ID is acquired. Because the friend is a member of the SNS but may not be a user using the services from the first function to the fourth function, the friend is managed by using the member ID. Thus, a main person is an SNS member and also is a user who can receive the services from the first function to the fourth function, whereas friends constituting a group set by the main person are SNS members but are sometimes non-user who cannot receive services from the first function to the fourth function.

Note that the member ID is composed of multiple alphanumeric characters, for example, but "?????" is described as the member ID in FIG. 6 in order to simplify the description. Furthermore, when all nine members in a group are not set, a member ID of a friend not set in the group among from the friend a to the friend i is a null character, or information that the friend is not set in the group is stored. In an example of FIG. 6, a group provided with an arrow is the group which a user having the user ID "1" first sets, and a group name "team A" is given to the group in a state in which friends from the friend a to the friend h are set, and friend i is not set.

Returning explanation to FIG. 4, the display control unit 253 outputs arrangement information of avatars corresponding to members of a designated group, namely, information to show which avatar is arranged in which spot to the display unit 211 of the terminal device 20 of the user becoming the main person. Furthermore, the display control unit 253 also outputs control information to prescribe display contents of the display unit 211 according to operation information from the input instruction unit 251.

The image storage unit 261 is assigned to a part of a storage area of the storage unit 205 of the terminal device 20. The image storage unit 261 stores image information of avatars of friends and the main person registered as members of a group by the main person who is a user of the terminal device 20. In image storage unit 261, the image information of avatars of the friends and the main person is stored as follows, for example. Specifically, when a user is registered to receive the services from the first function to the fourth function, an avatar which is a graphical representation of the user is generated or selected by the user, so that the image information of the avatar is associated with a user ID to be stored in the image storage unit 121 of the storage unit 105. Therefore, it is necessary to register a user's own avatar to become the user who can receive services from the first function to the fourth function. When a certain friend is registered in a certain group by the main person, first, the management unit 152 determines whether or not a user ID has been given to a member ID of the friend by referring to the user registration table. Second, the management unit 152 transfers the image information of the avatar corresponding to the user ID to the image storage unit 261 of the terminal device 20 of the main person together with the user ID, if the user ID is given to the member ID of the friend. Third, the management unit 152 transfers the image information of a black avatar (prescribed image) to the image storage unit 261 of the terminal device 20 of the main person together with the member ID, for example, if the user ID of the friend is not given to the member ID. As a result, the image information of the avatar corresponding to the registered friend is associated with the user ID (or the member ID) to be stored in the image storage unit 261 in the terminal device 20 of the main person. Note that, as for the avatar of the main person, the management unit 152 transfers the image information of the avatar stored in the storage unit 105 (image storage unit 121) at the time of registration to the terminal device 20, so that the image information of the avatar is stored in the image storage unit 261.

The drawing unit 252 reads the image information of the avatar stored in the image storage unit 261 and renders drawing information in a frame buffer corresponding to the display unit 211 so that the avatar is drawn at a spot shown in the arrangement information of the avatar. Note that drawing of the avatar may be performed in a unit of a gird described later. The display unit 211 displays an image according to drawing information rendered in the frame buffer.

Figure 7:
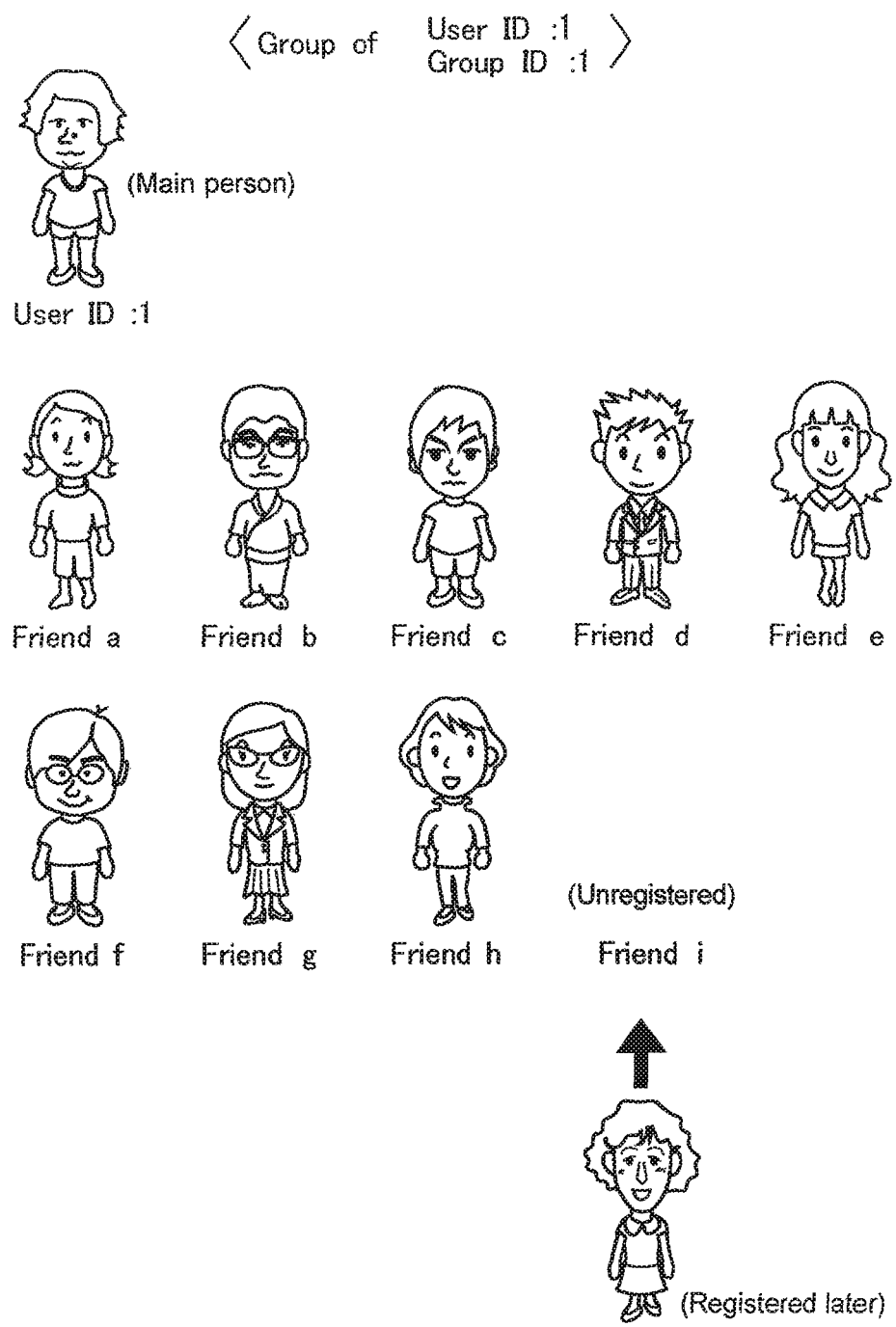
FIG. 7 is a drawing showing an example of correspondence between users and avatars.

As mentioned above, in FIG. 6, friends are in a state in which the friend a to the friend h are set in a group designated by an arrow, and friend i is not set. In the state, it is assumed that avatars corresponding to the friend a to the friend h and the main person having the user ID of "1" look like those shown in FIG. 7, respectively. A case in which an avatar as shown in FIG. 7 and a user thereof are registered as friend i which has not been set will be described.

Figure 8:
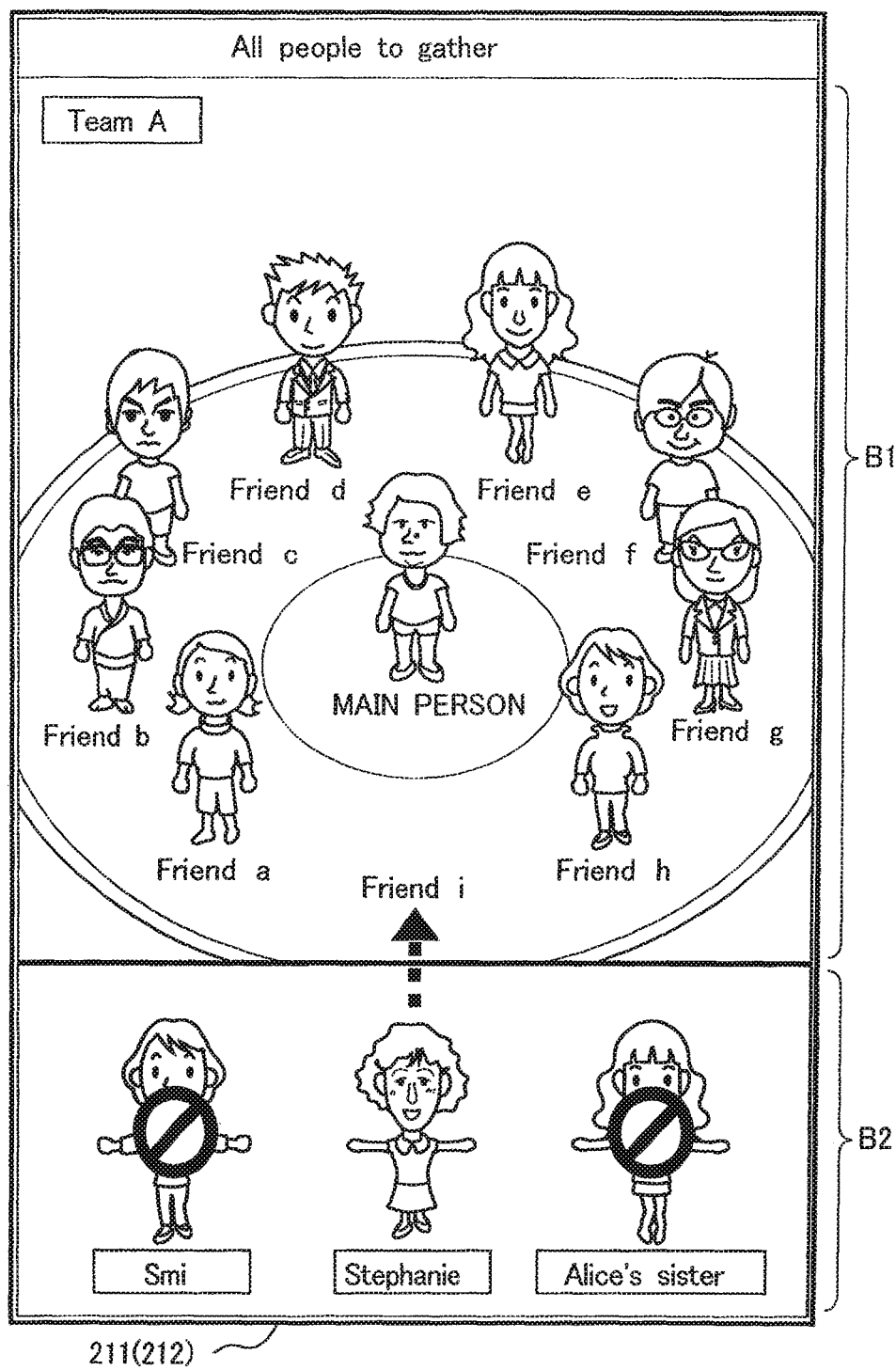
FIG. 8 is a drawing showing an example of an editing screen of a group.

First, as shown in FIG. 8, the display screen of the display unit 211 is divided into an area B1 and an area B2. In the area B1, avatars of the friend a to the friend h are arranged at equal distance in a circle having its center at the avatar of the main person. Note that an avatar is not arranged at a spot corresponding to the friend i because the friend i has not been set in the group in this stage. In the area B2, candidates of friends registered in the group are arranged horizontally. Note that only three avatars are displayed in the area B2 in the drawing, but it is possible to make other avatars appear by the flick operation to the right and the left to be candidates. Furthermore, among three avatars, avatars on the right and the left have already been registered as the friend h and the friend e, so that marks indicating that registration is impossible are given to avoid duplicate registration.

The screen is premised on a state in which a group having a group ID of "1" has been selected by the input instruction unit 251 in the terminal device 20 which the main person having the user ID "1" operates, and is displayed in the display unit 211 as follows. Specifically, in the area B1, the display control unit 253 requires information on friends from the friend a to the friend i of the group having the group ID of "1" to the management unit 152. The management unit 152 acquires information on friends from the friend a to the friend i constituting the group with reference to the group table. As a result, the management unit 152 acquires member IDs for friends from the friend a to the friend h and, for the friend i, information that the friend i has not been set as a group member, respectively. Then, the management unit 152 determines whether or not user IDs are associated with the acquired member IDs with reference to the user registration table. The management unit 152 sends the user ID if the user ID is associated with the acquired member ID and sends the acquired member ID if the user ID is not associated with the acquired member ID to the display control unit 253 in return, respectively. Note that, in the example, all of the member IDs of friends from the friend a to the friend h are associated with user IDs.

The display control unit 253 supplies the user IDs of friends from the friend a to the friend h and the information that the friend i is not set, which are sent in return, to the drawing unit 252. The drawing unit 252 reads the image information of avatars corresponding to the user IDs together with the image information of the avatar of the main person from the image storage unit 261, and draws avatars at spots corresponding to the friends in the area B1. Thereby, in the area B1, avatars of the friend from the friend a to friend h are arranged to be displayed in a circle having its center at the avatar of the main person. Note that, in the first function of the group editing, as shown on FIG. 8, spots corresponding to the friends are on the circle having a center at the main person and are sequentially set at spots corresponding to the friend h, the friend g, the friend f, the friend e, the friend d, the friend c, the friend b and the friend a counterclockwise, in which a spot corresponding to the friend i is set on the side in front of the circle. Furthermore, spots corresponding to friends may be changed by various conditions in the second function or later as described below.

Then, as for the area B2, candidates who can be registered by addition as friends are presented. The user who can become a candidate is one having a predetermined relationship, e.g., a friendship, to the main person in the SNS. Therefore, the management unit 152 queries the SNS server 50 about the member IDs of members having friendships with the main person when information on friends of the selected group is required, and acquires member IDs for the predetermined number of users. The management unit 152 supplies the user ID and the image information of the avatar to the display control unit 253 if the user ID is given to the acquired member ID in the user registration table, and supplies the acquired member ID and the image information of the black avatar to the display control unit 253 if the user ID is not given to the acquired member ID. The display control unit 253 transfers the supplied image information of the avatar (or black avatar information of a non-user) to the drawing unit 252. The drawing unit 252 draws avatars based on image information in the supplied image information of avatars at three spots in the area B2. Thereby, in the area B2, the avatar of the main person becoming a candidate for the registration is displayed. Note that the display control unit 253 instructs the drawing unit 252 to draw a mark indicating that the registration is impossible on the avatar if the avatar supplied from the management unit 151 has been already displayed in the area B1. Furthermore, if the flick operation is completed at the three spots, this makes an avatar become another candidate to be displayed. Thereby, in the area B2, the avatar of the candidate who can be registered by addition as a friend is displayed.

In addition, when the avatar, to which the mark indicating that the registration is impossible is not given, among avatars displayed in the area B2, is registered as a friend of the group in a screen shown in FIG. 8, the main person drags the avatar along an arrow of a broken line in the drawing to a place where an avatar is not arranged in the circle in the area B1.

Figure 9:
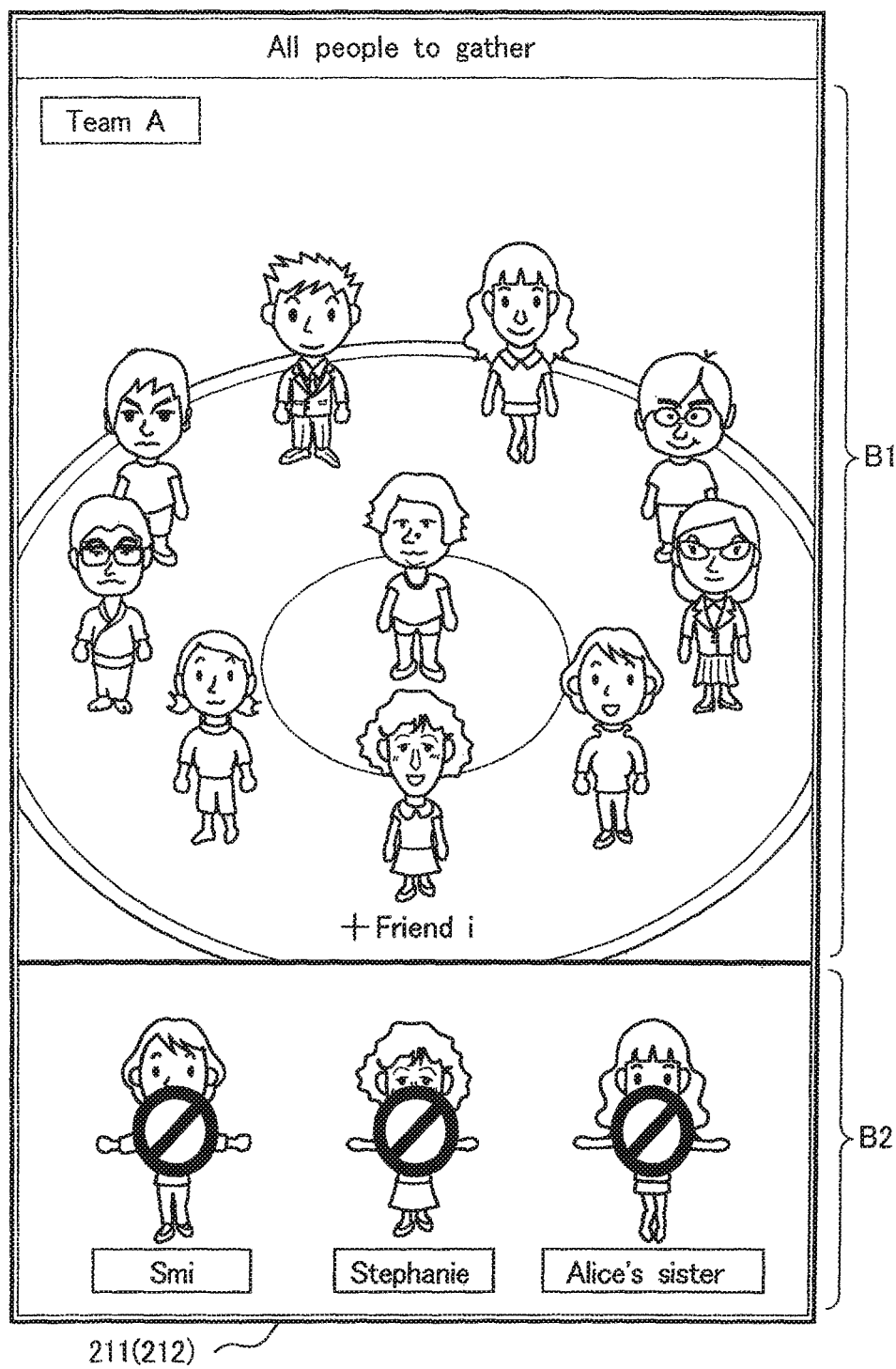
FIG. 9 is a drawing showing an example of an editing screen of a group.

By dragging, the screen display is as shown in FIG. 9. That is, an avatar corresponding to the friend i, namely, a dragged avatar, is arranged in the area B1. Note that operation information is notified to the management unit 152 via the acceptance unit 151 when the avatar is registered in this way. The management unit 152 registers the member ID corresponding to the avatar to the friend i of the group in the group table. Furthermore, in the area B2, the mark indicating that the registration is impossible is given to an original avatar, with registration to the friend i.

In the group table, a friend is registered with the member ID, not with the user ID. Therefore, a user, who is a member of the SNS, but cannot receive the services from the first function to the fourth function, may be registered in the group by the main person. Specifically, when a friend is added to a certain group by the main person, a user is presented as a candidate of the friend to be added if the user is a member having a friendship with the main person as described above, even if the user is not one who can receive the second services from the first function to the fourth function. Therefore, a person, who is a member, but is not a user, may be registered as a friend of the group. In this case, a black avatar as a prescribed image is displayed because an avatar is not registered (associated) for the person registered as the friend.

Figure 10:
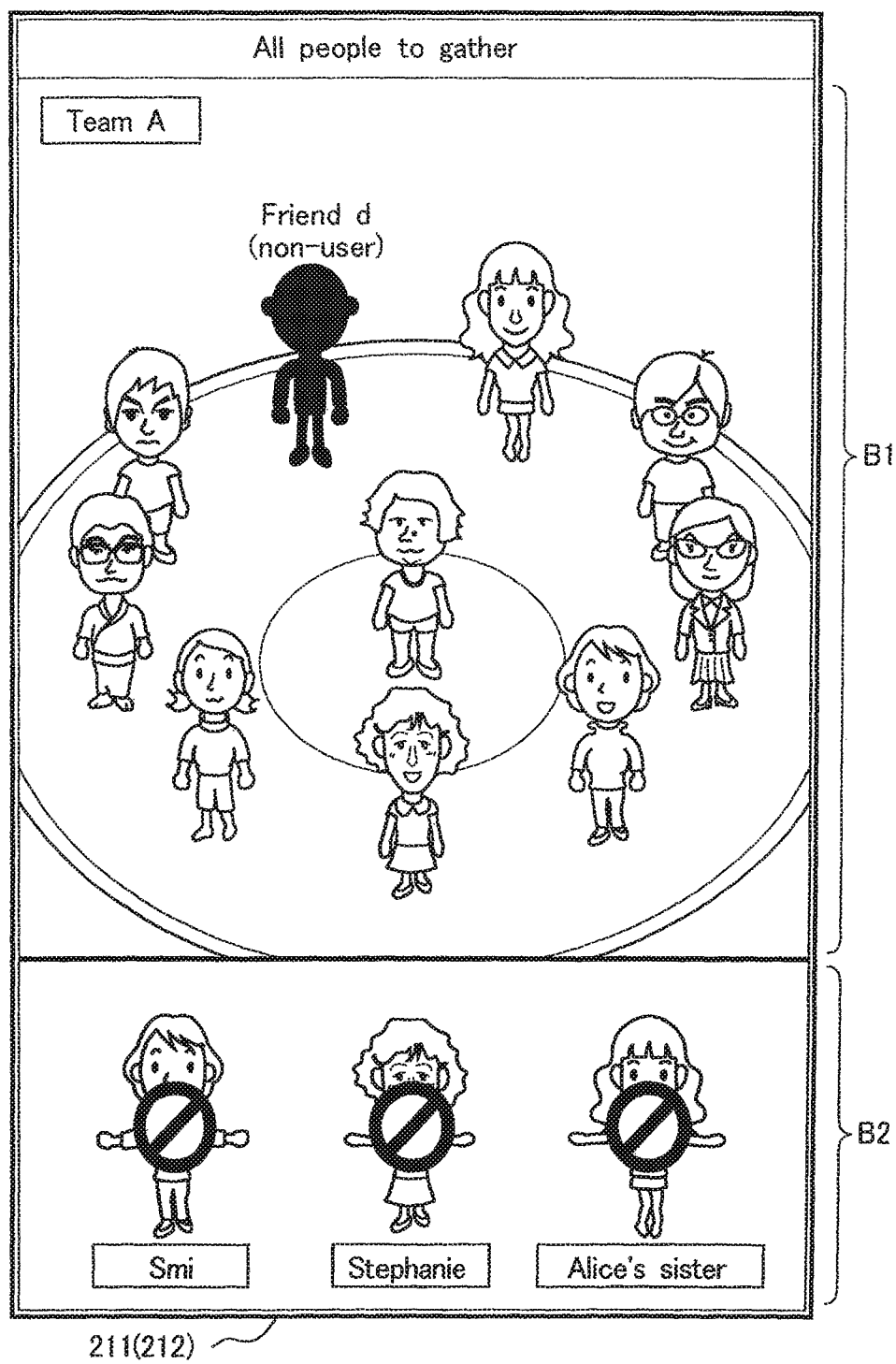
FIG. 10 is a drawing showing an example of an editing screen of a group.

FIG. 10 is a display example when a member corresponding to the friend d is a person, who cannot receive the services from the first function to the fourth function, and is registered in the group, for example. Note that an example of the prescribed image is not limited to a black avatar, and includes avatars painted with other colors and various kinds of designs. Furthermore, it is not particularly illustrated, but when a person, who is a member having a friendship with the main person and is not a user, is presented as a candidate to be added to the group, a black avatar is displayed in correspondence with the person in the area B2 as described above.

Explanation about the registration with the group has been done so far, but, for example, deletion may be performed by an operation that is converse to the operation for the registration. That is, an avatar displayed in the area B1 is dragged to the area B2. Note that when an avatar is deleted in this way, this operation information is supplied to the management unit 152 through the acceptance unit 151 from the input instruction unit 251, and the management unit 152 deletes the member ID corresponding to the avatar dragged from the group in the group table.

Furthermore, in the first function, as screens shown in FIG. 8 to FIG. 10, avatars corresponding to members of a group set by the main person are displayed, but in reality, as the second function to the fourth function, described later, arrangement spots and direction of the avatars are changed according to a post and a response, and the avatars are displayed with a motion. Furthermore, it is possible to communicate via a post and a response that are performed on a one-to-one basis by choosing an avatar in the fourth function. However, the member displayed with the black avatar is a person who cannot receive the services from the first function to the fourth function, so that the main person cannot communicate with the member via these services. Therefore, any of the following processing is performed when the main person is going to communicate with the member displayed with the black avatar via the services from the first function to the fourth function. Because the member displayed with the black avatar is a non-user, a first type of processing displays information that communication via the services from the first function to the fourth function is impossible on a screen (first processing). A second type of processing invalidates an operation for communicating via the services from the first function to the fourth function (second processing). A third type of processing prompts the member to perform a procedure (registration) to receive the services from the first function to the fourth function to the member (third processing).

Figure 11A:
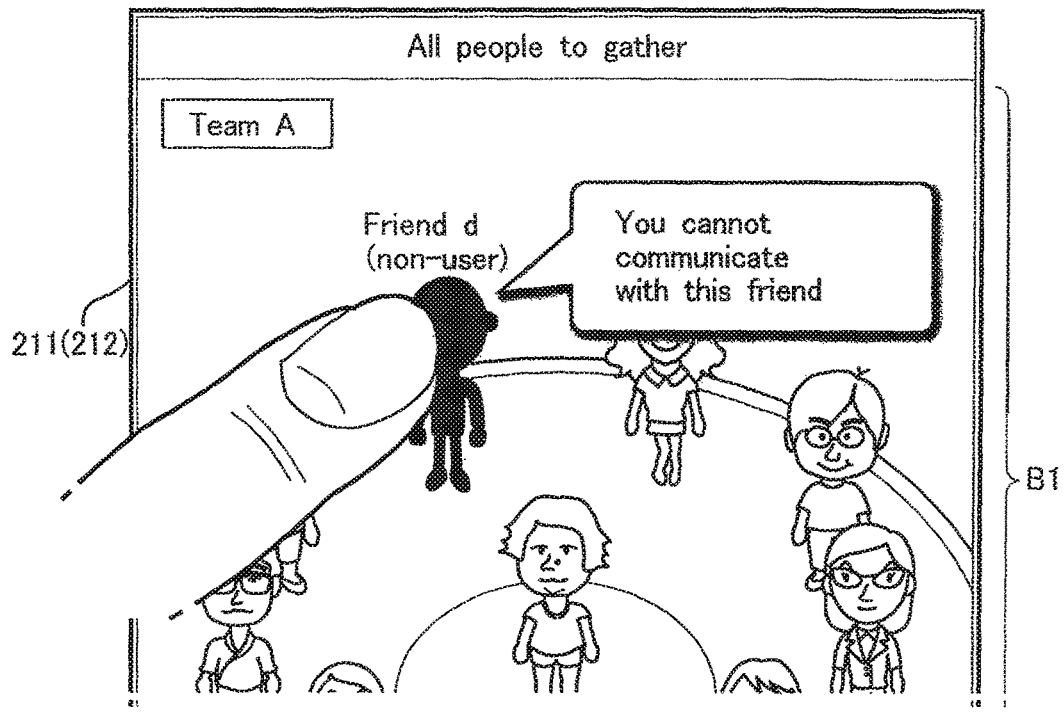
FIG. 11A is a drawing showing an example of a screen when an avatar of a non-user is selected.

As the first processing, when the main person performs an operation to communicate, via the services from the first function to the fourth function, to the member of the black avatar, e.g., an operation of tapping the black avatar displayed in the display unit 211, the input instruction unit 251 supplies operation information indicating the operation to the display control unit 253. At this time, the display control unit 253 directs the drawing unit 252 to present the following warning screen. In the display unit 211, as shown in FIG. 11A, for example, information that the member of the tapped black avatar is a non-user and communication via the services from the first function to the fourth function is impossible is displayed in a popup.

Figure 11B:
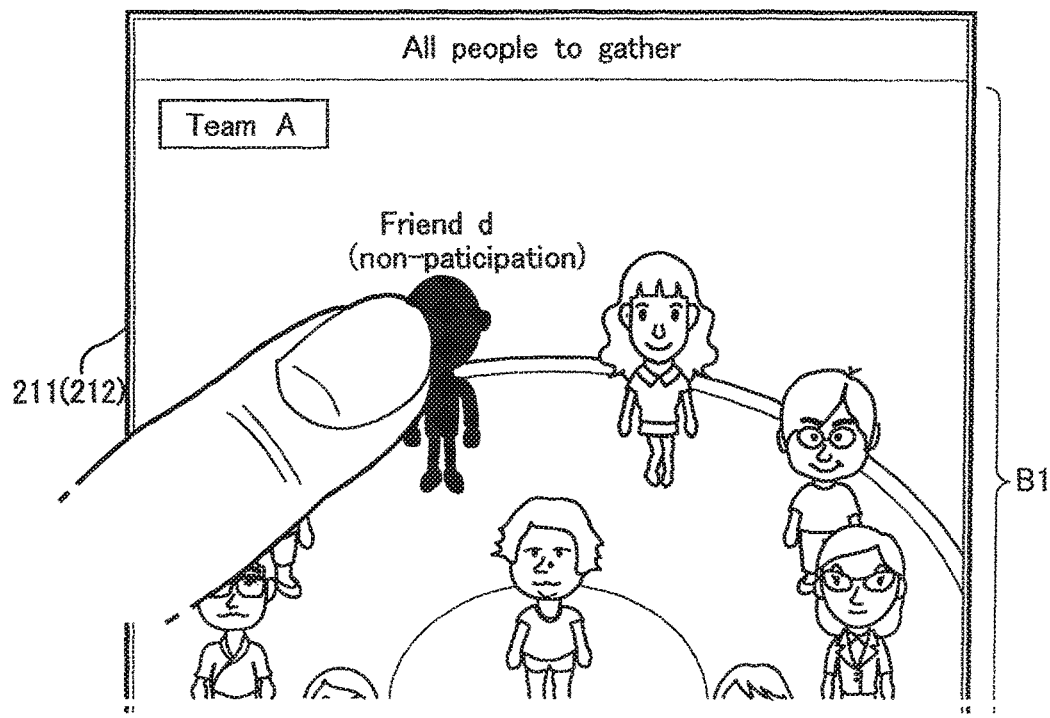
FIG. 11B is a drawing showing an example of a screen when an avatar of a non-user is selected.

As the second processing, for example, when the main person performs an operation of tapping the black avatar, the operation information is supplied from the input instruction unit 251 to the display control unit 253 similarly as in the first processing, but the display control unit 252 determines that the operation is invalid, and it does not proceed to processing to communicate. Therefore, as shown in FIG. 11B, no indication is changed even if the main person taps the black avatar in the display unit 211.

Figure 12A:
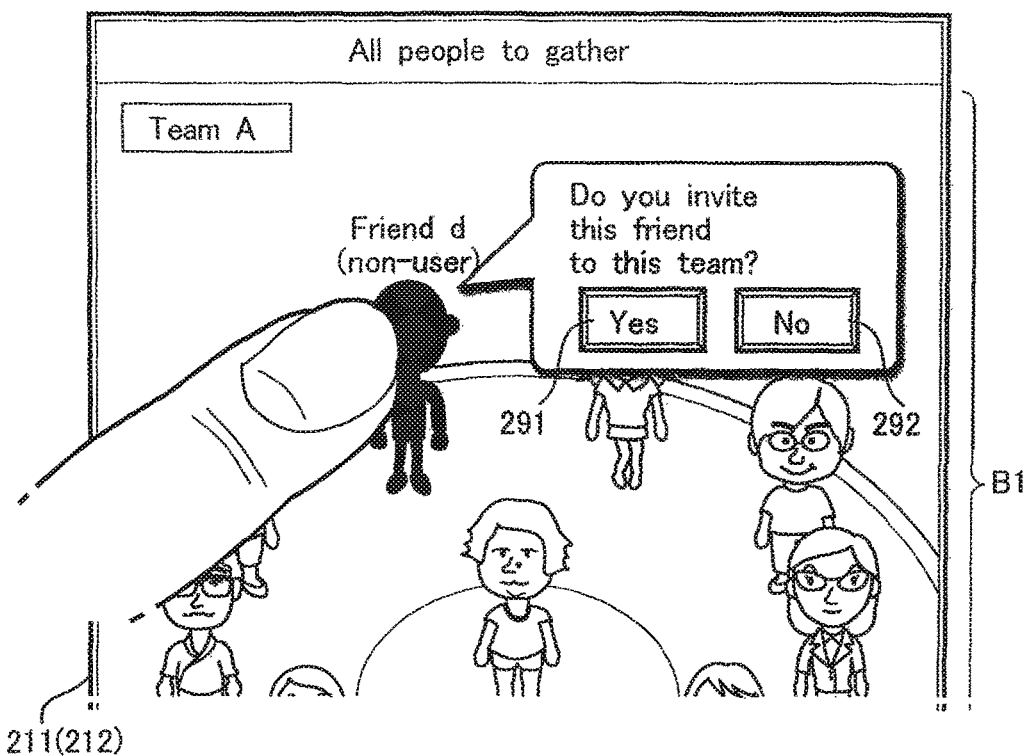
FIG. 12A is a drawing showing an example of a screen when an avatar of a non-user is selected.
Figure 12B:
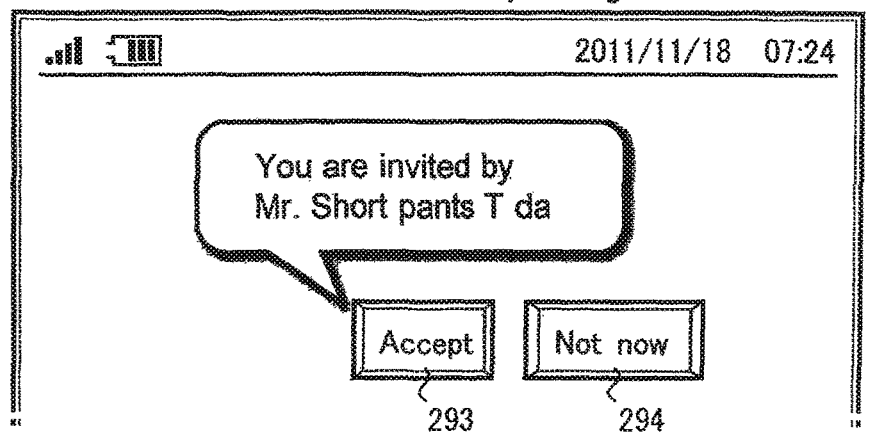
FIG. 12B is a drawing showing an example of a screen when an avatar of a non-user is selected.

As the third processing, for example, when the main person performs an operation of tapping the black avatar, the operation information is supplied to the display control unit 253 from the input instruction unit 251, so that the display control unit 253 instructs the drawing unit 252 to display the following content. That is, in the display unit 211, for example, as shown in FIG. 12A, a screen to confirm whether or not the friend corresponding to the black avatar is to be invited to join the services from the first function to the fourth function is displayed in a popup. On a confirmation screen, for example, a software button 291 specifying an invitation and a software button 292 specifying a non-invitation are displayed. When the software button 292 is operated, the display of the confirmation screen is completed. When the software button 291 is operated, the management unit 152, which receives the operation information through the acceptance unit 151 from the input instruction unit 251, instructs the SNS server 50 to notify the invitation to a terminal device of the member corresponding to the black avatar. By the instruction, the SNS server 50 makes the terminal device of the member (non-user at this stage) display a notice screen of the invitation as shown in FIG. 12B, for example. On the notice screen, a software button 293 specifying approval of the invitation, a message indicating that the member has been invited, and a software button 294 specifying refusal are displayed, for example. When the software button 294 is operated, the display of the notice screen is completed. When the software button 293 is operated, processing is proceeded to display a site for performing a procedure as a user who can receive the services from the first function to the fourth function. The member will be registered as the user by setting an avatar indicating the member himself in the site.

As described above, upon providing the service using the first function, the terminal device 20 acquires messages, which are transmitted in the group in which the first user (main person) using the main person's terminal device and multiple second users using other terminal devices are registered in the first service (SNS), from the service device (SNS server 50) corresponding to the first service (SNS), and makes the display unit 211 display the acquired messages. The terminal device 20 includes a service providing unit (drawing unit 252 and display unit 211) which provides the second service (any or all of the services from the first function or the second function to the fourth function) different from the first service (SNS) to a user who registers a user image (e.g., an avatar), and the display control unit 253 making the display unit 211 display user images corresponding to each of specific users (user or non-user) who are some or all of the multiple second users and a user image corresponding to the first user. The display control unit 253 makes the display unit 211 display a prescribed image (e.g., a black avatar) as a user image of a person (non-user) to whom the second service is not provided among the specific users. As a result, even if the second service differing from the first service is provided on the basis of the first service, the first user (main person) can easily distinguish a user receiving the second service and a non-user who does not receive the second service. The second service is a service using a user image (e.g., an avatar) and, for example, is a community service such as a bulletin board, a chat, a game, etc.

Note that the specific user may be a subset of users satisfying a predetermined selection condition among multiple users. The predetermined selection condition may be one having a property in which the specific users change over time, in which a user is a person of high rank in the number of recent posts or responses or both posts and responses, or is a person of high rank in the number of total posts or responses or both posts and responses, among multiple users, for example. It may be one having a property in which the specific users do not change over time, such as when a user from among the multiple users is preselected by any user.

When a user image (e.g., an avatar) except for the prescribed image (e.g., a black avatar) is selected among user images corresponding to the specific users, it is preferable that the service providing unit provide the second service interacting with the specific user corresponding to the selected user image. When the prescribed image corresponding to a specific user is selected, it is preferable that the service providing unit not provide the second service interacting with the specific user. Furthermore, when the prescribed image is selected, the display control unit 253 may make the display unit 211 display a screen indicating that the second service cannot be provided, may invalidate the selection, and may make the display unit 211 display a confirmation screen confirming whether or not the specific user corresponding to the selected prescribed image is to be invited.

In the first function, the following application and modification are possible. For example, in FIG. 4, the drawing unit 252 and the display control unit 253 are provided in the terminal device 20, but they may be provided in the management server 10 as shown in FIG. 13. By this configuration, for example, the drawing unit 252 of the management server 10 reads image information of an avatar stored in the image storage unit 121 through the management unit 152, creates a web screen, in which the avatar is arranged, at a spot indicated by the arrangement information of the avatar, and transmits the web screen to the terminal device 20. The terminal device 20 displays the web screen by a browser. According to this[e] configuration, it is possible to reduce a load in the terminal device 20 because it is not necessary to store the image information of the avatar in the terminal device 20, and drawing processing of avatars is unnecessary.

Note that, in FIG. 4, the user registration table, the group table and the image storage unit 121 are built in the management server 10, and the image storage unit 261 is built in the terminal device 20. However, if they can be accessed from the management server 10 or the terminal device 20 in the message-browsing system 1, these tables and the storage unit may be built in an external server, other than the management server 10 and the terminal device 20.

<Second Function>

Then, in the message-browsing system 1, an operation when the service of the second function is provided will be described.

Figure 14:
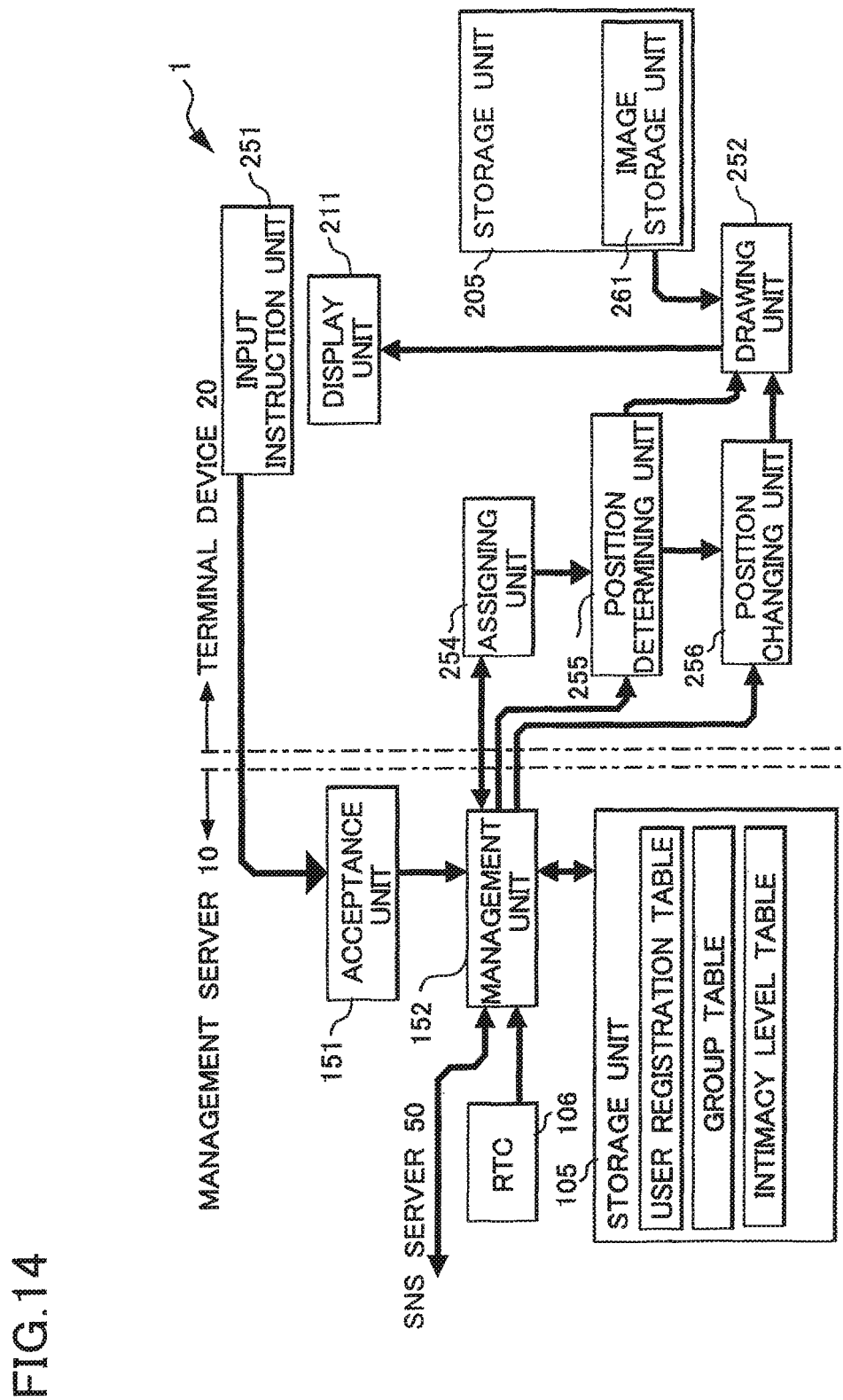
FIG. 14 is a diagram showing a function block built when an avatar is arranged.

FIG. 14 is a drawing showing a function block that is built to provide the service of the second function in the message-browsing system 1. As shown in the drawing, an assigning unit 254, a position determining unit 255 and a position changing unit 256 are added to the function block (refer to FIG. 4) when the service of the first function is provided in the terminal device 20. In the storage unit 105 in the management server 10, an intimacy level table is managed in addition to the user registration table and the group table.

The intimacy level table is a table storing a value (called the "intimacy level") indicating degree of intimacy in a direction from a reference user to a target user as shown in FIG. 15. Note that directionality is important because the intimacy level is a value in the direction from the reference user to the target user in the embodiment. That is, as for the intimacy level between a user A and a user B, the intimacy level when the user A is the reference user and the user B is the target user does not always agree with the intimacy level when the user B is the reference user and the user A is the target user. The mean value of the sum of both values may be treated as the intimacy level without considering the directionality.

Furthermore, for example, in the embodiment, the intimacy level includes integer values from "0" to "32". The intimacy level increases, for example, when an increase level condition (first condition) as shown in FIG. 16 is satisfied, and decreases when a decrease level condition (second condition) as shown in FIG. 16 is satisfied. Note that time information of last update time indicating the time at which the cause of the last change in the intimacy level was generated is associated with the intimacy level to be stored in the intimacy level table.

Figure 17:
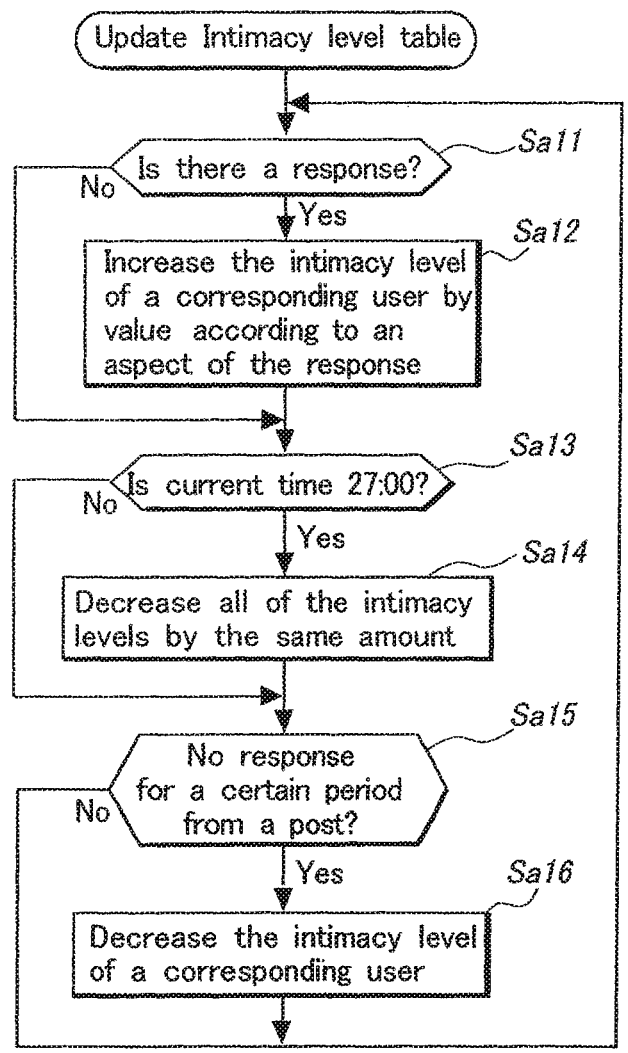
FIG. 17 is a flow chart showing the update disposal of intimacy level tables.

FIG. 17 is a flow chart showing update processing of the intimacy level table. The acceptance unit 151 determines whether any of users have given a response from the last processing time up to the current time in any of the terminal devices 20 (step Sa11). If there is a response (if a determining result of step Sa11 is "Yes"), the acceptance unit 151 notifies the management unit 152 of the content of the response and the form, and the management unit 152 identifies a reference user and a target user according to the content and the form of the response in the intimacy level table, and increases the intimacy level in the direction from the reference user to the target user by values according to aspects of the response (step Sa12).

For example, when a certain user (target user) provides a response to a post of another user (reference user) in a form of a comment, the intimacy level in the direction from the reference user to the target user is increased by a value of "5" (refer to FIG. 16, (1)). Also, when a certain user (target user) gives a response to a post of another user (reference user) in a form ("cracker", "Gee!", "like") other than a comment, the intimacy level in the direction from the reference user to the target user is increased by a value of "3" (refer to FIG. 16, (2)). In addition, the intimacy level is increased when there are responses as shown in (3) to (5) of FIG. 16. Because the response from the target user to the post of the reference user is a phenomenon to generate a kind of affinity for the reference user, it is configured so that the intimacy level in the direction from the reference user to the target user is increased in the embodiment. If there is no response by the target user (if the determining result of step Sa11 is "No"), the update of the table in step Sa12 is skipped.

The management unit 152 determines whether or not the current time indicated by the time information of an RTC 106 has passed 27:00 (3:00 a.m.) (step Sa13). If the determination result is "Yes", the management unit 152 uniformly decreases all of the intimacy levels by a value of "1" (step Sa14). Thereby, the intimacy levels for all users are decreased by a value of "1" every day at 27:00 (refer to FIG. 16, (6)). If the current time is before 27:00 or after 27:00, so that processing of uniformly decreasing the intimacy levels is completed (the determining result of step Sa13 is "No"), the update of the table in step Sa14 is skipped.

The management unit 152 determines whether or not there is a post for which a certain period of time (e.g., 5 days) has passed from the date and time of the post by a certain user up to the current time, and to which a friend has not provided a response by referring to the post-response history (step Sa15). Note that because "comments" among posts and responses are stored in the SNS server 50, and responses with forms other than the "comment" are stored in the management server 10, the management unit 152 accesses both the SNS server 50 and the storage unit 105 to acquire the post-response history. If the determining result of step Sa15 is "Yes", the management unit 152 decreases the intimacy level in a direction from the friend (main person) to a user giving the post (target user) by a value of "3" (step Sa16). As a result, when a friend does not provide a response to a post by a certain user in a certain period of time, the intimacy level in the direction from the friend to the user giving the post is decreased (refer to FIG. 16, (7)).

If the determining result of step Sa15 is "No" or after processing of step Sa16, processing returns to step Sa11. As a result, because processing from step Sa11 to step Sa16 is performed repeatedly, the intimacy level table will be updated according to responses and the time elapsed.

Avatar arrangement processing for arranging avatars according to contents of the intimacy level table will be described.

Figure 18:
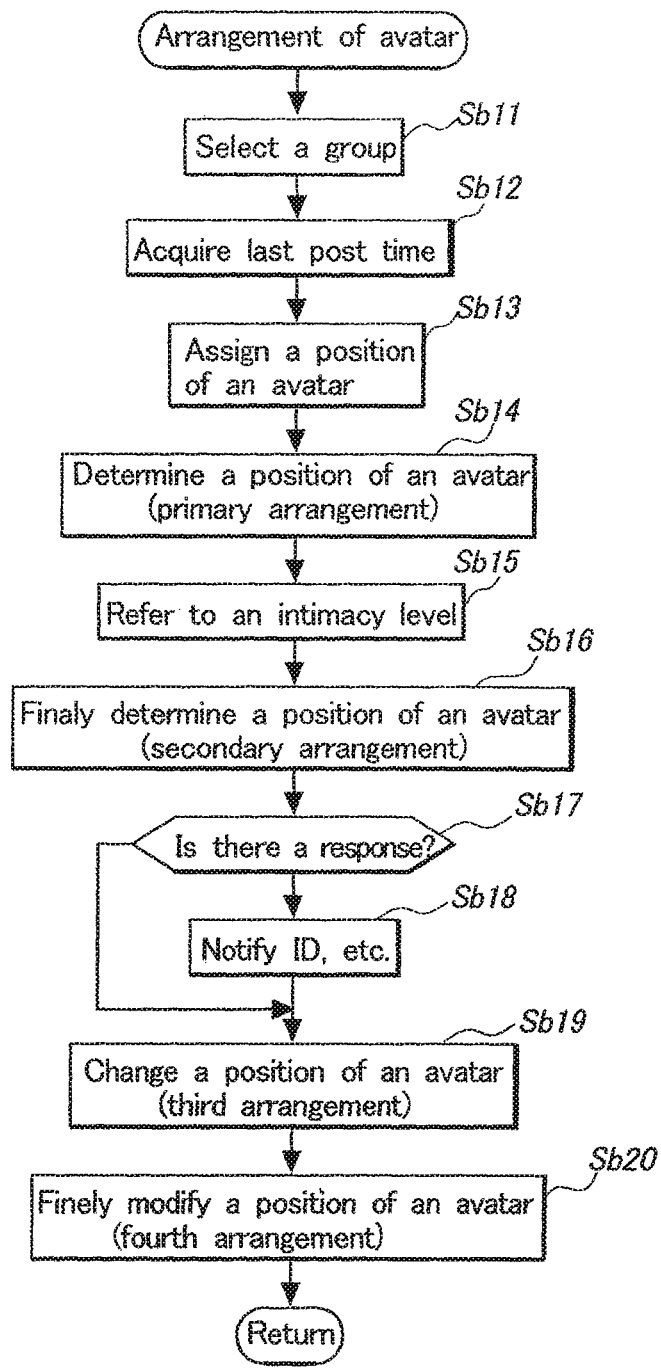
FIG. 18 is a flow chart showing arrangement processing of avatars.

FIG. 18 is a flow chart showing the avatar arrangement processing. The main person desiring the service by the second function indicates that the main person wants to receive the service by performing a touch operation, etc., to the input instruction unit 251 in the terminal device 20, and selects a group that the main person wants to be displayed. The input instruction unit 251 outputs the group ID of the selected group with the user ID of the main person, and the acceptance unit 151 notifies the management unit 152 of information of the user ID and the group ID (step Sb11).

First, the management unit 152 identifies member IDs of friends except for the main person among members of the group identified by the user ID and the group ID with reference to the group table. Second, the management unit 152 notifies the SNS server 50 of the acquired member IDs, and acquires posts by the members of the group from the SNS server 50. Third, the management unit 152 notifies the assigning unit 254 in the terminal device 20 of the acquired posts. Fourth, the assigning unit 254 acquires the last post times for respective ones of all the friends included in the group from transmission dates and times included in the notified posts (step Sb12). Note that the latest post time is the time when the friend last contributed the post.

The assigning unit 254 assigns avatars corresponding to the friends in the group to reference positions in a descending order of the last post time according to a predetermined rule, and notifies the position determining unit 255 of the assigning result (step Sb13). In the embodiment, the reference positions of avatars corresponding to users of the group are basically arranged on a virtual circle having its center at the avatar of the main person in a plan view and on spots keeping a certain distance between the avatar of the main person and each of the avatars corresponding to the users. It is configured so that a display position is changed from a basic arrangement described above depending on the post, the response, and the intimacy level. Note that because displaying the arrangement in the plan view on the display unit 211 is not stereoscopic, the arrangement is displayed in an aerial view as an example, described later, in the embodiment. However, because there is a case in which sense of distance cannot be appropriately represented in the aerial view, the arrangement and the distance are described in a plan view.

Figure 19:
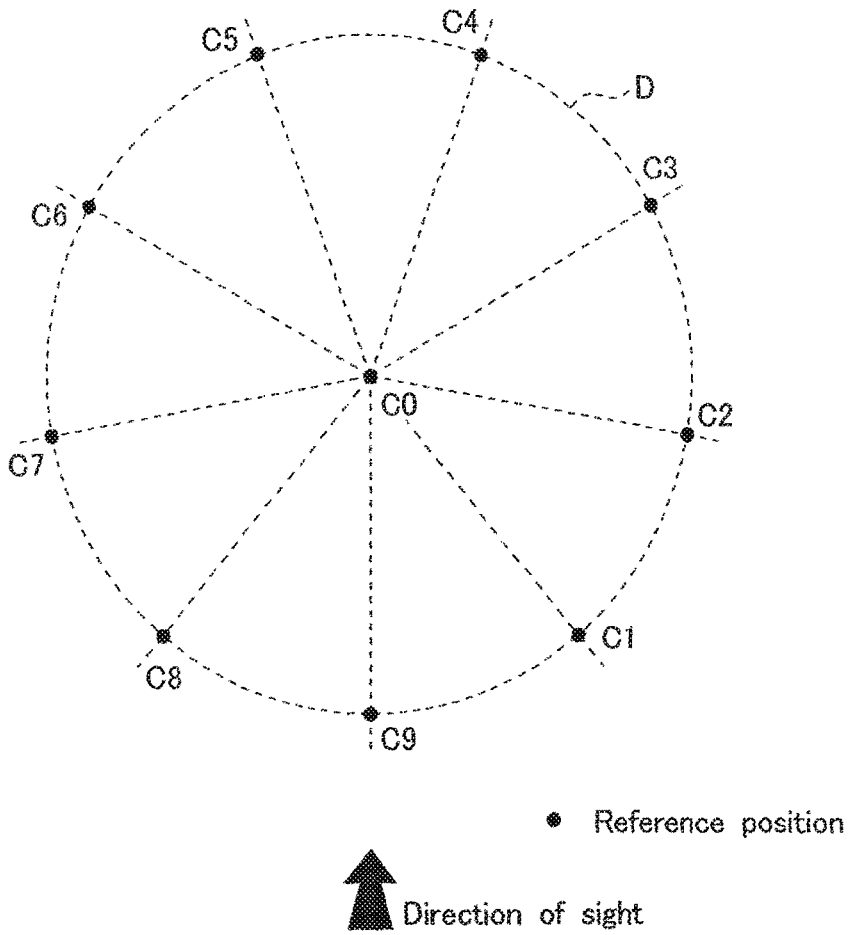
FIG. 19 is a plan view for describing reference positions of avatars.

FIG. 19 is a plan view to describe a basic arrangement. In the drawing, C0 is a spot that becomes a reference when avatars corresponding to members of a group are arranged. An intersection point of circumference D having its center at the spot C0 and a straight line extending to a direction of 6:00 viewed from the spot C0 is a spot C9. Spots C8, C7, C6, C2, and C1 are sequentially arranged clockwise from the spot C9 at equal distance. In other words, the spots C1 to C9 are intersection points between nine radial straight lines rotated sequentially around the spot C0 as a center by angle of 40 degrees and the circumference D.

Figure 20:
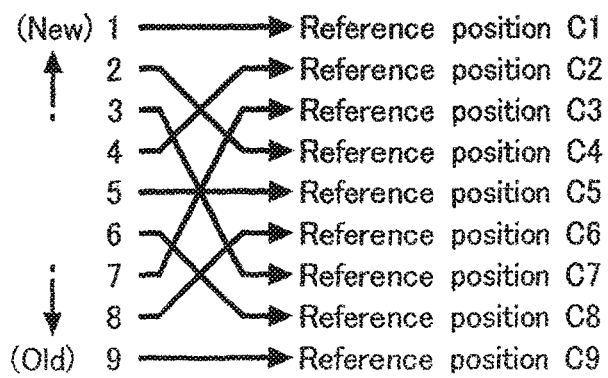
FIG. 20 is a drawing showing relationships between reference positions and avatars assigned in order of time when a post is conducted.

The assigning unit 254 assigns the avatar of the main person to the spot C0, and assigns the avatars of the friends to the spots C1 to C9 in order of the last post time according to a rule as shown in FIG. 20. In the embodiment, the reason for assigning avatars using such a rule is as follows. That is, there is the possibility that friends with relatively recent last post times tend to actively contribute posts, so that a display image is difficult to view if such friends are assigned to spots side-by-side on the circumference D. To avoid this, the avatars are arranged according to the rule. In short, this is because ease of viewing of the display image is secured by distributing avatars of friends who may actively contribute posts. Furthermore, the spots C0 to C9 become references when avatars assigned to respective spots are displayed. Therefore, each of the spots C0 to C9 is a reference position of an avatar assigned to each spot.

When there is a friend with a last post time exceeding, for example, three days from the current time, the assigning unit 254 assigns the avatar corresponding to the friend to a spot that is remaining after assigning avatars of friends with more recent last post time using an arbitrary rule (e.g., at random).

Therefore, the avatar of a friend with the last post time more than three days ago is assigned not in accordance with order of post time.

Note that, as for grounds for judgment (update date of a post) to assign an avatar to the reference position, the following, other than the last post time, may be adopted. For example, when a certain user contributes a post and there are one or more responses by the user (contributor) himself to the post, the last response time among response times of responses by the user himself may be adopted as the grounds of judgment for the user. Also, for example, when a certain user contributes a post and there are one or more responses by another user to the post, the last response time among response times of the responses may be adopted as the grounds for judgment for the user.

Figure 24:
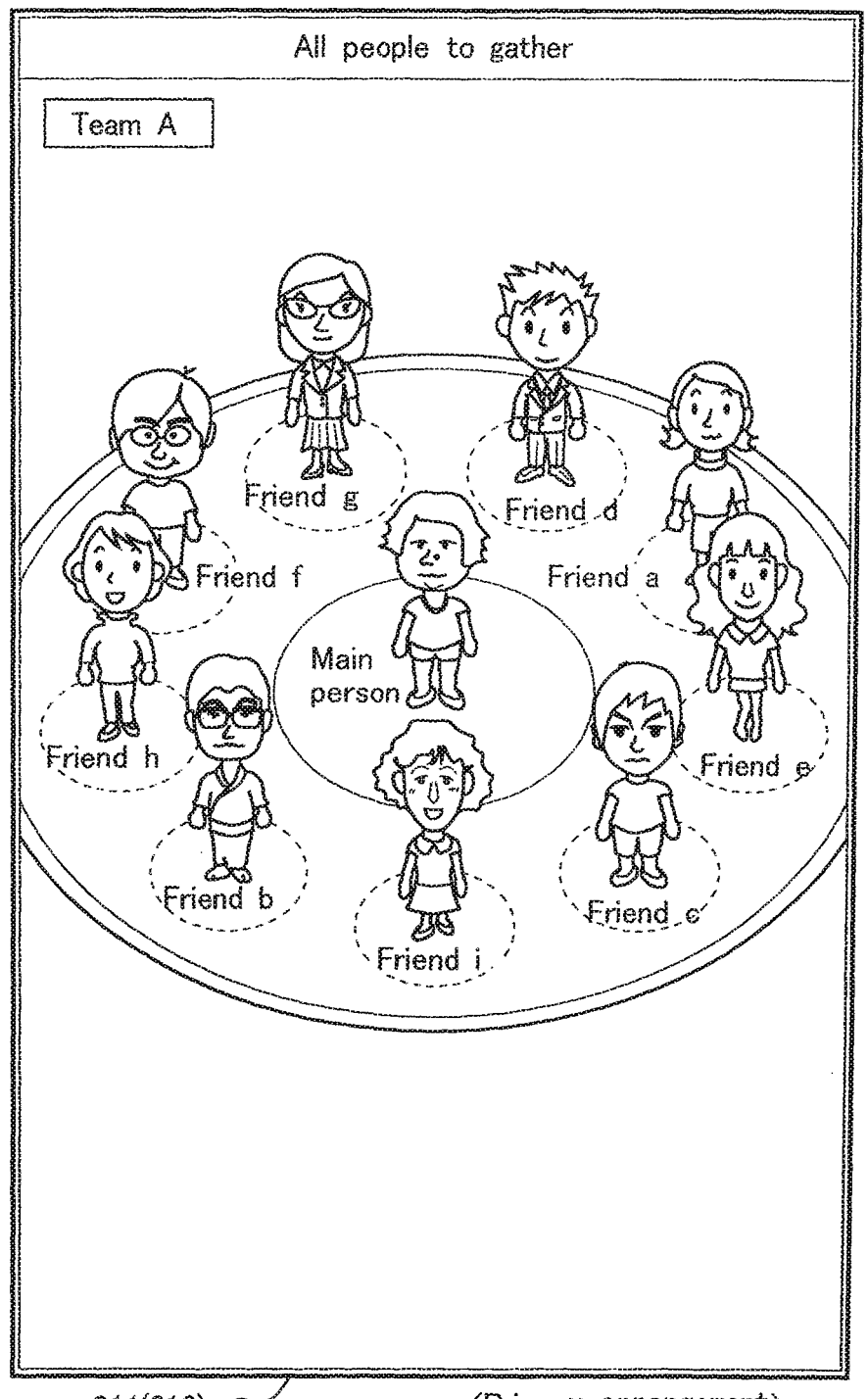
FIG. 24 is a drawing showing an example of a primary arrangement of an avatar.

Returning to the explanation to the flow chart of FIG. 18, the position determining unit 255 determines the reference position C0 as a standing position of the avatar corresponding to the main person, and temporarily determines reference positions assigned by the assigning unit 254 as standing positions of the avatars corresponding to the friends of the group (step Sb14). As a result, the position determining unit 255 determines a primary arrangement as shown in FIG. 24, for example. Note that, the primary arrangement of FIG. 24 is an example in a case in which avatars as shown in FIG. 7 correspond to the friends a to i, respectively, and an order of posts is the friends c, d, h, e, g, b, a, f, and then i when listed from a friend with the most recent post to one with the least, and the reference positions C1 to C9 are assigned according to the rule shown in FIG. 20.

Figure 23A:
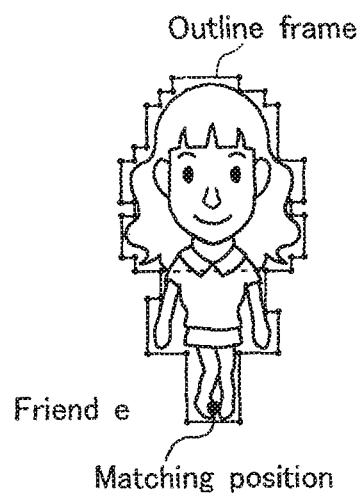
FIG. 23A is a drawing to describe small modifications of a drawing and a position of an avatar.
Figure 23B:
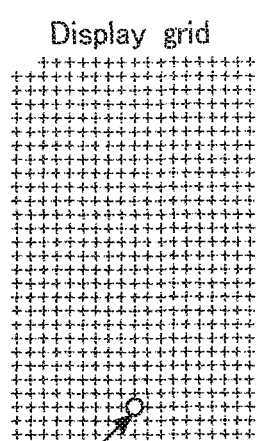
FIG. 23B is a drawing to describe small modifications of a drawing and a position of an avatar.
Figure 23C:
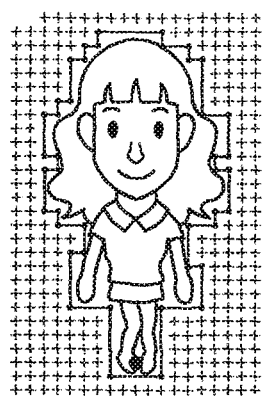
FIG. 23C is a drawing to describe small modifications of a drawing and a position of an avatar.

Details of determining of the standing position of the avatar will be described. The image information of an avatar read from the image storage unit 261 in the terminal device 20 is transferred from the storage unit 105 in the management server 10 as described above. In the avatar, a "matching position" such as on which a weight is centered and an outline frame of the avatar are prescribed in a unit of display grid in the display unit 211. This is shown in FIG. 23A for the avatar corresponding to the friend e. The display grid is a lattice point that is indicated by the "+" symbol in FIG. 23B, and grids are virtually arranged every multiple pixels in a vertical and horizontal directions in the display unit 211. The determining unit 255 determines the standing position of an avatar so that the "matching position" matches a grid closest to a pixel corresponding to the reference position among the display grids. The standing position of the avatar corresponding to the friend e is determined as shown in FIG. 23C. A position changing unit 256, described later, changes the standing position of the avatar after matching the matching position with the grid and simulating a state when drawing the avatar.

Note that the primary arrangement of step Sb14 is only used for the determination of the standing position of the avatar, so that the avatar in a state of the primary arrangement is not displayed on the display unit 211 in the embodiment. However, the avatar in a state of the primary arrangement may be displayed, as described later.

The management unit 152 reads the intimacy levels in which each of the members of the group is a reference user and other members are target users by referring to the intimacy level table, and supplies the read intimacy levels to the position determining unit 255 (step Sb15). The read intimacy levels have 90 combinations in total consisting of intimacy levels in a direction from the main person to friends (9 combinations), intimacy levels in a direction from each friend to the main person (9 combinations), and intimacy levels in a direction from a certain friend to another friend (72 combinations).

The position determining unit 255 determines a spot which is changed from each reference position of each avatar in a direction toward the reference position of the avatar corresponding to the target user of each intimacy level relative to the main person or each friend, by a value of the corresponding intimacy level, as each of the standing positions of avatars corresponding respectively to the main person and the friends (step Sb16). Note that the determination in step Sb14 has a nuance of temporal determination because the avatar is simply assigned to the reference position in descending order of post time, whereas the determination in step Sb16 has a nuance of a final determination because the avatar is assigned in consideration of the intimacy level.

Figure 21:
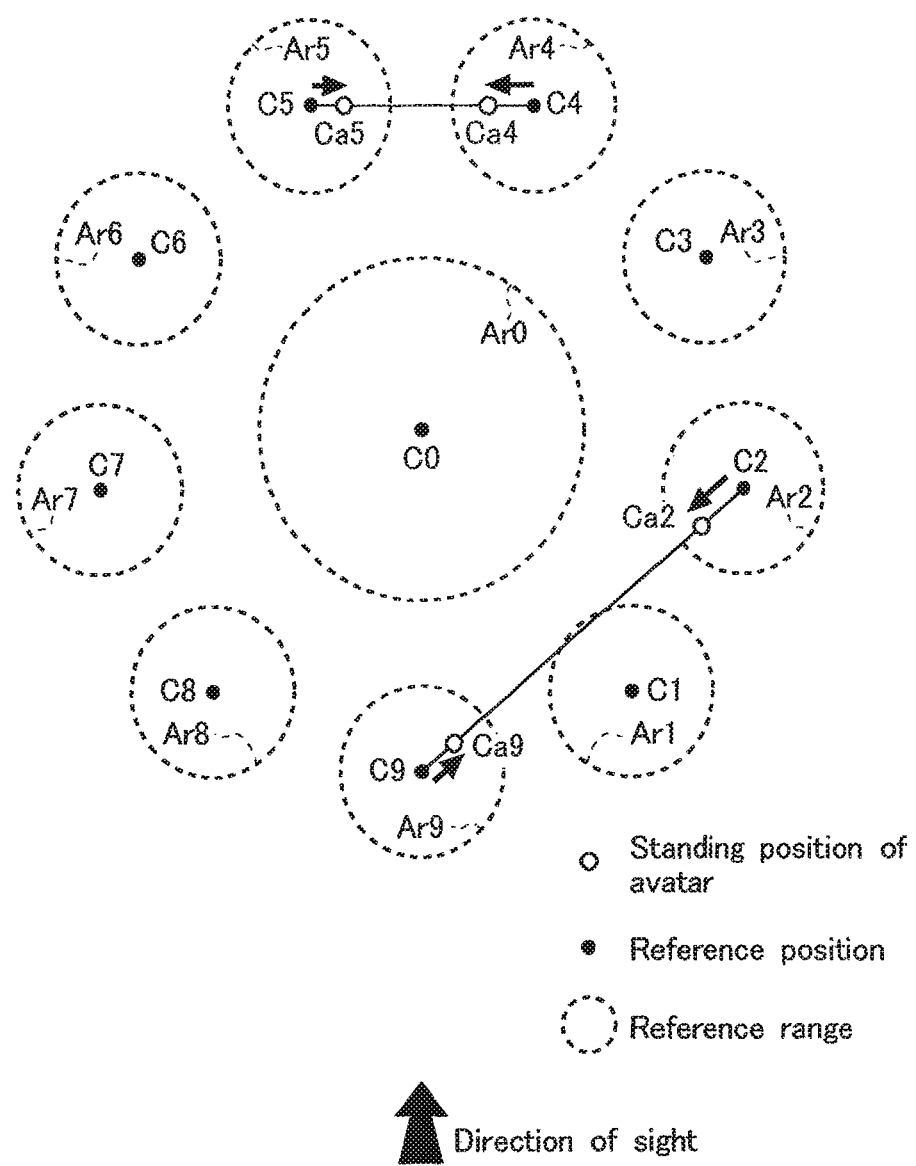
FIG. 21 is a drawing showing a state in which a position of an avatar is changed according to intimacy level.

FIG. 21 is a plan view indicating changes in the standing positions according to the intimacy level. In the drawing, a reference range Ar0 is an inside of a circle having its center at the reference position C0. Each of reference ranges Ar1 to Ar9 is also an inside of a circle having its center at each of the reference positions C1 to C9. Note that a radius of the reference range Ar0 is greater than each radius of the reference ranges Ar1 to Ar9, but the size relation between them may be freely decided.

For example, when a friend assigned to the reference position C9 and a friend assigned to the reference position C2 repeat posts and responses with each other, the respective intimacy levels between the friends are increased. Therefore, as shown in the drawing, the position determining unit 255 moves, in a direction from the reference position C9 toward the reference position C2, the avatar corresponding to the friend (reference user) assigned to the reference position C9 to a standing position Ca9, which has a distance corresponding to the value of the intimacy level in a direction from the friend (reference user) assigned to the reference position C9 to the friend (target user) assigned to the reference position C2.

Similarly, the position determining unit 255 also moves, in a direction from the reference position C2 toward the reference position C9, the avatar corresponding to the friend (reference user) assigned to the reference position C2 to a standing position Ca2, which has a distance corresponding to the value of the intimacy level in a direction from the friend (reference user) assigned to the reference position C2 to the friend (target user) assigned to the reference position C9. Note that this example shows a case in which the intimacy level in the direction from the friend of the reference position C2 to the friend of the reference position C9 is greater than the intimacy level in the direction from the friend of the reference position C9 to the friend of the reference position C2.

Also, for example, when a friend assigned to the reference position C4 and a friend assigned to the reference position C5 repeat posts and responses with each other, the respective intimacy levels between the friends are increased. Therefore, the position determining unit 255 moves, in a direction from the reference position C4 toward the reference position C5, the avatar corresponding to the friend assigned to the reference position C4 to a standing position Ca4, which has a distance corresponding to the value of the intimacy level in a direction from the friend assigned to the reference position C4 to the friend assigned to the reference position C5. The position determining unit 255 moves, in a direction from the reference position C5 toward the reference position C4, the avatar corresponding to the friend assigned to the reference position C5 to a standing position Ca5, which has a distance corresponding to the value of the intimacy level in a direction from the friend assigned to the reference position C5 to the friend assigned to the reference position C4.

Figure 25:
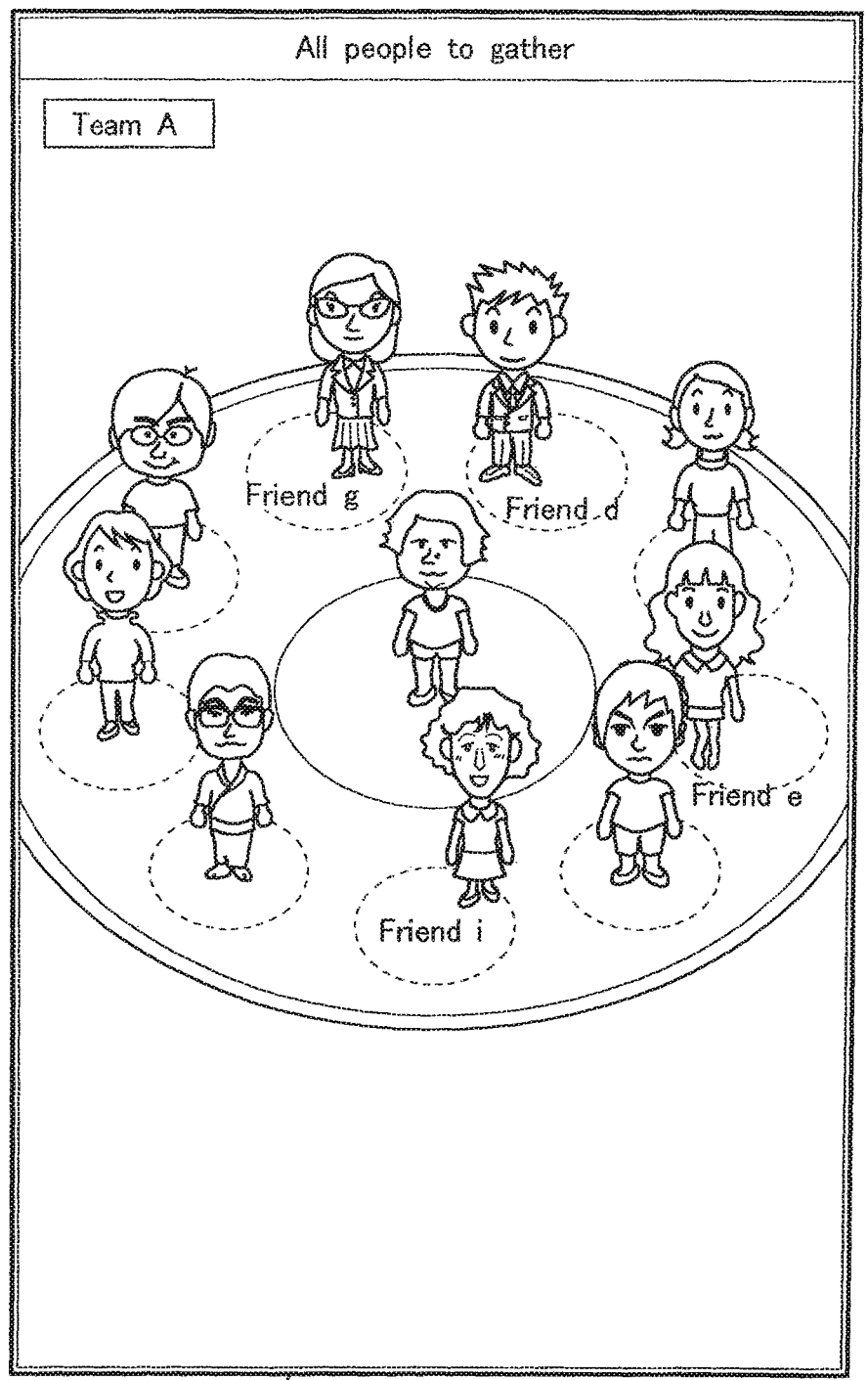
FIG. 25 is a drawing showing an example of a secondary arrangement of an avatar.

The position determining unit 255 finally determines spots according to the intimacy levels as the standing positions of the avatars corresponding to the main person and the friends (secondary arrangement). In the embodiment, the avatars in a state of the secondary arrangement are not displayed on the display unit 211 as in the case of the primary arrangement, but the avatars in the state of the secondary arrangement may be displayed, as described later. A screen example in which the avatars in the state in the secondary arrangement are displayed is shown in FIG. 25, and corresponds to an example of the arrangement shown in FIG. 21.

Movement amount corresponding to the maximum value of "32" of the intimacy level is equal to a radius of each of the reference ranges Ar1 to Ar9. Therefore, the avatar does not get outside of the reference range even if the standing position is moved from the reference position according to the intimacy level. Furthermore, the explanation describes the intimacy level in a direction from the reference user to one target user, but there is a case in which intimacy levels from the reference user to multiple target users are generated. When the intimacy levels from the reference user to multiple target users are generated, the position determining unit 255 moves the avatar corresponding to the reference user to a center of balance of a point set of spots to each of which the avatar is assumed to be moved according to each intimacy level in corresponding direction from the reference user to each target user.

In a flow chart shown in FIG. 18, the management unit 152 determines whether or not posts by members of the group are associated with responses by other members of the group by referring to the post-response history for each of the members of the group (step Sb17). If there is a response to a post (if a determination result of step Sb17 is "Yes"), the management unit 152 notifies the position changing unit 256 of all pairs of user IDs of a user who has contributed a post and a user giving a response to the post (step Sb18). Note that if there is no response to a post (if the determination result of step Sb17 is "No"), the processing of step Sb18 is skipped.

Then, the position changing unit 256 changes the standing positions of the avatars corresponding to the members according to responses (step Sb19). Specifically, when a post by a member of the group is associated with a response by another member of the group, the position changing unit 256 changes the standing position of a responder, who is the member giving the response, to a near-contributor position which is a position near the standing position of the avatar corresponding to a user who has contributed the post (third arrangement).

Figure 22:
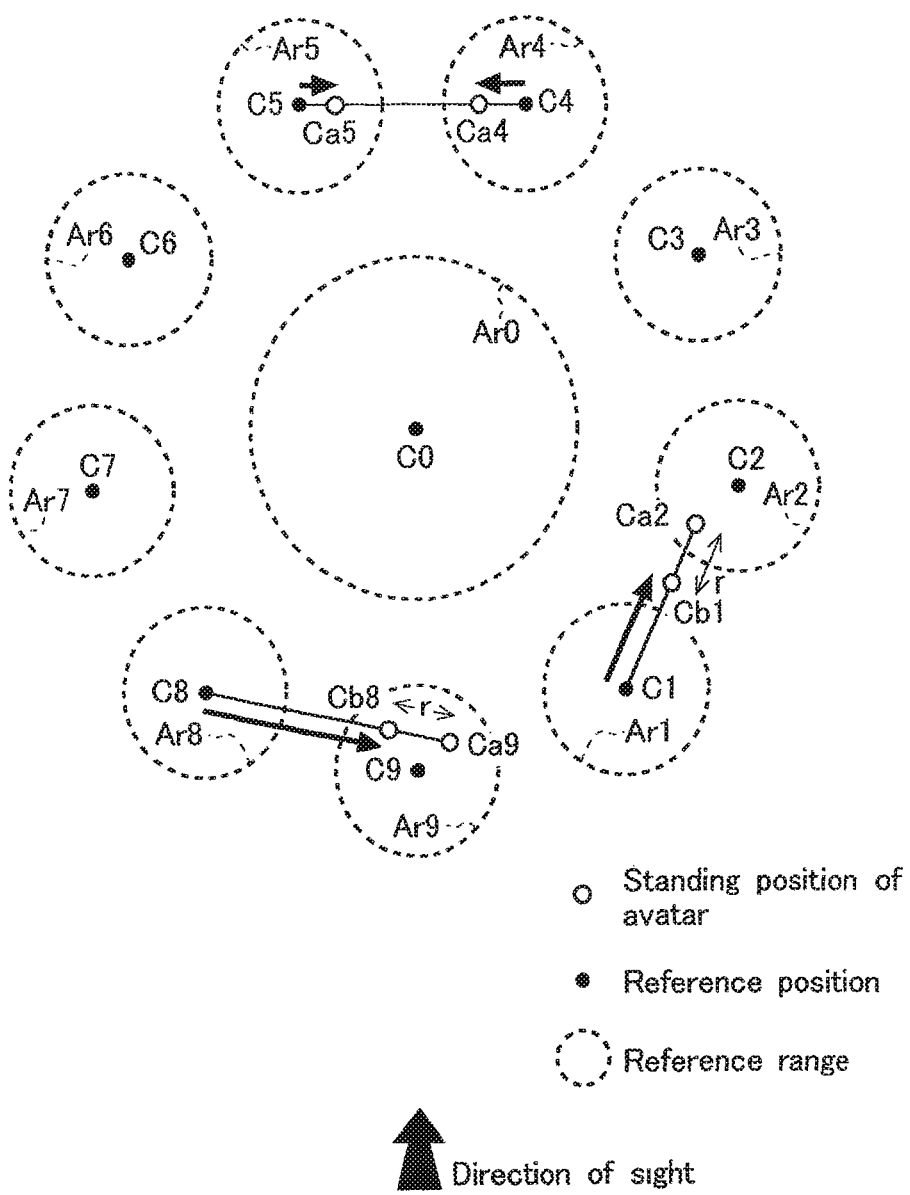
FIG. 22 is a drawing showing a change of a position of an avatar when a response is given.

FIG. 22 is a plan view showing the approach of the position. In the drawing, in the embodiment, the near-contributor position is a spot distant from the standing position of the avatar corresponding to the contributor by distance r on a line connecting the reference position of the target responder and the standing position of the avatar of the contributor. For example, when the friend whose avatar is assigned to the reference position C1 gives a response to a post of the friend whose avatar is assigned to the reference position C2, the position changing unit 256 changes the standing position of the avatar assigned to the reference position C1 to a near-contributor position Cb1 facing the standing position Ca2 of the avatar assigned to the reference position C2. Furthermore, for example, when the friend whose avatar is assigned to the reference position C8 gives a response to a post of the friend whose avatar is assigned to the reference position C9, the position changing unit 256 changes the standing position of the avatar assigned to the reference position C8 to a near-contributor position Cb8 facing the standing position Ca9 of the avatar assigned to the reference position C9. Note that the near-contributor position is not limited to examples described above and the responder may approach the contributor beyond the reference range of the responder. Therefore, the near-contributor position may be a spot distant from the reference position of the contributor by the distance r.

Figure 26:
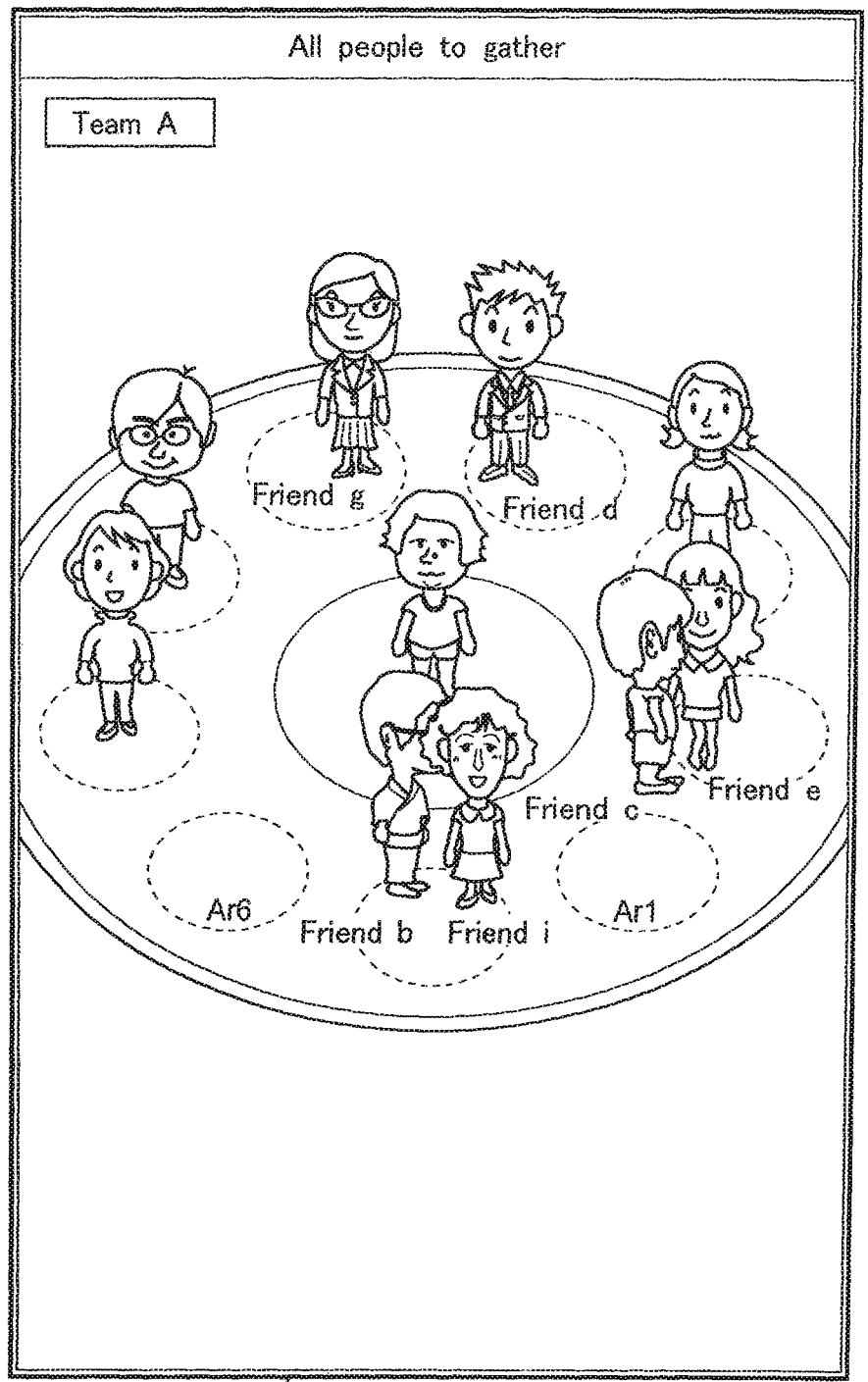
FIG. 26 is a drawing showing an example of a third arrangement of an avatar.

In the embodiment, the avatars in a state of the third arrangement are not displayed in the display unit 211, but the avatars in the state of the third arrangement may be displayed, as described later. A screen example in which the avatars in the state in the third arrangement are displayed is shown in FIG. 26, and corresponds to an example of the arrangement shown in in FIG. 22.

As for the service by the second function, the display unit 211 may display the avatars in the display screen based on the third arrangement determined by the position changing unit 256. However, because a face of an avatar is concealed due to approach of another avatar by merely changing the standing position, there may be a case in which it is difficult to recognize which friend the avatar corresponds to at a glance. In an example of FIG. 26, a part of a face of the avatar corresponding to the friend e is concealed due to approach by the avatar of the friend c, and a part of a face of the avatar corresponding to the friend b is concealed by the avatar corresponding to the friend i due to the friend b himself approaching the avatar corresponding to the friend i. Thus, the position changing unit 256 slightly modifies the standing position of the avatar so that the faces are not concealed, as follows (step Sb20).

Figure 23D:
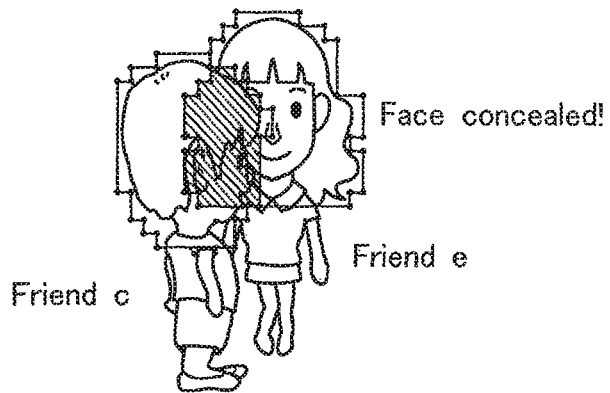
FIG. 23D is a drawing to describe small modifications of a drawing and a position of an avatar.
Figure 23E:
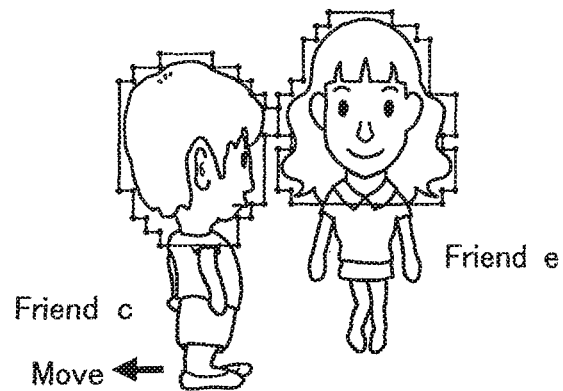
FIG. 23E is a drawing to describe small modifications of a drawing and a position of an avatar.
Figure 23F:
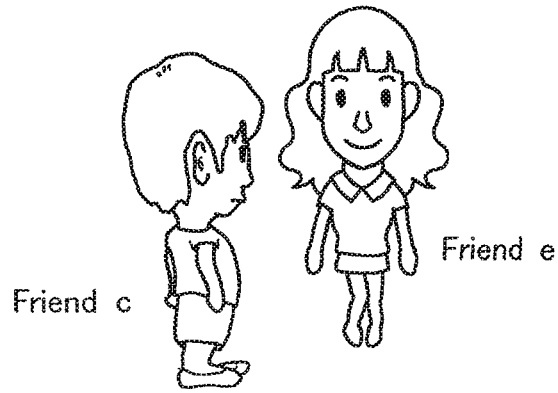
FIG. 23F is a drawing to describe small modifications of a drawing and a position of an avatar.

When outline frames prescribe a face as shown in FIG. 23D, a case in which a face part of an avatar is concealed is one in which outline frames prescribing face parts of avatars are overlapped with each other as shown by hatching. Therefore, when the position changing unit 256 determines that a face part of the avatar of the friend e and a face part of the avatar of the friend c will be overlapped by simulating drawings of the drawing unit 252 for example, the position changing unit 256 slightly modifies the standing position of the avatar of the friend c so that the avatar of the friend c approaching the avatar of the friend e is moved up to a spot in which the face part of the avatar of the friend e is not concealed (returned to an opposite direction to the approach direction) as shown in FIG. 23E, and acquires movement information reflecting the slight modification. The position changing unit 256 arranges the avatar relative to the slight modification again based on the changed movement information. As a result, even if the avatars approach each other as shown in FIG. 23F, the standing position is slightly modified so that each other's face parts are recognized. Note that in the third arrangement of FIG. 26, because a face part of the avatar of the friend b is concealed by the avatar of the friend i, the position changing unit 256 slightly modifies the standing position of the avatar of the friend b so that the avatar of the friend b approaching the avatar of the friend i is moved as far as to a spot in which the face part of the avatar of the friend b is not concealed (returned to an opposite direction to the approach direction), and acquires movement information reflecting the slight modification.

Figure 27:
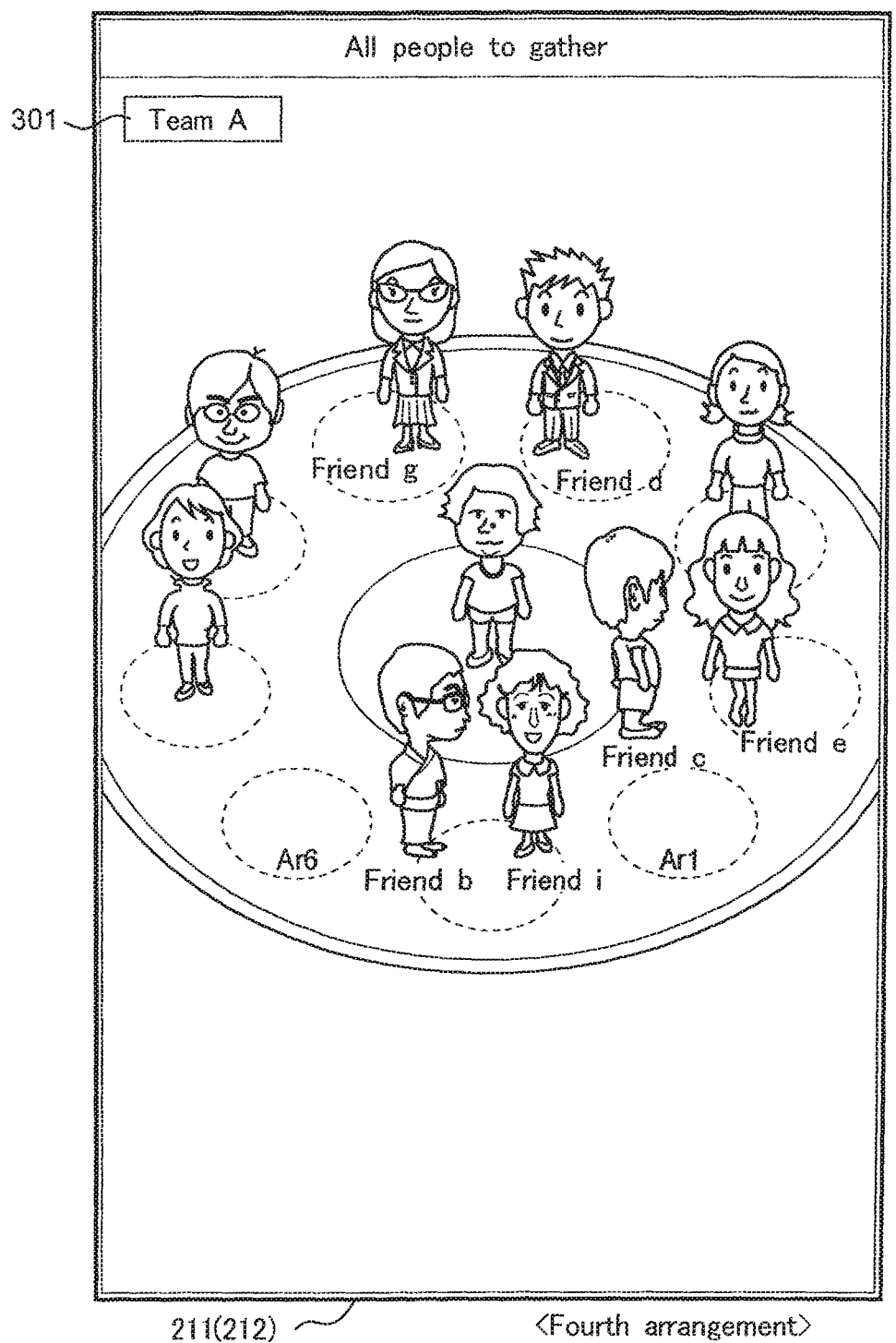
FIG. 27 is a drawing showing an example of a fourth arrangement of an avatar.

As a result, when the standing position is changed as shown in FIG. 27, for example, the arrangement of the avatars is modified so that the face parts of the avatars are not concealed (fourth arrangement). The position changing unit 256 outputs the fourth arrangement to the drawing unit 252, so that the drawing unit 252 reads image information of avatars corresponding to the members of the group from the image storage unit 261, and draws the avatars standing in the spots in the determined fourth arrangement together with a background.

After step Sb20, when another operation is indicated or an instruction of termination is indicated, this avatar arrangement processing is terminated after an arrangement state of the avatars is stored in the storage unit 205. After the termination, when a certain time has elapsed and implementation of the avatar arrangement processing is indicated again, contents of the intimacy level table will have been updated in a period until then. Therefore, the display positions of the avatars will be different from those at the time of the last implementation, and will have been changed according to posts, responses and intimacy levels at the time of the indication of the implementation. Particularly, when a post is contributed, not only is a last post time updated, but also assignment to the reference position will be changed. For example, when the avatar arrangement processing is performed again, and the fourth arrangement is determined, if motion is provided to the avatars so that each of the avatars moves by walking from the standing position of the avatars last displayed to the positions determined in the fourth arrangement this time, it is possible to visually recognize a change of the state from last time to this time by the motion of the avatars.

In the embodiment, the avatars of the members of the group is assigned to the reference positions as shown in FIG. 20 in order of posts, and the standing positions of the avatars approach each other as the intimacy levels between the members are higher. Furthermore, the avatar of the member giving a response to a post approaches the avatar of the contributor as far as the near-contributor position, and the standing position of the avatar is slightly modified so that the faces of avatars are not concealed. Therefore, according to the embodiment, the main person can easily and visually grasp the intimacy levels between the members of the group including the main person, in what kind of order posts are contributed to which member, and which member gives responses to posts of which member.

As described above, upon providing the service by the second function, the message-browsing system 1 provides a browsing service of messages exchanged by posts and responses to the posts between multiple users. The message-browsing system 1 includes: the assigning unit 254 that assigns user images (e.g., avatars) corresponding to multiple specific users, who are a subset or all of the multiple users, to reference positions that are equal to the number of the user images on a screen, respectively, in accordance with a predetermined rule; the position determining unit 255 that determines the reference positions assigned to the user images corresponding to the multiple specific users as display positions displaying the user images respectively; and the position changing unit 256 that changes a display position of a user image corresponding to a user giving a response to a post of another user to a position close to a user image corresponding to the other user who has contributed the post. As a result, user images (e.g., avatars) corresponding to multiple specific users, who are a subset or all of multiple users, are initially assigned to reference positions on the screen, and the reference positions are determined as display positions. Then, when a certain user gives a response to a post of another user, a display position of a user image corresponding to the user (responder) is changed to a position close to a user image corresponding to the other user (contributor) who has contributed the post. Therefore, it is possible to grasp users giving responses to posts of other users other than the main person at a glance.

Note that the specific users may be a subset of users satisfying a predetermined selection condition among multiple users. As the predetermined selection condition, it may be one having a property that the specific users change over time, in which a user is a person of high rank in the number of recent posts and responses or posts or responses, or is a person of high rank in the number of total posts and responses or posts or responses, among multiple users, for example. It may be one having a property that the specific users do not change with the lapse of time, in which a user is preselected by any user among the multiple users, for example.

In the second function, following various applications and modification are possible.

Because the near-contributor position does not reflect the intimacy level in the above-described example, it is impossible to grasp the intimacy level of a friend giving a response in the fourth arrangement. Therefore, when positions of the avatars are promptly changed from a state of the last arrangement to the standing positions indicated on the display screen in the fourth arrangement shown in FIG. 27, an opportunity to appropriately display the intimacy level for the friend giving a response at the standing position is lost. Thus, because the avatars are once displayed at the standing positions reflecting the intimacy levels on the display screen in the secondary arrangement if the avatars are displayed in order of states corresponding to the primary arrangement, the secondary arrangement, and the third arrangement on the display unit 211 as described above, the opportunity to appropriately display the intimacy levels for the members of the group at the standing position of the avatars is secured.

Figure 29:
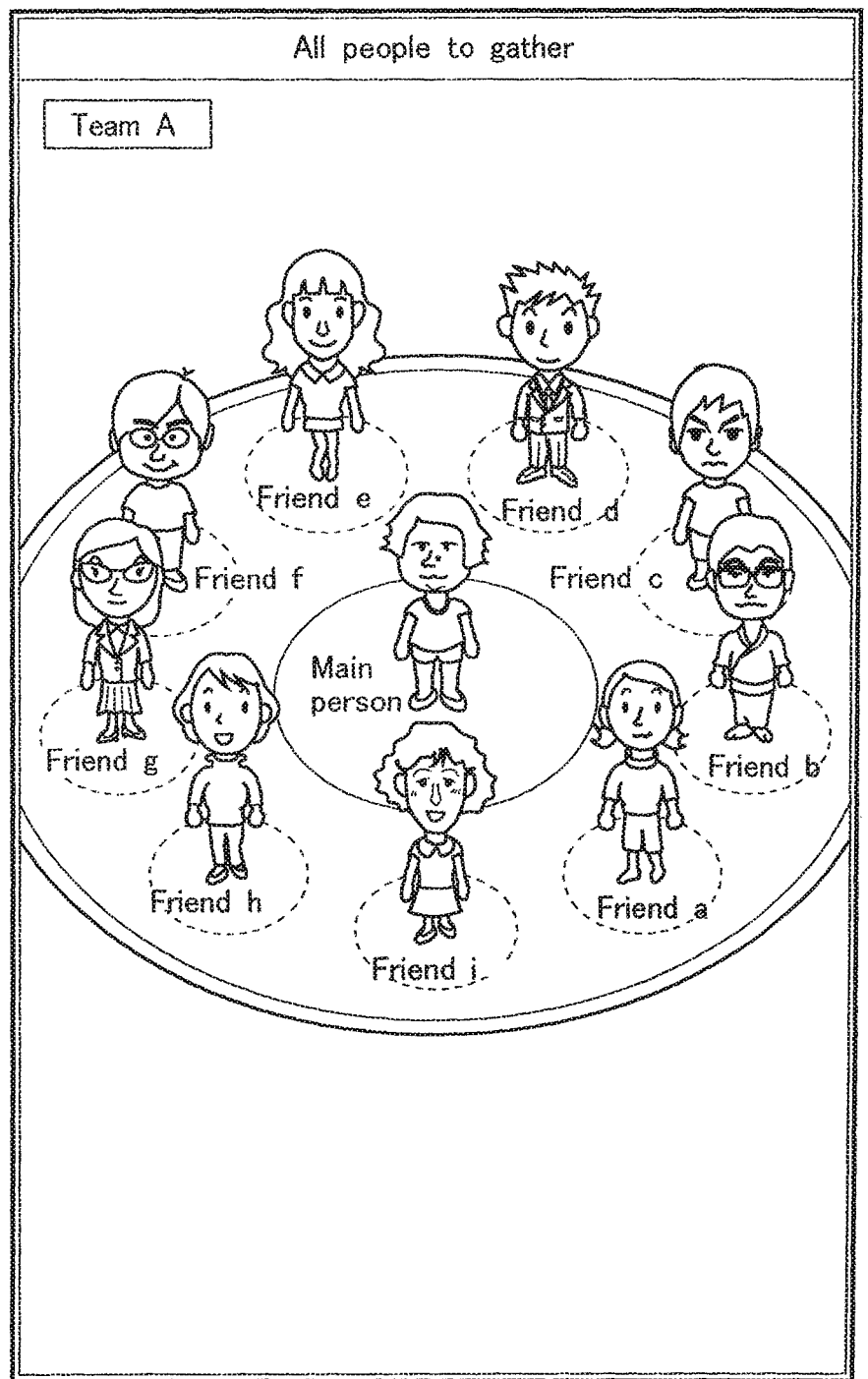
FIG. 29 is a drawing showing an example of an initial display screen of avatars according to other relationships.

Furthermore, in the primary arrangement, the avatars corresponding to the friends of the group are assigned to the reference positions in order of posts in accordance with the rule as shown in FIG. 20, but this rule is merely an example. Furthermore, the avatars corresponding to the friends may be fixedly assigned to the reference positions regardless of the order of posts. For example, as shown in FIG. 28, the avatars corresponding to the friends a to i registered in the group table may be assigned to the reference positions C1 to C9, respectively, fixed with the lapse of time regardless of the order of posts. The primary arrangement in which the avatars corresponding to the friends a to i are assigned fixedly to the reference positions C1 to C9, respectively, is shown in FIG. 29. In a case in which the avatars are assigned fixedly, after the termination of the display screen in the fourth arrangement, when a certain time has elapsed and implementation of the avatar arrangement processing is indicated again, even if contents of the intimacy level table have been updated in a period up until then, the reference positions assigned to the avatar in the primary arrangement are not changed. Therefore, in a case in which the avatars are assigned fixedly, the main person can easily recognize changes of the intimacy levels of the members including the main person.

Figure 30:
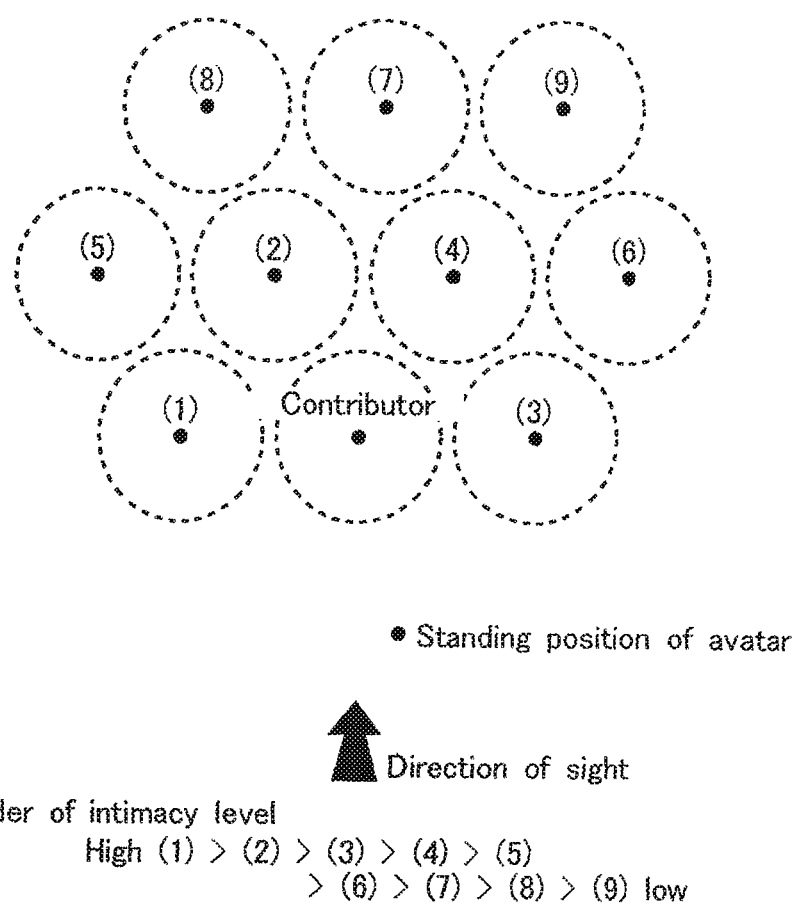
FIG. 30 is a drawing showing another arrangement of avatars corresponding to a user who contributes a response.

In the above-described example, the position of the avatar of the user giving a response to a post is changed from the position according to the intimacy level to the position close to the avatar of the contributor, but the present invention is not limited to this example. For example, as shown in FIG. 30, there are provided circular fixed locations (1) to (9) around the avatar of the contributor. When there are responses to the contributor, the avatars of the responders giving the responses may be arranged so that the avatars are assigned to fixed locations (1), (2), (3), . . . , (9) in descending order of the mean of the intimacy level in a direction from the contributor to one of the responders and the intimacy level in a direction from the one of the responders to the contributor. It is preferable that the arrangement be determined so that the avatars (faces) are not overlapped even if the avatars are drawn by matching center points of the fixed locations (1) to (9) with "matching positions" of the avatars. When the avatars of the responders are arranged in the fixed locations, it is possible to prevent the display screen from being difficult to view even if a large number of friends give responses to the post, and to recognize the order of the intimacy level of the contributor and the responders. Furthermore, it is possible to eliminate processing of preventing a face from being concealed (refer to FIG. 23D, FIG. 23E, and FIG. 23F).

Figure 31:
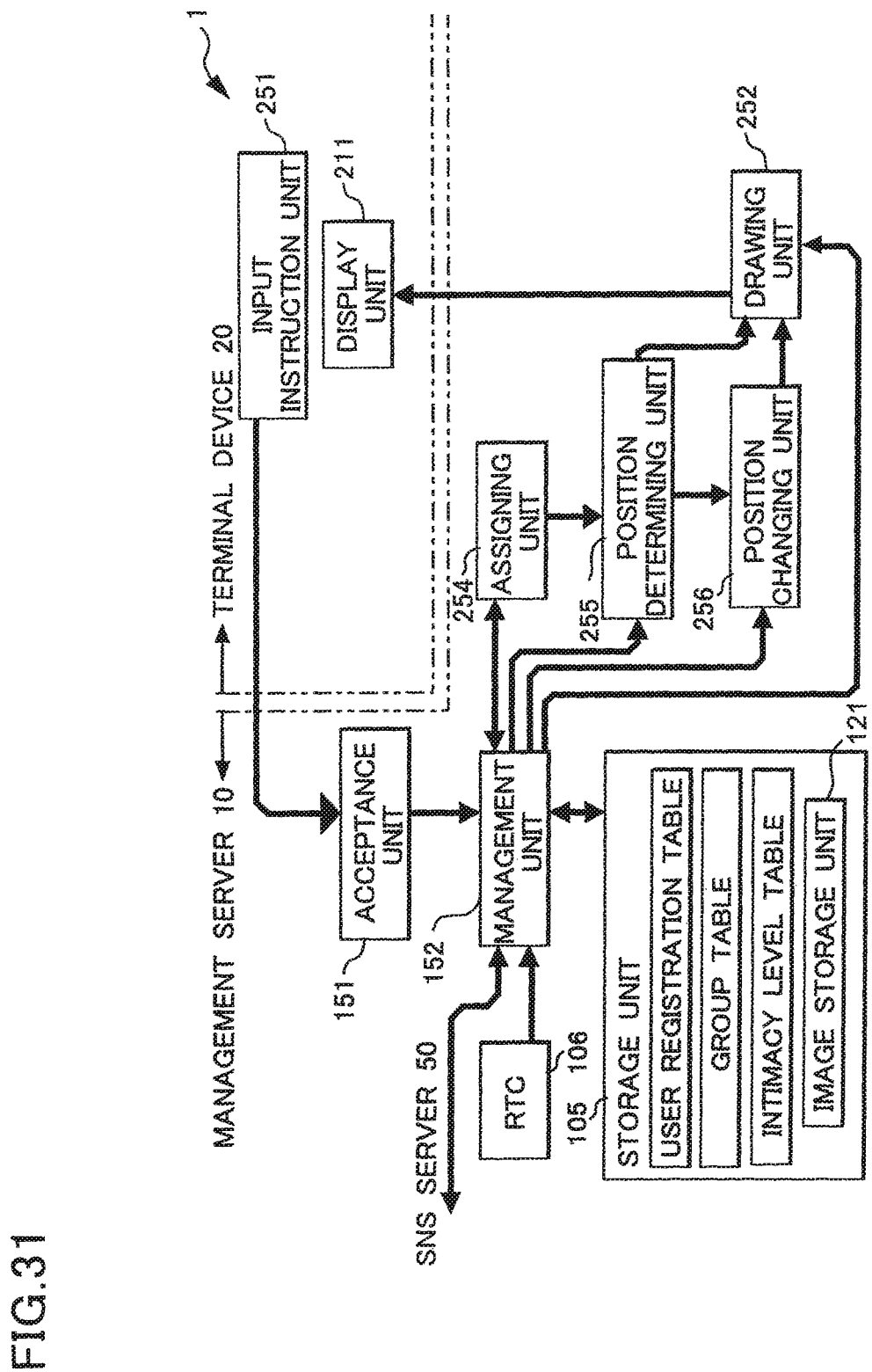
FIG. 31 is a drawing showing another function block built when an avatar is arranged.

FIG. 14 exemplifies the configuration in which the drawing unit 252, the assigning unit 254, the position determining unit 255 and the position changing unit 256 are provided in the terminal device 20. However, as shown in FIG. 31, an alternative configuration may involve providing the above elements in the management server 10. In this configuration, for example, a screen to be displayed in the display unit 211 is generated in the management server 10, so that the screen is transmitted to the terminal device 20 as a web screen. Then, the terminal device 20 displays the web screen by a browser. Furthermore, in this alternative configuration, the drawing unit 252 of the management server 10 reads the image information of avatars stored in the image storage unit 121 through the management unit 152, and uses the read image information. According to this alternative configuration, it is possible to reduce a load in the terminal device 20 because it is not necessary to store the image information of avatars in the image storage unit 261, and drawing processing of the avatars is unnecessary.

Furthermore, in FIG. 14, the user registration table, the group table and the intimacy level table are built in the management server 10, and the image storage unit 261 is built in the terminal device 20. However, if it can be accessed from the management server 10 or the terminal device 20 in the message-browsing system 1, these tables and the storage unit may be built in an external server other than the management server 10 and the terminal device 20.

<Third Function>

In the message-browsing system 1, an operation when the service of the third function is provided will be described.

Figure 32:
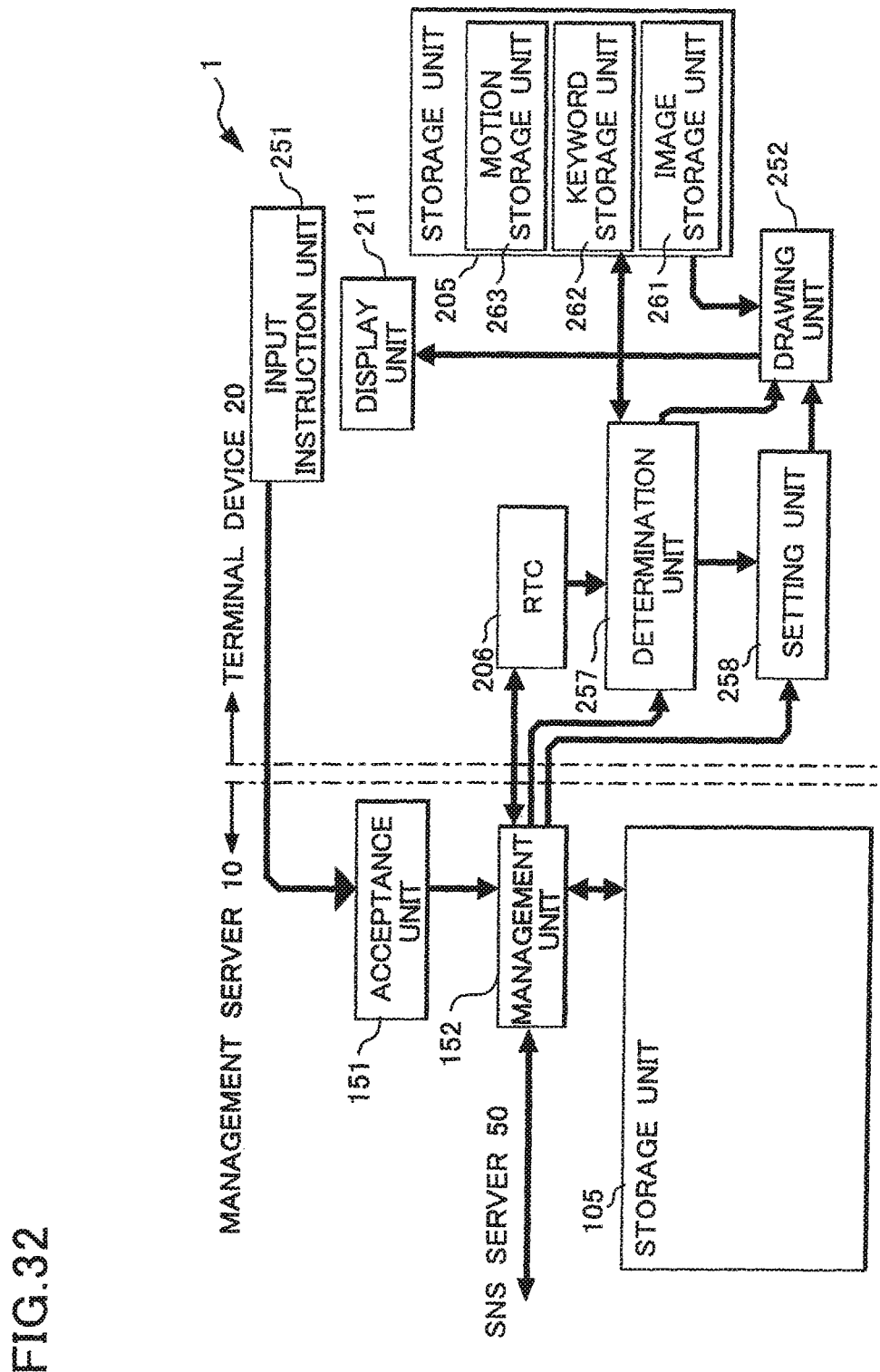
FIG. 32 is a drawing showing a function block when a motion is set to an avatar.

FIG. 32 is a drawing showing the function block built to provide the service of the third function in the message-browsing system 1. As shown in the drawing, in the terminal device 20, a determination unit 257 and a setting unit 258 are built in addition to the function block of the first function (refer to FIG. 4). In the storage unit 205, a keyword storage unit 262 and a motion storage unit 263 are managed in addition to the image storage unit 261.

As described above, in the third function, the service, in which each avatar is displayed with a motion according to contents of posts and forms of the posts of each user, is provided to the main person, and we assume that, for example, the third function is performed successively to the arrangement processing of the avatars in the second function. Therefore, each avatar is displayed with the motion according to the content of a post and a form of the post of each friend corresponding to each avatar on the display screen based on the fourth arrangement as shown in FIG. 27.

FIG. 33 is a drawing showing a list of motions in the third function. In the third function, when there is a post by a friend corresponding to an avatar, and feelings can be identified from a sentence included in the post, a motion (movement) according to the feelings is given to the avatar. In the embodiment, as motions according to feelings, for example, six forms of "delight", "pleasure", "anger", "sadness", "doubt" and "impatience" are assumed. A motion according to a form of the post is given to the avatar when feelings cannot be identified. As described above, in the embodiment, four forms of "mumbling", "diary", "photo" and "check-in" are assumed as forms of posts. A motion according to a form of the post is given to the avatar when feelings cannot be identified or when the form of the post is "check-in". As for "check-in", motions according to three forms of "eating and drinking type", "shopping" and "other" are given without determining the identification of feelings because an emotional expression is not often included in the content of the post. Note that a form of "check-in" is identified, for example, by attribute data included in a sentence of a post. Furthermore, a motion indicating that an avatar is standing by is given to the avatar when a friend corresponding to the avatar does not contribute a post for a fixed period of time. Note that the forms of the motions are not limited to these examples.

In the embodiment, the keyword storage unit 262 is used to identify feelings from a sentence included in a post. FIG. 34 is a drawing showing contents stored in the keyword storage unit 262. As shown in the drawing, one or more feeling keywords to characterize a corresponding type of feelings are associated with each of the six forms of feelings and are stored in the keyword storage unit 262. In the feelings, a priority is prescribed as shown in the drawing. This is because it is necessary to identify any one of the feelings having high priority when multiple feelings are identified from one post. Note that feeling keywords include so-called emoticons used for expressing feelings, in addition to words related to feelings. Furthermore, as for the stored contents, contents stored in the storage unit 105 of the management server 10 are transferred to the keyword storage unit 262 to be stored.

The motion storage unit 263 stores pieces of motion information each defining a motion provided to an avatar for each of a type of feelings, a form of a post, and a form of check-in. The motion information is a collection of information prescribing which part is changed into which direction by how much in what order according to the feeling and the form of a post when the image information of the avatars prescribes an outline form and a characteristic, such as limbs, a head, a face, and clothing, as vector data. Note that the motion information is used when a motion is provided to a periphery of an avatar as well as to an avatar. The motion information may correspond to each avatar, and motion information that is standardized for all avatars may be used. Note that, as for the motion information, information stored in the storage unit 105 of the management server 10 in advance is transferred to the motion storage unit 263 to be stored.

Note that specific examples of emotional expressions are shown in FIG. 36, specific examples of post motions are shown in FIG. 37, specific examples of check-in (spot category) motions are shown in FIG. 38, and specific examples of stand-by motions are shown in FIG. 39. Furthermore, the motion information should be aggregate data of bit map data expressing the feelings and a form of a post by frame advance when the image information is prescribed by bit map data.

Motion setting processing that sets motions to avatars according to contents and a form of a post will be described.

Figure 35:
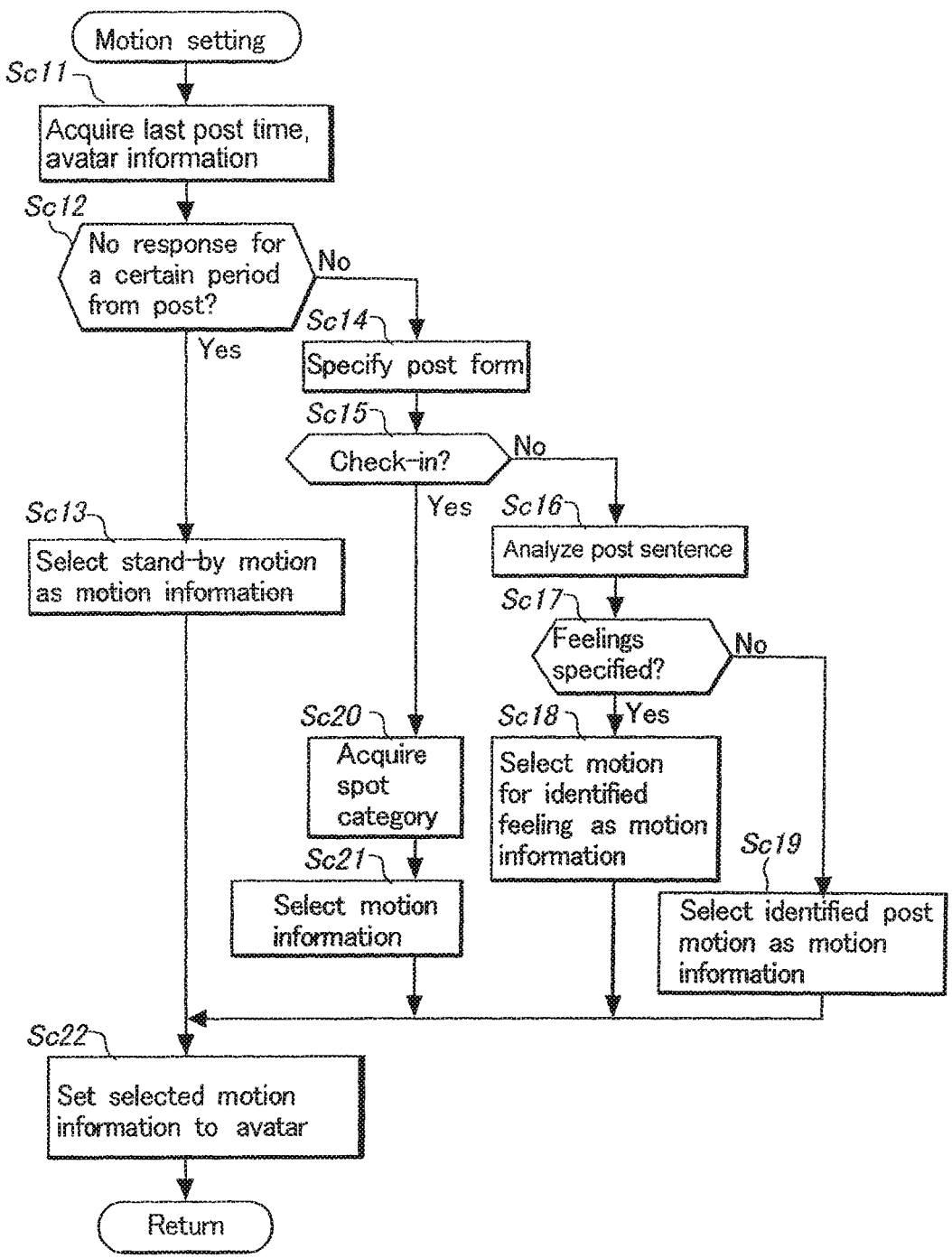
FIG. 35 is a flow chart showing motion setting processing.

FIG. 35 is a flow chart showing the motion setting processing. Note that the motion setting processing shown in FIG. 35 is processing for one avatar, and the processing for ten avatars including the main person will be performed if the processing is performed successively to the avatar arrangement processing in the second function.

First, the determination unit 257 selects a certain avatar and acquires a last post time of a user corresponding to the avatar by a technique similar to step Sb12 in the second function. Second, the determination unit 257 queries the management unit 152 about the information of the avatar and acquires the information (step Sc11). The determination unit 257 determines whether or not a period of time from the acquired last post time to a current time indicated by the RTC 206 is equal to or longer than a certain period of time (e.g., 3 days) (step Sc12).

When a certain period of time passes (when a determination result of step Sc12 is "Yes"), the setting unit 258 is notified of the determination result, and selects a stand-by motion for the selected avatar (step Sc13). In the embodiment, three kinds of stand-by motions, which are setting-up exercise shown in FIG. 39A, greeting shown in FIG. 39B and sleeping shown in FIG. 39C, are assumed. The setting unit 258 selects any one of the setting-up exercise, the greeting and the sleeping at random or in turn. Note that the setting-up exercise shown in FIG. 39A is a motion to turn both arms of the avatar, and the greeting shown in FIG. 39B is a motion to raise the right hand of the avatar, and the sleeping shown in FIG. 39C is a motion repeatedly displaying onomatopoeia indicating snoring, in turn, as shown in the drawing.

When the certain period of time does not pass (when the determination result of step Sc12 is "No"), the determination unit 257 refers to the post history through the management unit 152, and identifies a form of the post (step Sc14). The determination unit 257 determines whether or not the identified form of the post is "check-in" (step Sc15). When the identified form of the post is "mumbling", "diary" or "photo" and not "check-in" (when a determination result of step Sb15 is "No"), the determination unit 257 analyzes a sentence included in a latest post by the user corresponding to the selected avatar, namely, a sentence accompanying "mumbling", "diary" and "photo" (step Sc16). Specifically, after acquiring the sentence included in the post with reference to the post history, the determination unit 257 divides the sentence into phrases and totals, by feelings, phrases corresponding to feeling keywords in the keyword storage unit 262 among the phrases. The determination unit 257 determines whether or not feelings of the post can be identified from the total values (step Sc17). Specifically, the determination unit 257 determines that the feelings can be identified when all of the total values are not zero, so that the determination result becomes "Yes". The determination unit 257 identifies a type of feelings having the maximum total value as the feeling of the post, or identifies a type of feelings having a higher priority shown in FIG. 34 as the feeling of the post if there are two or more types of feelings having the same total values, so that the determination unit 257 notifies the setting unit 258 of the identification result.

The setting unit 258 selects a motion corresponding to the identified type of feeling for the selected avatar (step Sc18). Note that the motions corresponding to types of feelings in this embodiment are as follow. That is, a motion corresponding to "delight" is one repeatedly raising both arms of the avatar and putting them down for "cheering" as shown in FIG. 36A. A motion corresponding to "pleasure" is one swinging the upper body of the avatar right and left in a direction of a visual line as shown in FIG. 36B. A motion corresponding to "anger" is one shaking both shoulders of the avatar as shown in FIG. 36C. Furthermore, a motion corresponding to "sadness" is one in which tears overflow from both eyes of the avatar as shown in FIG. 36D. A motion corresponding to "doubt" is one in which the avatar twists its head on one side as shown in FIG. 36E. A motion corresponding to "impatience" is one in which sweat is pouring out from the avatar as shown in FIG. 36F.

Furthermore, the determination unit 257 determines that a type of feelings cannot be identified when all of the total values are zero, so that the determination result becomes "No". In this case, the setting unit 258 selects a motion corresponding to the identified form of the post for the selected avatar (step Sc19). Note that there are the following motions corresponding to forms of posts in this embodiment. That is, a motion corresponding to "mumbling" is one in which the avatar moves its mouth while putting its left hand in the vicinity of its mouth, as shown in FIG. 37A. A motion corresponding to "diary" is one in which the avatar writes something in a diary with a pen in the right hand, as shown in FIG. 37B. A motion corresponding to "photo" is a photographing motion in which the avatar holds a camera with the left hand and releases the shutter (presses the shutter release button) using the index finger of the right hand, as shown in FIG. 37C.

When the identified form of the post is "check-in" (when a determination result of step Sc15 is "Yes"), the determination unit 257 identifies a form (spot category) of the check-in with reference to the attribute data (step Sc20). The setting unit 258 selects a motion corresponding to the identified spot category for the selected avatar (step Sc21). Specifically, when the identified spot category is the eating and drinking type, the setting unit 258 selects a motion of drinking a cup of coffee as shown in FIG. 38A. When the identified spot category is the shopping type, the setting unit 258 selects a motion of walking while swinging the upper body right and left with a paper bag as shown in FIG. 38B. Note that the setting unit 258 selects a motion of waving a flag with the left hand as shown in FIG. 38C, when the identified spot category is neither of the eating and drinking type nor the shopping type. Note that the form of the check-in is identified on the basis of store information or location information acquired upon posting.

When the setting unit 258 selects the motion in steps Sc13, Sc18, Sc19 and Sc21, the setting unit 258 reads the motion information corresponding to the selected motion from the motion storage unit 263. The setting unit 258 sets the motion information corresponding to the selected motion to the selected avatar and outputs the set motion information to the drawing unit 252 (step Sc22).

After that, although it is not particularly illustrated in the flow chart, an avatar to be selected is changed to another avatar, and similar processing is performed with respect to the other avatar. The above-described processing is repeatedly performed until a motion is set to each of the ten avatars displayed on the display screen based on the fourth arrangement.

The drawing unit 252 draws each of the avatars with a motion prescribed in the set motion information. As a result, in the display unit 211, the avatar displayed at the standing position according to the intimacy level and the response of the user, performs the motion according to contents of the post and the form of the post. Therefore, the main person can recognize situations of posts and contents of posts of the members of the group including the main person himself at a glance.

The motion setting processing may be repeatedly performed every certain period of time (e.g., ten minutes). When the processing is repeatedly performed in this way, for example, a motion of the avatar of the member, who contributed a post within the last three days but has not contributed a post after that, is changed to the stand-by motion after three days from the post. When the member contributes a post again within three days from the last post, the motion according to contents of the last post by the avatar of the member is changed to a motion according to contents of the post this time. Therefore, it is possible to recognize a situation of the post and a change of contents of the post by a member of the group.

As described above, in the third function, each avatar is displayed on the display screen shown in FIG. 27 with a motion according to contents of a post and the form of the post by a member to whom each avatar corresponds. In the display screen, for example, when the main person touches a button 301 indicating "Group A", which is one for indicating a name of the group consisting of users corresponding to the avatars, displayed on a top left corner, for example, the determination unit 257 refers to the post-response histories of the members of the group through the management unit 152. The determination unit 257 transfers the post-response histories to the drawing unit 252, and the drawing unit 252 makes the display unit 211 display histories of "posts" by the members of the group and "responses" associated with the "posts" in order of time.

Figure 40:
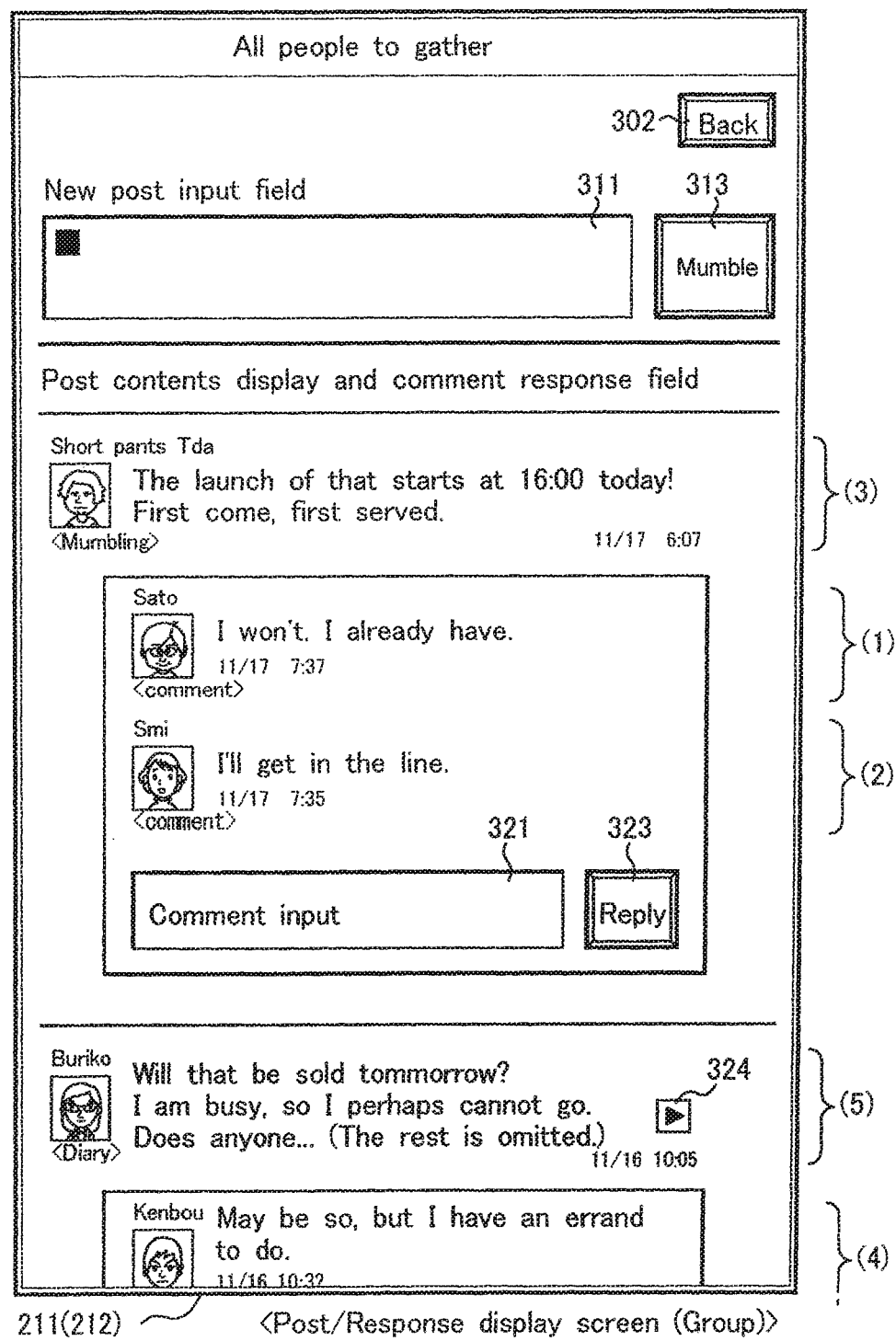
FIG. 40 is a drawing showing an example of a screen based on a post and a response.

FIG. 40 is a drawing showing an example of the screen based on the post-response histories displayed by the touch operation. In the display screen, in a section (3), a "post" having a form of "mumbling" is displayed. In each of sections (1), (2), a "response" to the "post" is displayed. The "response" in each of the sections (1), (2) is one having a form of "comment", and is indented on the right side of the drawing so that it can be recognized that the "response" is associated with the "post" in the section (3). Furthermore, in a section (5), a "post" having a form of "diary" is displayed. In a section (4), a "response" having a form of "comment" on the "post" is displayed. In the display screen, from among "posts", a "post" that is located higher up is one that is contributed later. For example, comparing the "post" in the section (3) with the "post" in the section (5), the "post" in the section (3) located higher up than the "post" in the section (5) is contributed later than the "post" in the section (5). Furthermore, as for "responses" associated with the common "post", a "response" that is located higher up is one that is given later. For example, comparing the "response" in the section (1) with the "response" in the section (2), which are associated with the common "post" in the section (3), the "response" in the section (1) located higher up than the "response" in the section (2) is given later than the "response" in the section (2). A simple image of the avatar for indicating a contributor or a responder as well as a name, a form, a date and time of contributing a post or giving a response and a text (message) are associated with every "post" and "response" to be displayed. Furthermore, a software button 324 for changing the display screen to a detailed page is displayed because only a part of a text corresponding to "diary" can be displayed.

Note that, in the display screen of FIG. 40, a button 302 is a software button to return to the display screen of FIG.

27. When the main person contributes a post of a new "mumbling" in "Group A", an entry field 311 is an area to input a text. When a text is input using the entry field 311, an extra software keyboard (not shown) is displayed. A button 313 is a software button for contributing a post with a text input into the entry field 311. Note that when the button 313 is operated by the main person, a text input into the entry field 311 is supplied to the SNS server 50 through the input instruction unit 251, the acceptance unit 151, and the management unit 152, so that the post is associated with a member ID of the main person who has contributed the post, a post ID (mumble ID, etc.), the text, a date and time of the posting and a group ID to be additionally stored in the post-response history.

Furthermore, an entry field 321 "is an area to input text when a response is given in a form of "comment" to a "post". A button 323 is a software button for giving a "response" with a text input into the entry field 321. Therefore, the entry field 321 and the button 323 are provided for each "post". Note that when the button 323 is operated by the main person, a text input into the entry field 321 is supplied to the SNS server 50 through the input instruction unit 251, the acceptance unit 151, and the management unit 152, so that the response is associated with a member ID of the main person giving the response, a response ID (comment), the text, a date and time of giving the response, a group ID and an original post ID to be additionally stored in the post-response history.

Furthermore, an example in which the third function is performed successively to the avatar arrangement processing in the second function is described. However, the third function may be performed independently of the second function. For example, a motion may be set in a state in which each avatar is arranged in the reference position after selecting a group. Furthermore, when a screen promoting the selection of the member of the group is displayed, and the member is selected, a motion may be set to the avatar of the selected member.

As described above, upon providing the service according to the third function, the message-browsing system 1 provides a browsing service of messages exchanged by a post having any of the multiple forms (e.g., "mumbling", "diary", "photo", and "check-in") and one or more responses to the post among multiple users. The message-browsing system 1 includes the image storage unit 261 storing user images corresponding to the respective multiple users, the motion storage unit 263 storing the motion information defining motions of the user images associated with types of feelings or forms of posts, and the keyword storage unit 262 storing keywords corresponding to the types of feelings. Furthermore, the message-browsing system 1 includes the determination unit 257 determining whether or not any of the types of feelings can be identified by determining whether any of the keywords stored in the keyword storage unit 262 is included in a sentence of a post having a specific form (e.g., "mumbling", "diary", or "photo") from among the multiple forms. The message-browsing system 1 includes the setting unit 258 selecting motion information corresponding to the identified type of feelings when the determination unit 257 can identify one of the types of feelings in a case in which the post by the user has the specific form, while selecting motion information corresponding to the specific from when the determination unit 257 cannot identify one of the types of feelings, and setting a motion of a user image corresponding to the user who has contributed the post on the basis of the selected motion information. Furthermore, the setting unit 258 may select motion information corresponding to a form of the post when the post by the user has a form (e.g., "check-in") other than the specific form. That is, it may be configured so that the determination unit 257 does not perform the feeling type determination with respect to a form of a post in a case where the type of feelings is difficult to identify. Thus, when any of the types of feelings can be identified from a sentence of the post in a case in which the post has the specific form, a motion corresponding to the feeling is set to a user image (e.g., an avatar) of the user contributing the post. However, when the type of feelings cannot be identified from the sentence, a motion corresponding to the form of the post is set to the user image. Therefore, it is possible to provide various motions to a user image of a contributor when a post is contributed by one of the multiple users, and it is possible to allow users of the service to recognize contents of a sentence of the post and a form of the post at a glance, so that this enables the users receiving the service to be interested in the service.

In the third function, the following various applications and modification are possible.

A configuration in which a concept of "response" is removed so that only "post" is used is possible in the third function. In the configuration in which the concept of "response" is removed, a "post" is contributed to a certain "post". Note that, in this configuration, various forms like "mumbling", "diary", "photo", and "check-in" may be used as the "post", of course.

Figure 41:
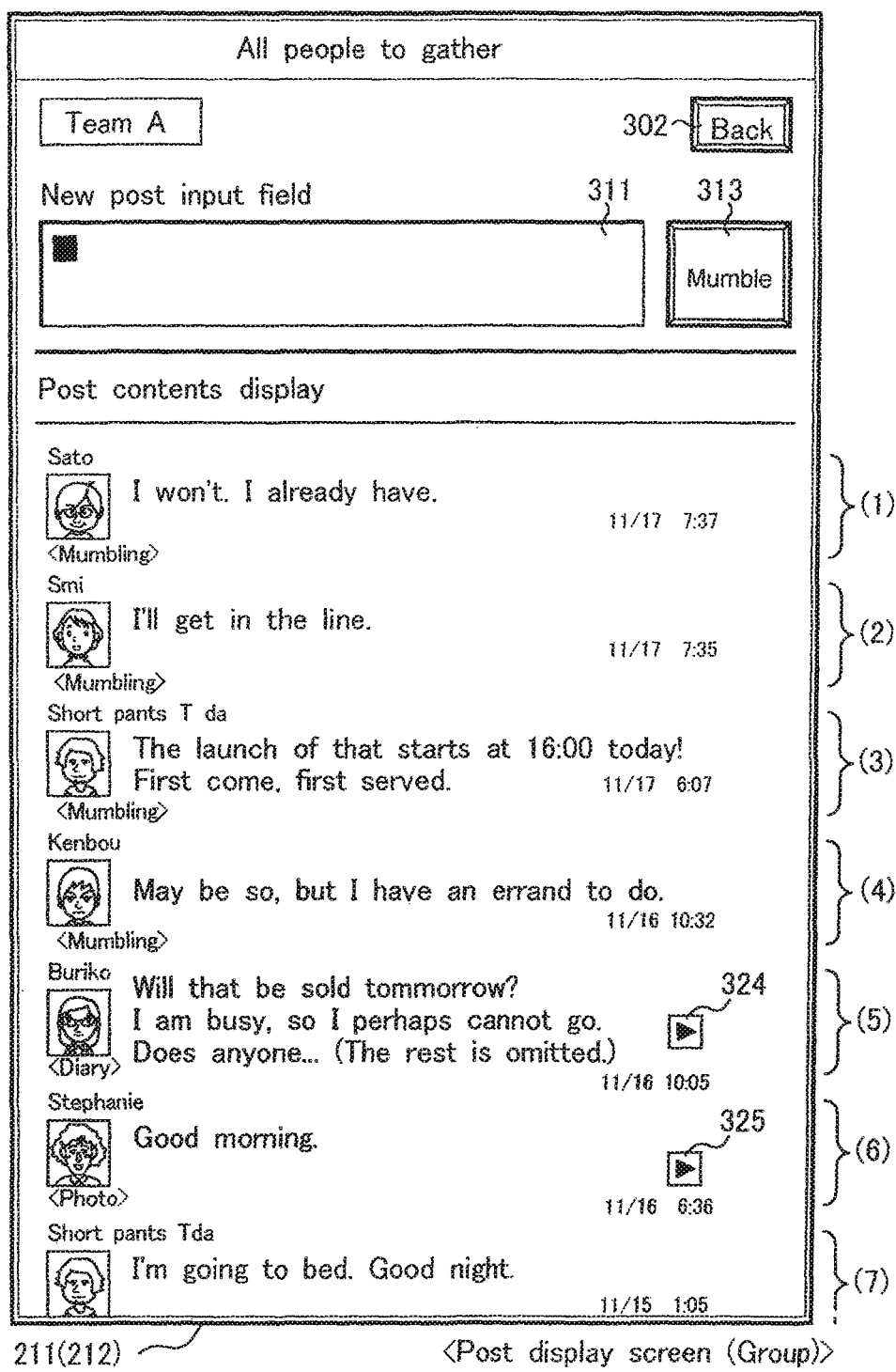
FIG. 41 is a drawing showing an example of a screen based on a post.

FIG. 41 is a drawing showing an example of a screen based on a history of only "posts". This screen is one replacing all "responses" in the display screen of FIG. 40 with "posts" to make correspondence with that of FIG. 40 clear. Because there are only "posts" in the same line without "responses", they are simply displayed in order of date and time of posting. Note that because an uploaded image cannot be displayed in a post corresponding to "photo" in a section (6) in a screen of FIG. 41, a software button 325 to change the screen to a screen of the image is displayed.

Figure 42:
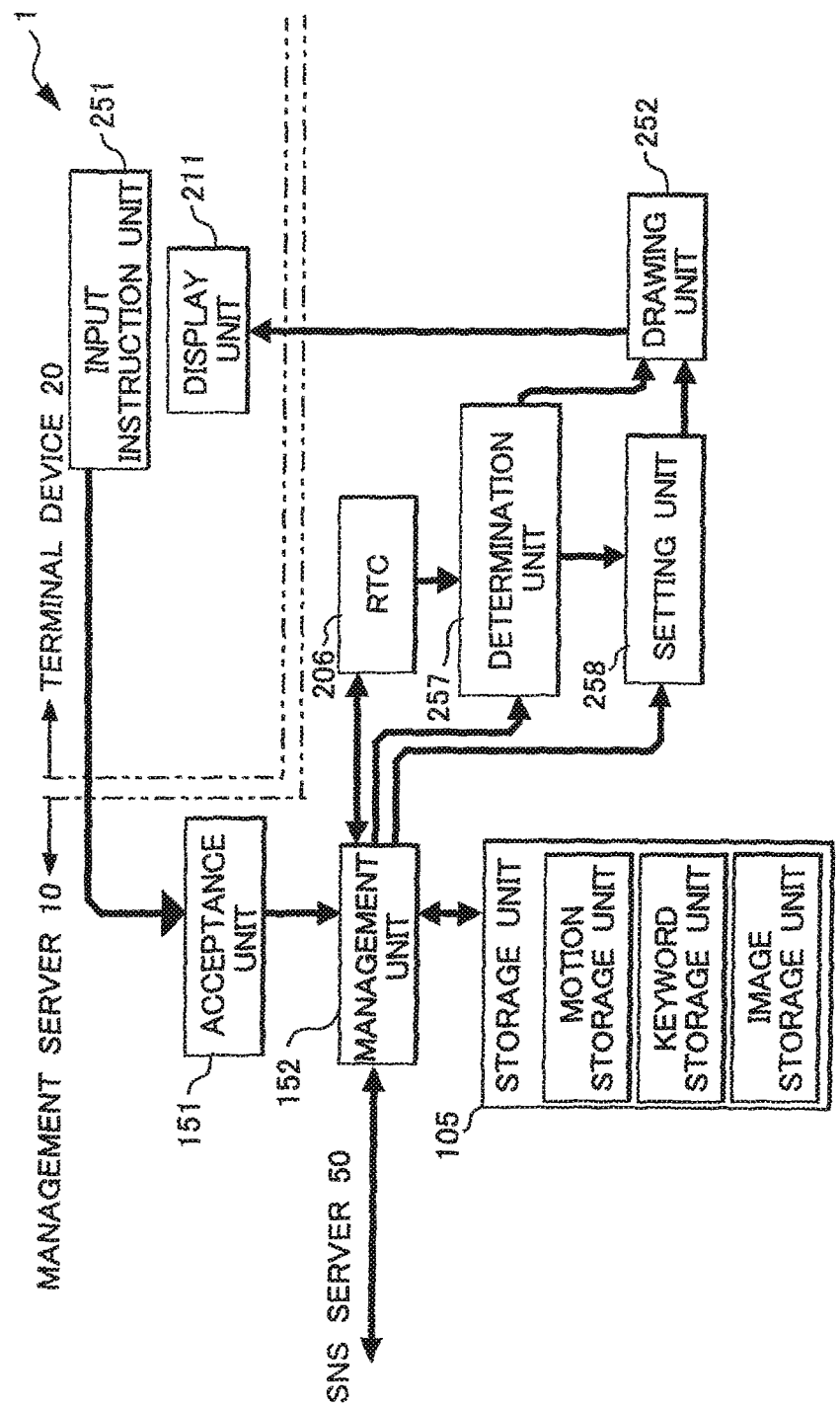
FIG. 42 is a drawing showing another function block when a motion is set to an avatar.

In FIG. 32, although a configuration in which the drawing unit 252, the determination unit 257 and the setting unit 258 are provided in the terminal device 20, alternative configuration in which these units are provided in the management server 10 as shown in FIG. 42 may be adopted. In the alternative configuration, for example, a screen to be displayed in the display unit 211 is generated in the management server 10, so that the screen is transmitted to the terminal device 20 as a web screen. Then, the terminal device 20 displays the web screen by a browser. In the alternative configuration, the motion storage unit and the keyword storage unit are achieved by the storage unit 105 of the management server 10. Furthermore, in the alternative configuration, the determination unit 257 of the management server 10 accesses the keyword storage unit through the management unit 152, while the setting unit 258 accesses the motion storage unit similarly through the management unit 152. Note that in the alternative configuration, as for acquisition of the time information, the RTC 106 of the management server 10 is used. According to the alternative configuration, it is possible to reduce a load in the terminal device 20 because it is not necessary to perform extraction of keywords, setting of the motion information and drawing processing of the avatars in the terminal device 20.

In the third function, upon providing the service without "response", the message-browsing system 1 provides a browsing service of messages exchanged by posts having any of the multiple forms among multiple users, such as a chat on the basis of peer-to-peer technology and a group chat. That is, the message-browsing system 1 includes the image storage unit 261 storing user images which are displayed on a screen and correspond to the multiple users, respectively, the motion storage unit 263 associating the motion information defining motions of the user images with types of feelings or forms of posts to store the motion information, and the keyword storage unit 262 storing keywords corresponding to the types of feelings. Furthermore, the message-browsing system 1 includes the determination unit 257 determining whether or not any of the types of feelings can be identified by determining whether any of the keywords stored in the keyword storage unit in a sentence of a post having a specific form among the multiple forms. The message-browsing system 1 includes the setting unit 258 selecting motion information corresponding to the identified type of feelings when the determination unit 257 can identify one of the types of feelings in a case in which the post by the user has the specific form (e.g., it is "mumbling" "a diary", or "a photo"), and setting a motion of a user image corresponding to the user who has contributed the post on the basis of the selected motion information. In addition, the setting unit 258 may select motion information corresponding to the specific form when the determination unit 257 cannot identify any of the types of feelings, and may select motion information corresponding to a form of a post when the post by the user has a form (e.g., "check-in") other than the specific form.

Furthermore, in FIG. 32, the image storage unit 261, the keyword storage unit 262 and the motion storage unit 263 are built in the terminal device 20 by transferring contents of the storage unit 105 to the terminal device 20 in the management server 10. However, these storage units may be built in an external server other than the management server 10 and the terminal device 20 if it can be accessed from the management server 10 or the terminal device 20 in the message-browsing system 1. Upon providing the service of the third function, as shown in FIG. 32, when the image storage unit is built in the terminal device 20, the drawing unit 252 functions as an image reference unit because it refers to the image storage unit. Furthermore, as shown in FIG. 42, when the image storage unit is built in the management server 10, the management unit 152 functions as the image reference unit because it refers to the image storage unit. Note that although it is not particularly illustrated, the drawing unit 252, the management unit 152 or another function block refers to the image storage unit in an external server when the image storage unit is built in the external server. Therefore, any of the drawing unit 252, the management unit 152 and the another function block functions as the image reference unit. As shown in FIG. 32, when the keyword storage unit is built in the terminal device 20, the determination unit 257 functions as the keyword reference unit because it refers to the keyword storage unit. Furthermore, as shown in FIG. 42, when the keyword storage unit is built in the management server 10, the management unit 152 functions as the keyword reference unit because it refers to the keyword storage unit. Note that although it is not particularly illustrated, any of the determination unit 257, the management unit 152, and the another function block functions as the keyword reference unit when the keyword storage unit is built in the external server because any of the determination unit 257, the management unit 152 or the another function block refers to the keyword storage unit in the external server. Similarly, as shown in FIG. 32, when the motion storage unit is built in the terminal device 20, the setting unit 258 functions as the motion reference unit because it refers to the motion storage unit. Furthermore, as shown in FIG. 42, when the motion storage unit is built in the management server 10, the management unit 152 functions as the motion reference unit because it refers to the keyword storage unit. Note that although it is not particularly illustrated, any of the setting unit 258, the management unit 152 and another function block functions as the motion reference unit, when the motion storage unit is built in the external server, because any of the setting unit 258, the management unit 152 and the another function block refers to the motion storage unit in the external server.

<Fourth Function>

Figure 43:
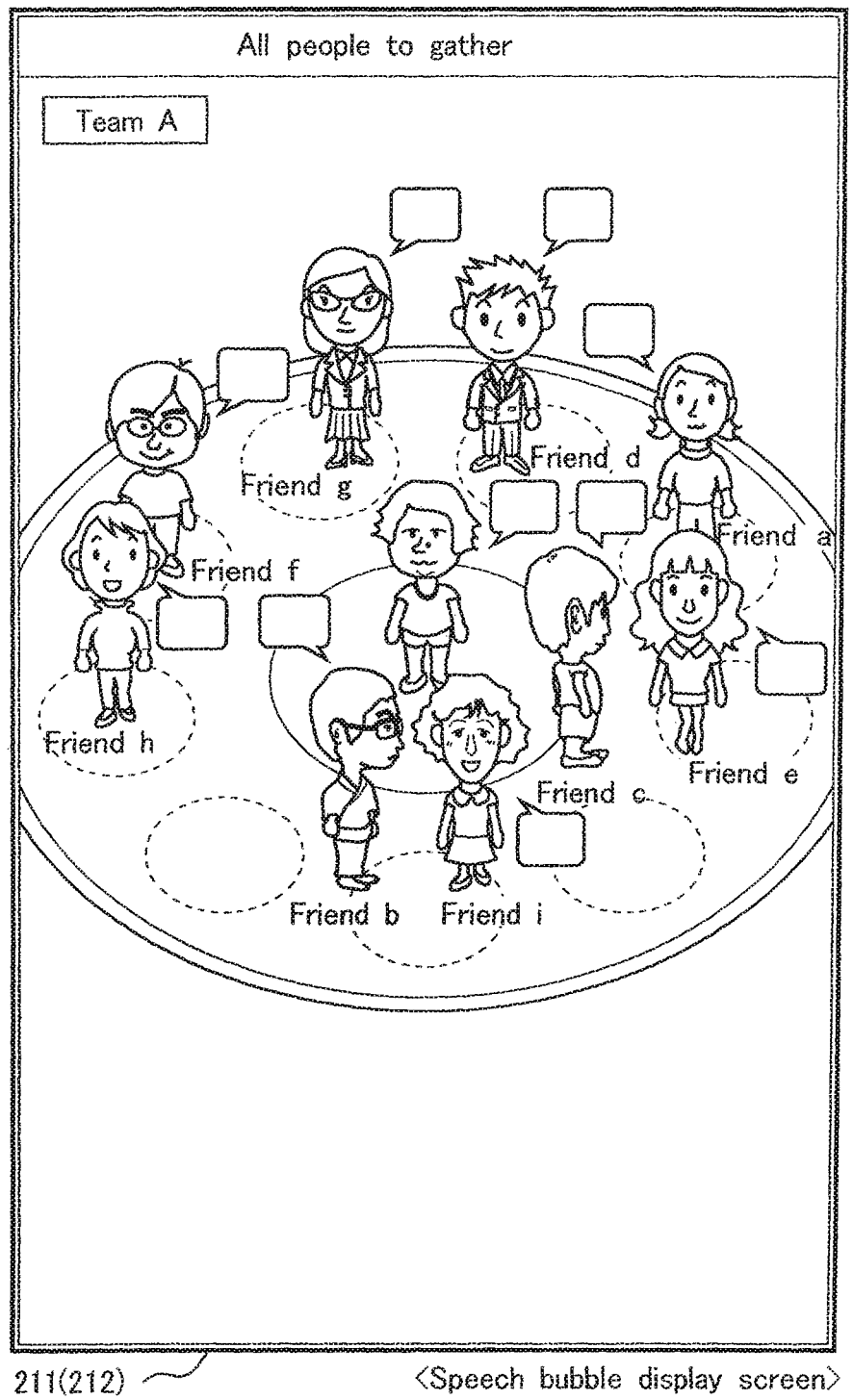
FIG. 43 is a drawing showing an example of a speech bubble display screen of an avatar.

The fourth function in the message-browsing system 1 will be described. In the fourth function, speech bubbles indicating that there were posts are displayed in the display screen based on the fourth arrangement in the second function as shown in FIG. 43. Note that, if there is not any post, no speech bubble is shown.

Figure 44:
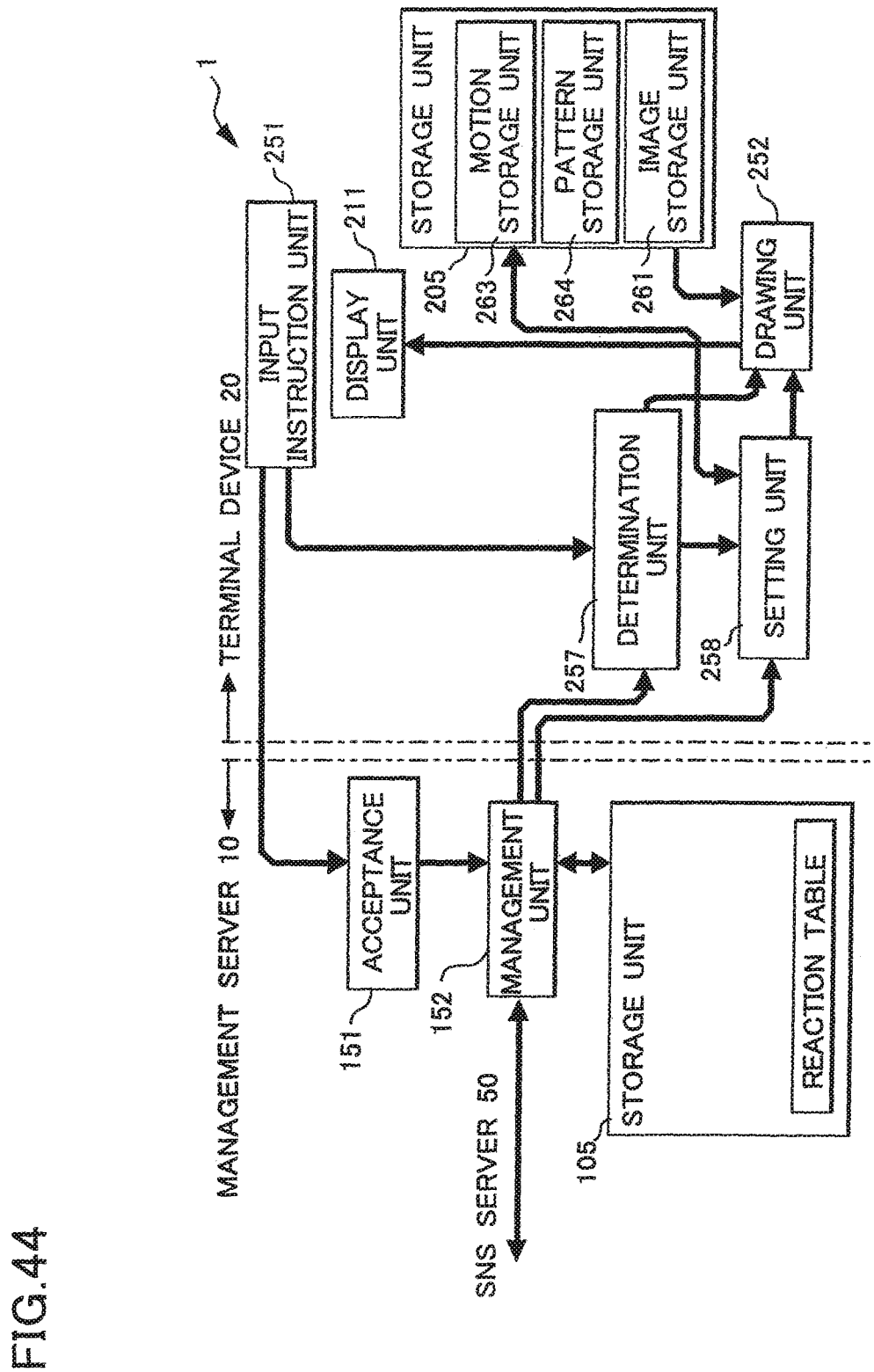
FIG. 44 is a drawing showing a function block when processing according to a touch operation, etc., is performed.

FIG. 44 is a drawing showing the function block built when the service of the fourth function is provided in the message-browsing system 1. As shown in the drawing, the determination unit 257 and the setting unit 258 are built in addition to the function block of the first function in the terminal device 20 (refer to FIG. 4), and in the storage unit 205, a motion storage unit 263 and a pattern storage unit 264 are managed in addition to the image storage unit 261. In the storage unit 105 in the management server 10, a reaction table is managed.

As described above, in the fourth function, when the main person gives a response, by such as touching an icon or an avatar of a certain friend, to a post by the friend, the avatar of the friend is displayed with a motion according to a response form. That is, a service in which the avatar performs a reaction according to a response form is provided. In the embodiment, the response forms are divided into three forms including a form of such as operating an icon, a form of such as touching an avatar corresponding to a friend who has contributed a post and a form of providing a response. The response form of such as operating the icon and the response form of such as touching the avatar correspond to fixed response sentences. Specifically, in the response form of such as operating the icon, there are three forms, which are "cracker", "Gee!" and "like (heart shape)" corresponding to the fixed response sentences. In the response form of such as touching the avatar, there are four forms, which are "punching", "tossing an avatar", "twirling", and "stroking". The motion storage unit 263 stores pieces of animation information, each piece corresponding to each of the three forms of such as operating the icon and the four forms of such as touching the avatar.

In the fourth function, when another user provides a response to a post of the main person, a motion and an icon (pattern) which correspond to contents of the response by the other user according to the main person are added to an avatar corresponding to the main person. The pattern storage unit 264 stores icons to be added to avatars according to response forms. Icons stored in the storage unit 105 of the management server 10 are transferred to the pattern storage unit 264 and are used as the icons added to the avatars. Note that because there are two types of icons, one type prescribing a response form and the other type being displayed after being added to an avatar according to a response form, the latter type is referred to as a "pattern image" to avoid confusion. Furthermore, the reaction table is used for storing contents of responses by users, and is stored in the storage unit 105 of the management server 10.

FIGS. 45 and 46 are drawings indicating an example of the reaction table. FIG. 45 shows responses to posts having a form of "mumbling", and FIG. 46 shows responses to posts having forms of "diary", "photo" and "check-in". As shown in these drawings, an ID to uniquely identify each post in the SNS server 50 is given to each post. When there is a response to one post, a total value of the number of reactions in each response form is stored for every user ID of the responder who provides the response. Note that, in FIGS. 45 and 46, the reaction tables are classified by post form, but they may be managed as one table if an identification ID to identify the post form is given to every post.

Figure 47:
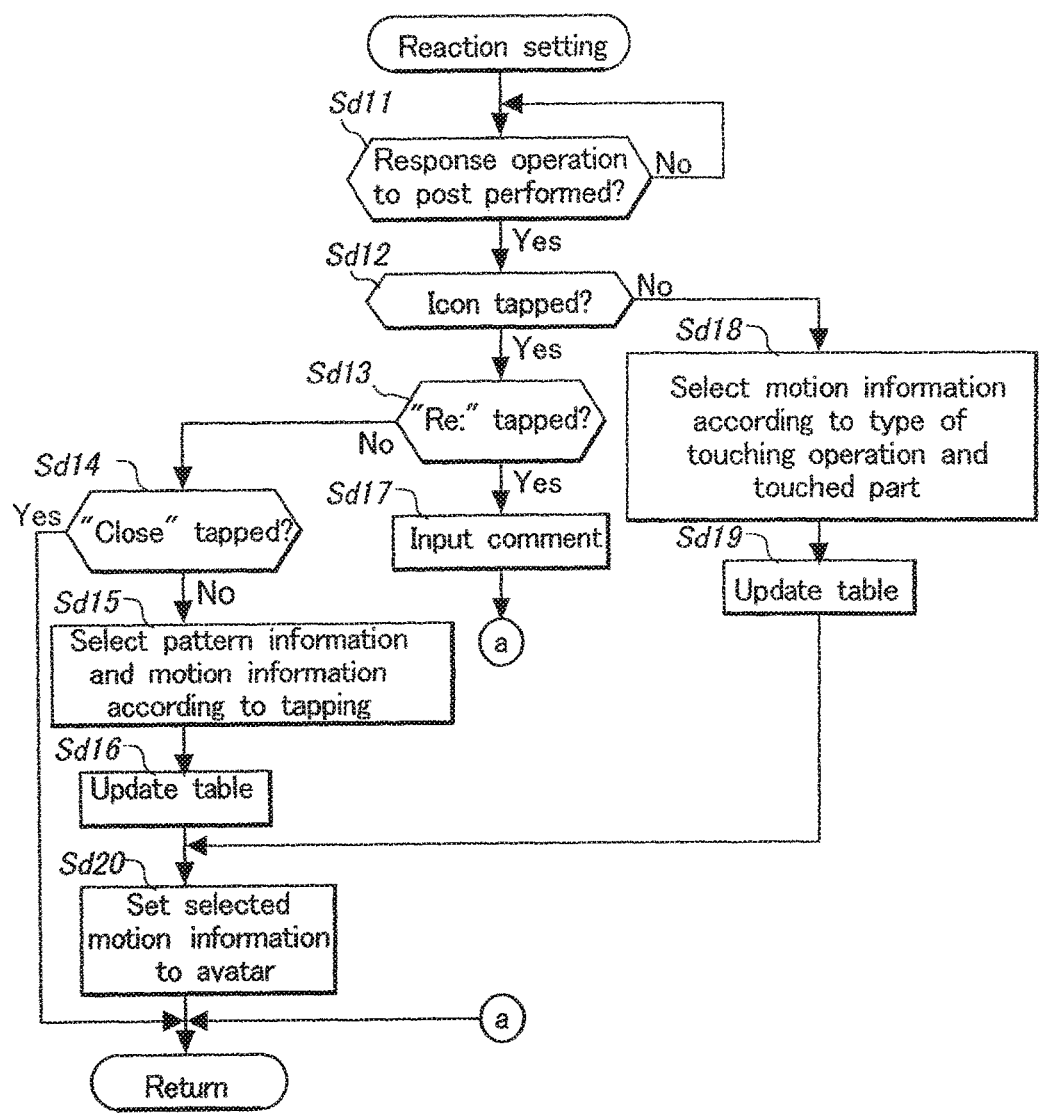
FIG. 47 is a flow chart showing reaction setting processing.

FIG. 47 is a flow chart showing reaction setting processing. Note that the reaction setting processing is premised on the condition that it has been selected by the main person to whose post a response is to be provided. Furthermore, selection of a contributor to whom the response is to be provided is performed by the main person's touching operation, such as tapping, flicking, to an avatar corresponding to the contributor or a speech bubble added to the contributor, for example, on a screen indicated in FIG. 43.

Figure 48:
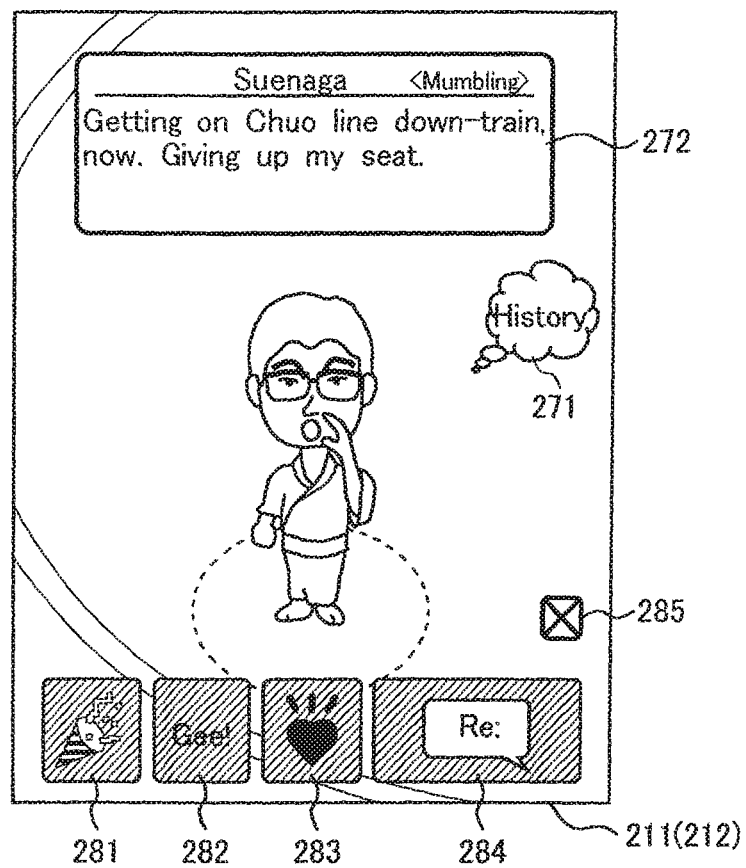
FIG. 48 is a drawing showing an example of a screen displaying an avatar.

FIG. 48 is an example of a display screen when the main person selects a friend (contributor) to provide a response to a post by the friend. As shown in the drawing, in the display unit 211, an avatar corresponding to the selected contributor is displayed, a frame 272 is displayed at an upper end of the screen, and icons 281 to 285 are displayed as operation buttons in the lower end of the screen. In the frame 272, a sentence pertaining to the latest one of posts by the contributor is displayed together with a nickname of the contributor. Note that, the display screen of the drawing displays an example in which a post having a form of "mumbling" by the friend corresponding to the avatar causes a motion of FIG. 37A to be added to the avatar (third function). Furthermore, an icon 281 corresponds to "cracker" and is used when a response is provided with feelings of surprise to a post shown in the frame 272. An icon 282 corresponds to "Gee!" and is used when a response is provided with feelings of admiration to the post. An icon 283 corresponds to "like (heart shape)" and is used when a response is provided with feelings of agreement, praise, etc., to the post. An icon 284 corresponds to "comment" and is used when replying with a text to the post. An icon 285 is so-called a close button and is used when performing an instruction of completion of providing a response to the post by the friend and returning to the screen of FIG. 43. Note that, when performing a touching operation to a speech bubble 271 with "history", a history of the post and responses associated with the post is displayed in order of time, as described later, for example.

First, in FIG. 47, the determination unit 257 determines a response operation from the input instruction unit 251, specifically, whether or not the main person performs a response operation to a post at the terminal device 20 (step Sd11). In an example of the display screen of FIG. 48, it is determined whether or not any of the icons 281 to 285 is tapped or a touching operation is performed to the avatar corresponding to the contributor. If it is determined that some response operation is performed (if a determination result of step Sd11 is "Yes"), the determination unit 257 determines whether or not the response operation is one for tapping any icon (step Sd12).

When any of the icons 281 to 285 is tapped, the determination unit 257 further determines whether or not the tapped icon is the icon 284 corresponding to a comment (step Sd13). If the determination result is "No," the determination unit 257 determines whether or not the tapped icon is the icon 285 corresponding to the close button (step Sd14). If the icon 285 is tapped (if a determination result in step Sd14 is "Yes"), the reaction setting processing is completed.

When any of the icons 281 to 283 is tapped (when a determination result in step Sd14 is "No"), the determination unit 257 notifies the setting unit 258 of the information of the tapped icon, and the setting unit 258 selects a pattern image, animation information and motion information, which correspond to the tapped icon (step Sd15).

For example, if the icon 281 is tapped, the setting unit 258 selects a cracker as the pattern image, the animation information that confetti spouts out from the cracker, and the motion information that an avatar corresponding to a contributor is surprised. Note that, when the information is selected as described above, the drawing unit 252 draws an avatar and an area surrounding the avatar so that the cracker is arranged on the left side of the avatar, the confetti spouts out from the cracker, and the avatar is surprised. Note that the drawing unit 252 draws an avatar and the surrounding area of the avatar so that the cracker explodes and the confetti is spouted out from the cracker for each tapping when the icon 281 is repeatedly tapped. If the icon 282 is tapped, the setting unit 258 selects the word of "Gee!" as the pattern image, animation information that the letters are enlarged while moving from the bottom side of the screen in an initial size to stop being enlarged in a vicinity of a center part of the screen, and selects motion information that the avatar nods its head twice, for example. Note that, when information is selected as described above, the drawing unit 252 draws the avatar and the surrounding area of the avatar so that the letters of "Gee!" are gradually enlarged while the letters rise in an initial size from a vicinity of the avatar's feet to stop near the head of the avatar, and the avatar nods its head twice. Note that, the drawing unit 252 draws the word of "Gee!" so that the sizes of the letters are enlarged from the initial size by 10% every time the icon 282 is tapped, for example.

Figure 49:
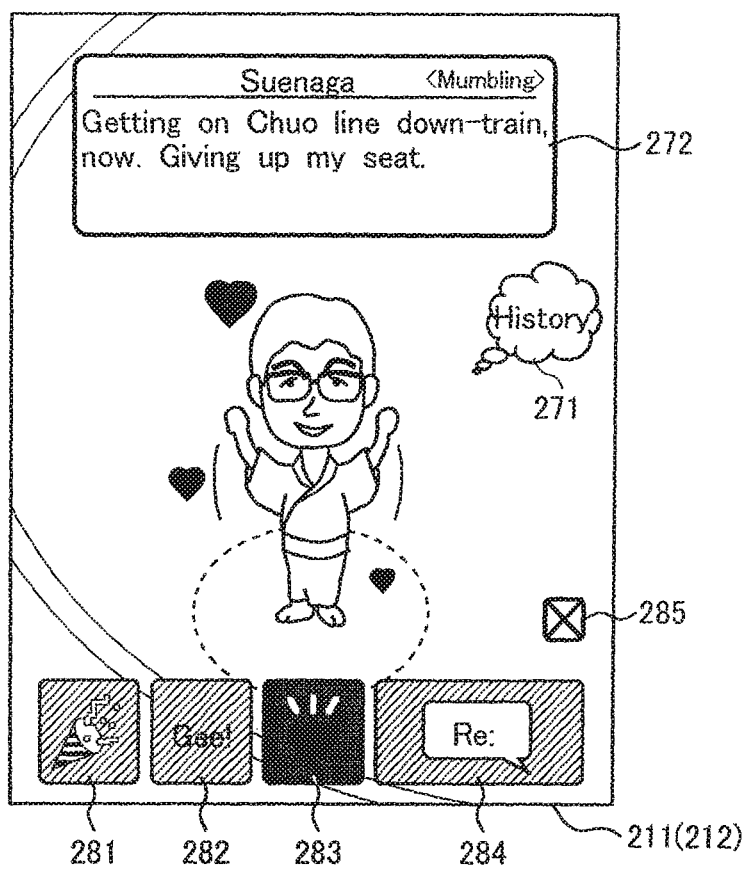
FIG. 49 is a drawing showing an example of a screen displaying an avatar.

If the icon 283 is tapped, the setting unit 258 selects a heart shape as the pattern image, animation information that the heart shape is enlarged while moving from the bottom side of the screen in an initial size to stop in a vicinity of the center part of the screen, and motion information that an avatar corresponding to the contributor is pleased. Note that the drawing unit 252 draws the avatar and the surrounding area of the avatar so that the heart shape is gradually enlarged while rising from a vicinity of the avatar's feet like a balloon to stop in a vicinity of the head of the avatar, and the avatar is pleased. Note that the drawing unit 252 draws the heart shape so that the size of the heart shape is enlarged from the initial size by 10% every time the icon 283 is tapped, for example, and a new heart shape rises from a different spot every time the size of the preceding heart shape reaches up to the maximum of 200%. FIG. 49 is an example of the display screen when the icon 283 is tapped. The icon 283 is inverted in response to a tapping, and a motion that the avatar is pleased in response to the tapping to the icon 283 (refer to FIG. 36A) is given to the avatar.

After selecting the pattern image, the animation information and the motion information corresponding to the tapped icon, the setting unit 258 notifies the management unit 152 of a form of a post which is a target of the response operation, a user ID corresponding to the contributor, the user ID of the main person, a type of the tapped icon and the number of the tapping. The main person who provides the response becomes a responder to the post. Therefore, the management unit 152 updates the reaction table according to contents notified from the setting unit 258 (step Sd16).

Specifically, the management unit 152 counts up the number of the response operations corresponding to the user ID corresponding to the contributor, the user ID of the main person (responder) and the type of the tapped icon by the notified number of the tapping for each form of the post which is the target of the response operation.

When the icon 284 is tapped (when a determination result of step Sd13 becomes "Yes"), the determination unit 257 instructs the drawing unit 252 to display an input screen of a comment (step Sd17). As a result, in the terminal device 20 of the main person, the input screen of the comment (not shown) is actually displayed in the display unit 211, so that the main person inputs a text and responds to the post.

In addition, when the main person performs the response operation to the post in the terminal device 20, and the response operation is a touching operation to an avatar corresponding to the contributor (when a determination result of step Sd12 is "No"), the determination unit 257 identifies a response form according to the type of the touching operation and a touched part of the avatar to notify the setting unit 258 of information indicating the response form, and the setting unit 258 selects motion information according to the response form (step Sd18).

Figure 50:
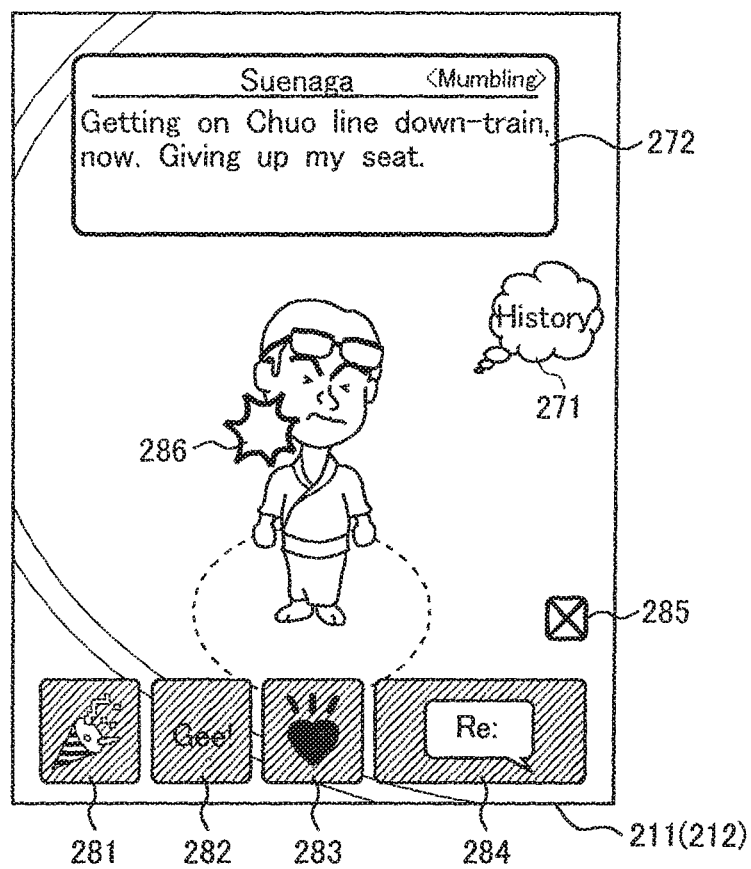
FIG. 50 is a drawing showing an example of a screen displaying an avatar.

A response form to be identified and motion information to be selected with respect to a touching operation to the avatar will be described as follows. That is, the response form is determined as "punch" when the touching operation is a tapping to the head or the abdomen. If it is the tapping to the head, motion information that the avatar leans back is selected. If it is the tapping to the abdomen, motion information that the avatar bends forward is selected. At this time, facial expression of the avatar distorted in agony may be added to the motion information. FIG. 50 is an example of the display screen when the head of the avatar is tapped. A hit mark 286 is displayed in accordance with the tapped part.

Furthermore, if the operation to the avatar is a flicking to sweep upward from below, the response form is identified as "tossing an avatar", and motion information that the avatar lands on an original standing position after jumping from the standing position is selected. If the operation to the avatar is one to draw a locus as if it makes the avatar move right and left repeatedly, the response form is identified as "twirling", and motion information that the avatar rotates is selected. Furthermore, if the touching operation to the avatar is one to draw a locus as if it makes the head shake right and left, the response form is identified as "stroking", and motion information that the avatar shakes the head bashfully. Note that motions in a case in which the response form is identified as "tossing an avatar", "twirling" and "stroking" are not particularly illustrated, but motion information that the avatar is pleased or has a look of pleasure may be added. Furthermore, if the touching operation is one other than the above described operations, it may be configured so that, for example, it is determined that the touching operation is invalid, and no processing is performed.

After selecting motion information according to a response form, the setting unit 258 notifies the management unit 152 of a form of the post which is the target of the response operation, the user ID corresponding to the contributor, the user ID of the main person, and the response form. The management unit 152 updates the reaction table according to contents notified from the setting unit 258 (step Sd19). Specifically, the management unit 152 increments the number of the response operation corresponding to the user ID corresponding to the contributor, the user ID of the main person (responder) and the type of the tapped icon by "1", for example.

When the motion is selected in step Sd15 or Sd18, the setting unit 258 reads motion information corresponding to the selected motion from the motion storage unit 263. The setting unit 258 sets the motion information to the avatar corresponding to the selected contributor and outputs the set information to the drawing unit 252 (step Sd20).

The drawing unit 252 gives the motion prescribed in the set motion information to the avatar and draws the avatar corresponding to the contributor. At this time, the drawing unit 252 gives an animation effect to a pattern image according to the operation to draw the pattern image if the pattern image is selected. As a result, in the display unit 211, an avatar corresponding to the contributor performs a motion according to a response form of the main person, namely, according to its feelings regarding the post of the contributor.

When the main person provides a response to a post of a friend as described above, an avatar of the friend performs a motion according to a form of the post, and the reaction table is updated. Conversely, when the main person contributes a post, another user similarly provides a response to the post in another terminal device 20. The reaction table is updated according to the response. It is reflected to an avatar of the contributor displayed in a center of the display unit 211 how another user provides a response to a post of the contributor.

Specifically, in a screen shown in FIG. 43, when the main person performs a touching operation, such as a tapping and a flicking, through the input instruction unit 251 to an avatar of the main person, namely, an avatar located in the center of the screen, which is not an avatar corresponding to a friend, or to a speech bubble attached to the avatar, its operation information is supplied to the management unit 152 through the acceptance unit 151 from the input instruction unit 251. The management unit 152, which receives the operation information, totals the number of responses by other users for each form to a latest post with reference to the reaction table, and notifies the setting unit 258 of the terminal device 20 of information of a value totaled for each form. The setting unit 258 selects motion information and a pattern image according to a form of a response determined with the totaled value, and sets the selected motion information and the selected pattern image to an avatar corresponding to the main person, and notifies the drawing unit 252 of contents of setting. The drawing unit 252 draws the avatar and the surrounding area of the avatar according to the contents of setting.

Figure 51:
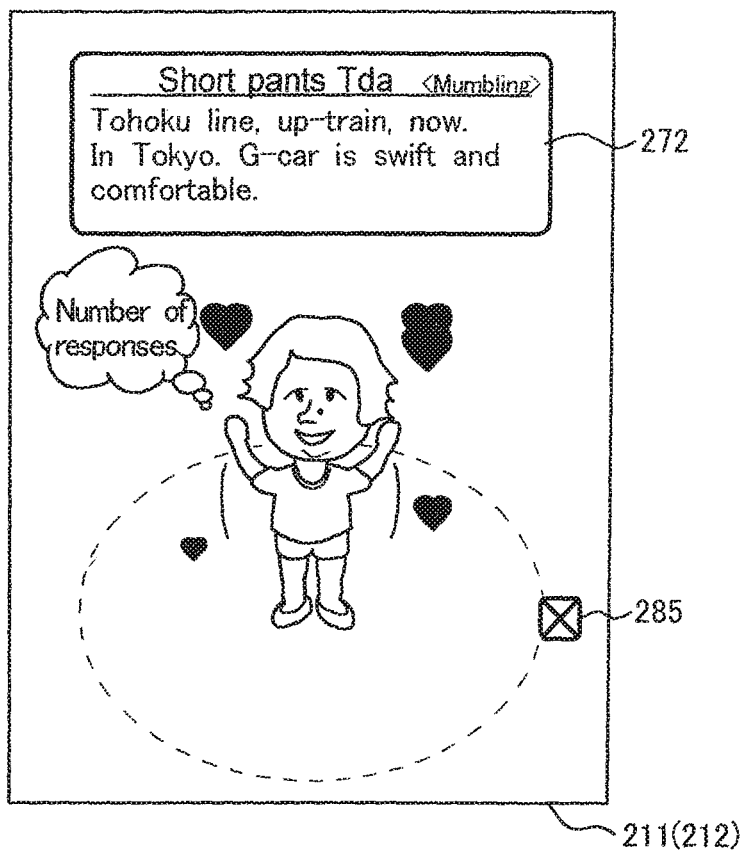
FIG. 51 is a drawing showing an example of a screen displaying an avatar.
Figure 52:
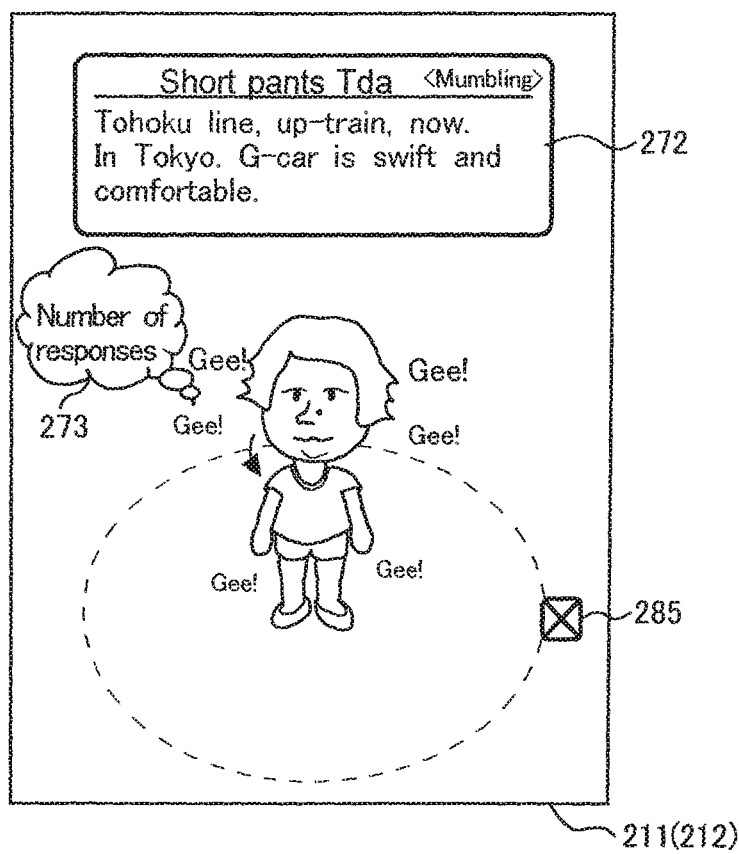
FIG. 52 is a drawing showing an example of a screen displaying an avatar.
Figure 53:
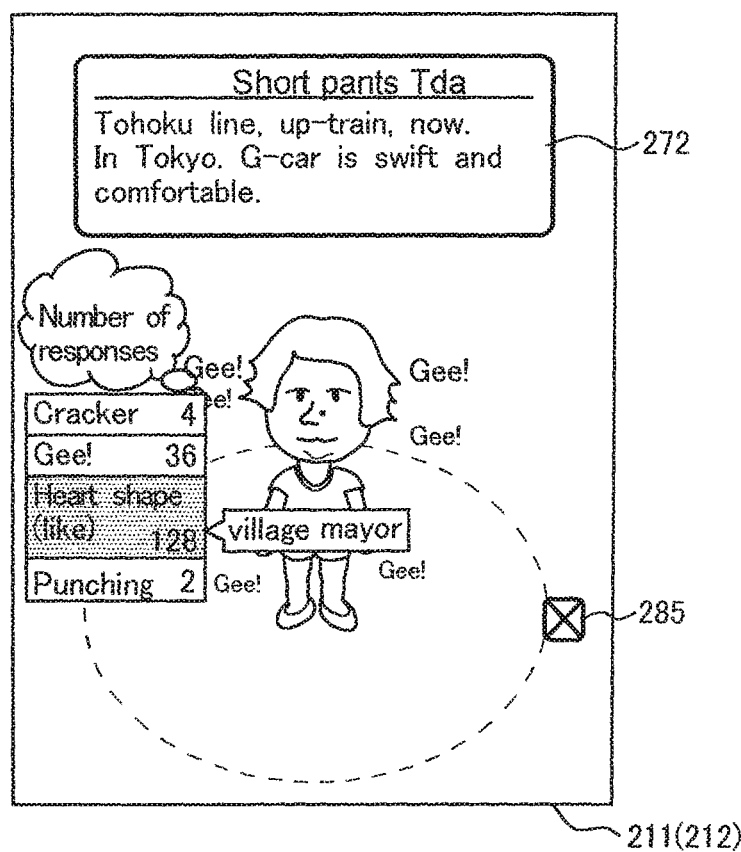
FIG. 53 is a drawing showing an example of a screen displaying an avatar.

As a result, for example, a screen as shown in FIG. 51 is displayed. In the screen shown in the drawing, the avatar corresponding to the main person performs a motion according to a form of a response to the post of the main person, and a pattern image corresponding to the form is displayed with an animation. In this example, heart shapes appear, so that it is possible to recognize at a glance that a response called "like (heart)" to the post of the main person is provided. Furthermore, a motion of "pleasure" (refer to FIG. 36A) in response to "like (heart)" is provided to the avatar corresponding to the main person. Note that, in the frame 272, a sentence according to the latest post of the main person is displayed, so that it is possible to confirm the post that is a basis of the motion of the avatar and the displayed pattern image. Furthermore, upon displaying a screen as shown in FIG. 52, for example, the word of "Gee!" appears, so that it is possible to recognize that a response of "Gee!" to the post of the main person is provided. Furthermore, for example, a motion in which the avatar nods its head twice is provided to the avatar corresponding to the main person in response to "Gee!". When there are multiple responses to a post of the main person, it may be configured so that the setting unit 258 selects one motion information corresponding to a form for which a totaled value is maximum in the reaction table and selects a pattern image corresponding to the form, and the drawing unit 252 draws a screen according to the selection. In this case, the setting unit 258 may select motion information and pattern information corresponding to each form in a descending order of totaled values in the reaction table and set the selected motion information and the selected pattern information to the avatar of the main person. For example, when the descending order of the number of responses to the post of the main person is "like" (heart) and then "Gee!", a screen shown in FIG. 51 changes to an image shown in FIG. 52. The order of motions and pattern images may be random without being limited to a descending order of totaled values for each form of responses. Note that when a speech bubble 273 indicating "the number of responses" is tapped in a screen of FIG. 52, details (a form, a total value, a name of a partner) of the reaction are displayed as shown in FIG. 53. For example, "a name of a partner" is a name of a user who provides a "response" to the post most quickly.

In the fourth function, a response can be provided by performing a tapping to an icon or a touching operation to an avatar corresponding to a friend with respect to the post of the friend. At this time, the avatar corresponding to the friend performs a motion according to contents of the response, and a pattern image is displayed with an animation around the avatar. When another user provides a response to a post of the main person, the avatar corresponding to the main person performs a motion according to a form of the response by the other user or a pattern image is displayed with an animation around the avatar.

In a screen of FIG. 48, FIG. 49 or FIG. 50, when a touching operation to a speech bubble 271 indicating "history" is performed, a history of a post by a friend corresponding to the avatar and a response associated with the post is displayed in order of time.

Figure 54:
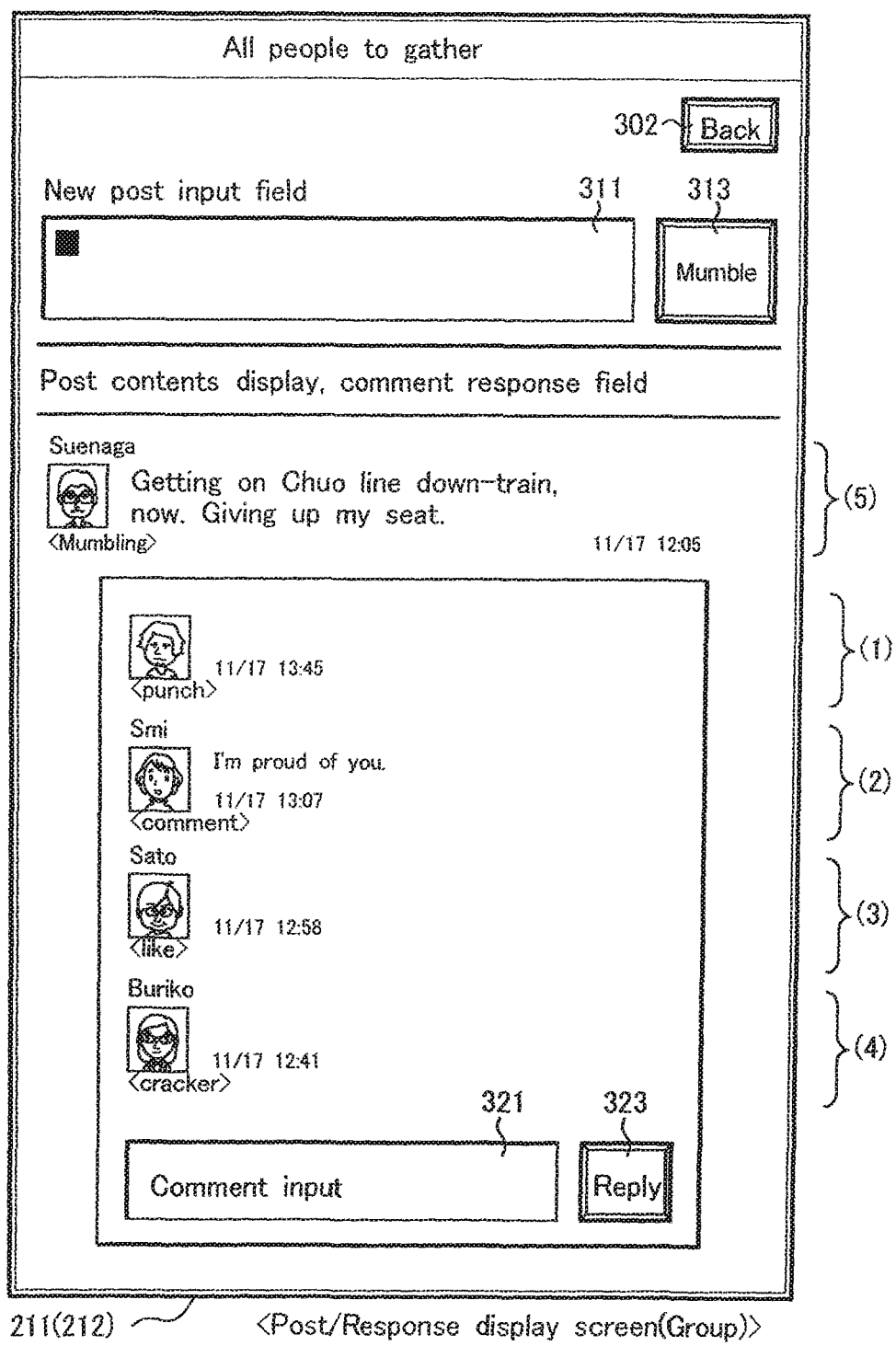
FIG. 54 is a drawing showing an example of a screen based on a post and a response.

FIG. 54 is a drawing indicating an example of a screen based on a post-response history displayed by the touching operation and is approximately similar to the screen shown in FIG. 40, basically. However, in the screen of FIG. 40, a post by a member of a selected group and responses associated with the post are displayed in order of time, whereas in the screen shown in FIG. 54, a post by a selected friend (the friend b in this example) among the members of the group and a response associated with the post are displayed in order of time. Furthermore, the screen shown in FIG. 54 is an example in which "cracker" and "like" by an icon operation, and "punch" by an operation to an avatar are added to "comment" as "response".

As described above, in providing a service by the fourth function, the message-browsing system 1 provides a browsing service of messages exchanged by a post having any form among multiple forms and a response to the post. The message-browsing system 1 includes the image storage unit 261 storing user images (avatars, for example), which are displayed on a display screen, corresponding to multiple users, respectively, the input instruction unit 251 performing a response in one of multiple response forms corresponding to multiple fixed response sentences which are different from each other, respectively, to the post, and the motion storage unit 263 storing motion information defining motions of user images associated with a corresponding one of the multiple response forms. The message-browsing system 1 includes the setting unit 258 selecting motion information corresponding to a response form in which a response is provided to a post, and setting a motion of a user image, which corresponds to a user who has contributed the post, the user image being displayed on a screen of a user providing the response based on the selected motion information. When a user provides a response to an earlier post by another user, a motion corresponding to the response form is set to a user image corresponding to the other user (contributor) who has contributed the earlier post. Therefore, for a user (responder) providing a response from among multiple users constituting a group, it is possible to express feelings of the user (responder) himself in a motion of a user image corresponding to a user (contributor) who has contributed an earlier post, so that this enables the user (responder) receiving the service to be interested in the service.

In the fourth function, the following various applications and modification are possible.

In the fourth function, as in the case of applications and modifications of the third function, a configuration in which a concept of "responses" is removed so that only "posts" are used is possible. Because motion information and pattern information correspond to a form of a response in the fourth function, when a concept called a "response" is removed, the motion information and the pattern information are made to correspond to a form of "posts". In this configuration, a response to a certain "post" is provided using the "post" form by performing an operation (twirling, punching, etc.) to a selected avatar or performing an operation to any one of the icons 281 to 284 corresponding to the respective fixed sentences in a display screen (refer to FIG. 48, etc.) of the avatar. Therefore, in this configuration, a message is exchanged between the main person and a friend of the avatar on a one-to-one basis. Note that various forms such as "mumbling", "diary", "photo", and "check-in" can be used as "post" in this configuration.

Figure 55:
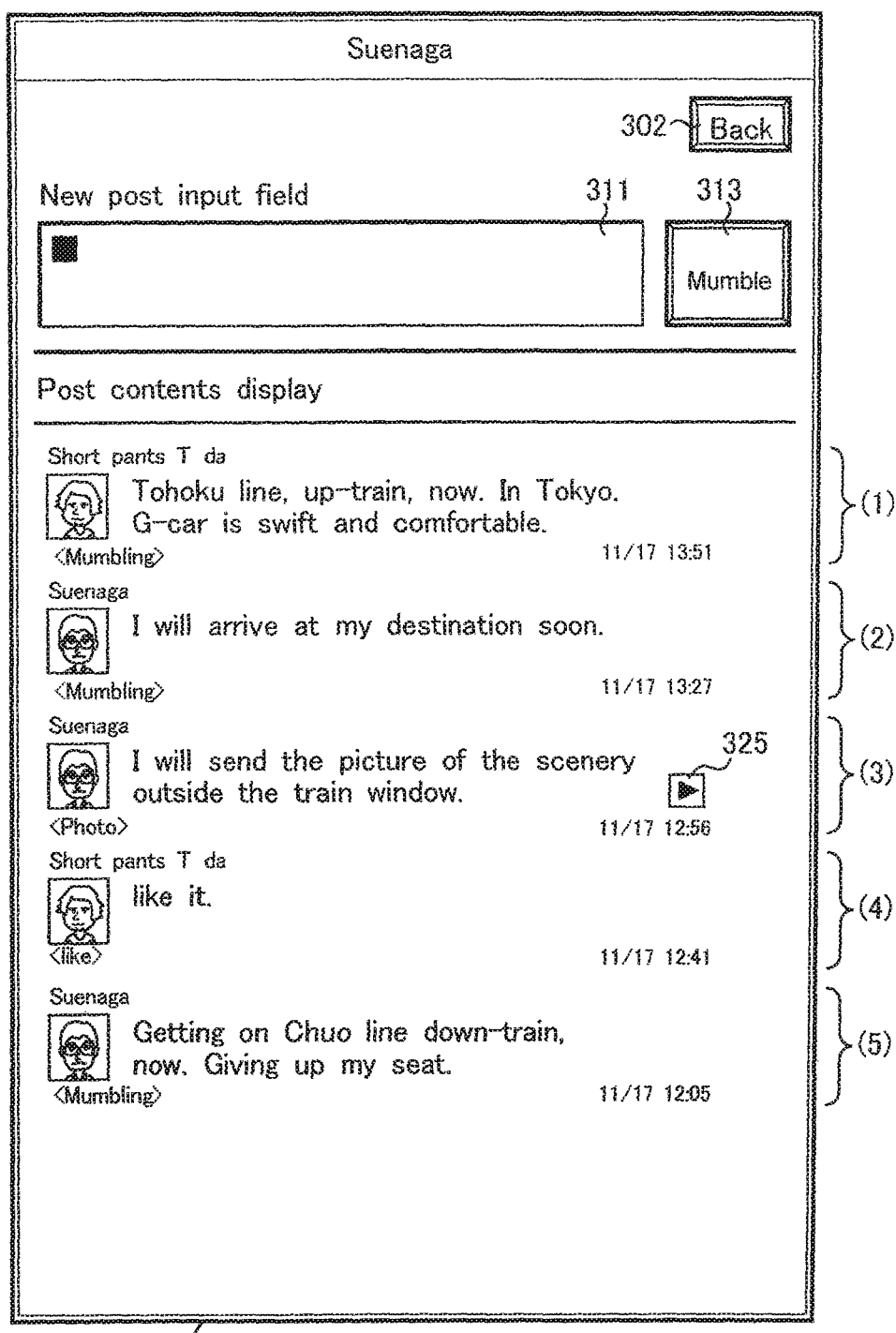
FIG. 55 is a drawing showing an example of a screen based on a post.

FIG. 55 is a drawing showing an example of a screen based on a history including only "posts". This screen is an example when a message is exchanged between the main person named "Short pants T da" and a friend b named "Suenaga" in "Group A", and an example in which the main person performs a touching operation to the speech bubble 271 indicating "history" in a screen of FIG. 49 or FIG. 50 in a case in which a history includes only "posts".

A screen shown in FIG. 55 is approximately the same as the screen shown in FIG. 41, basically. However, in the screen of FIG. 41, posts by all members (including the main person) of a selected group are displayed in order of time, whereas in the screen shown in FIG. 55, posts by two users corresponding to the main person and a selected friend among members of the group are displayed in order of time. Note that, the screen shown in FIG. 55 is an example in which "like" by an icon operation as a post is added to post forms of "mumbling" and "photo".

Upon providing a service without "responses" in fourth function, the message-browsing system 1 provides a browsing service of messages contributed as posts between two users (a main person and another user), for example, like a chat conducted on a one-to-one basis. That is, the message-browsing system 1 includes the image storage unit 261 storing user images (e.g., avatars) of users, which are displayed on a display screen, the input instruction unit 251 contributing posts in one of the multiple post forms corresponding to the respective multiple fixed sentences which are different from each other, and the motion storage unit 263 storing motion information defining motions of user images associated with the respective multiple post forms. The message-browsing system 1 includes the setting unit 258 selecting motion information corresponding to a post form in which a post is contributed, and setting, based on the selected motion information, a motion of a user image of a correspondent user, to whom the post is contributed, the user image being displayed on a screen of a user who has contributed the post. As a result, when a user (first user) contributes a post in response to an earlier post by another user (second user), a motion corresponding to a form of the post contributed by the second user is set to a user image corresponding to the second user (contributor) who has contributed the earlier post. Therefore, for the first user (contributor) contributing a post among multiple users constituting a group, it is possible to express feelings of the second user regarding his/own post in a motion of a user image corresponding to the second user who has contributed the earlier post, so that this enables the first user receiving the service to be interested in the service.

Figure 56:
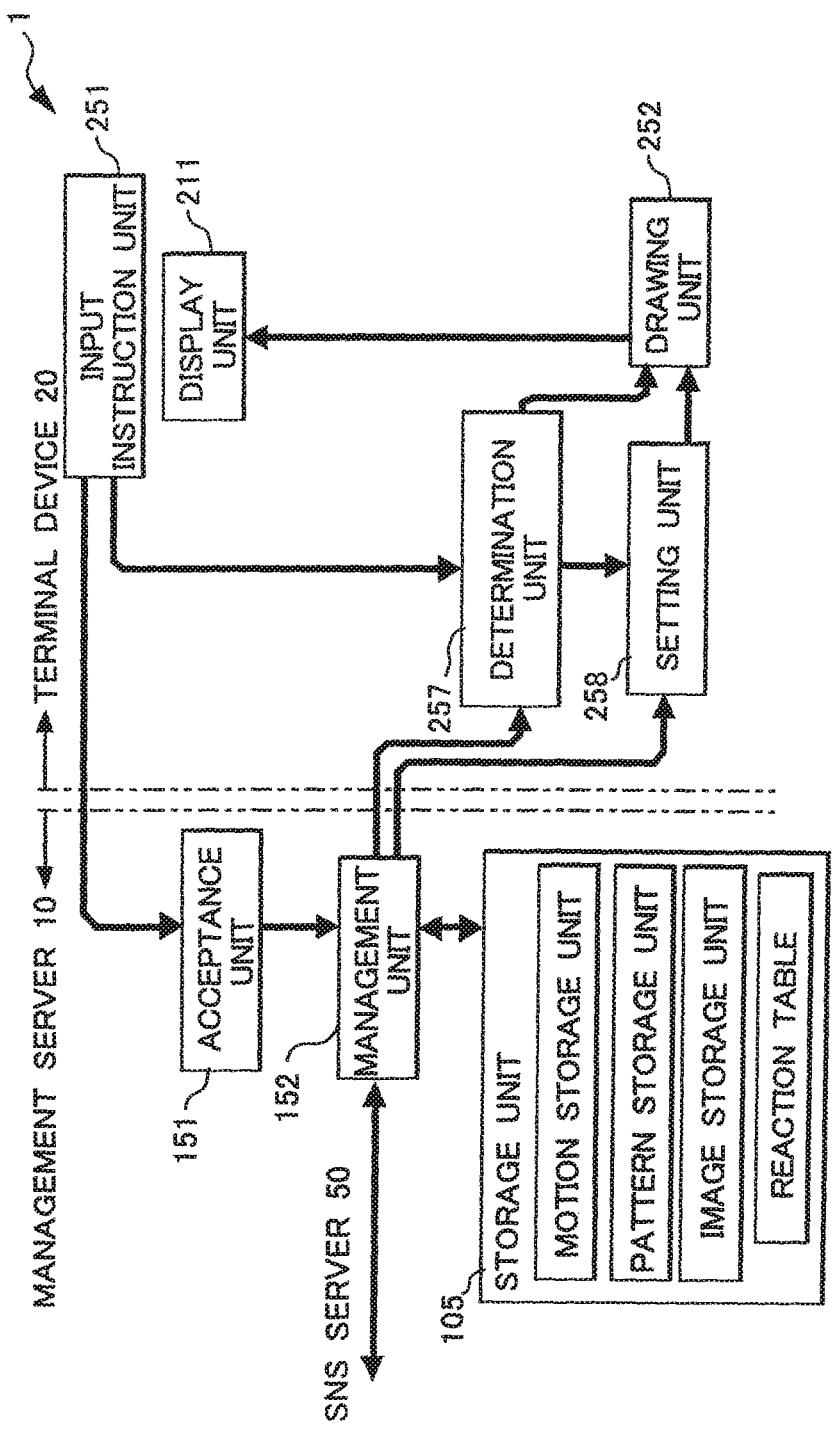
FIG. 56 is a drawing showing another function block when processing according to a touch operation, etc., is performed.

In FIG. 44, a configuration in which the drawing unit 252, the determination unit 257 and the setting unit 258 is provided in the terminal device 20 is exemplified, whereas a configuration in which they are provided in the management server 10 as shown in FIG. 56 may be adopted. In the configuration, for example, a screen to be displayed on the display unit 211 is generated in the management server 10, so that the screen is transmitted to the terminal device 20 as a web screen. Then, the terminal device 20 displays the web screen by a browser. In the configuration, the motion storage unit and the keyword storage unit are achieved by the storage unit 105 of the management server 10. Furthermore, in the configuration, the determination unit 257 of the management server 10 accesses the keyword storage unit through the management unit 152, and the setting unit 258 accesses the motion storage unit similarly through the management unit 152. Note that, in this configuration, the RTC 106 of the management server 10 is used for acquisition of the time information. According to this configuration, a load in the terminal device 20 can be reduced because setting of the motion information and drawing processing of avatars are unnecessary for the terminal device 20.

Furthermore, in FIG. 44, the image storage unit 261 and the motion storage unit 263 are built in the terminal device 20, but if these storage units can be accessed from the management server 10 and the terminal device 20 in the message-browsing system 1, they may be built in an external server other than the management server 10 and the terminal device 20. Upon providing a service of the fourth function, when the image storage unit is built in the terminal device 20 as shown in FIG. 44, the drawing unit 252 functions as the image reference unit, whereas if the image storage unit is built in the management server 10 as shown in FIG. 56, the management unit 152 functions as the image reference unit. Note that although it is not particularly illustrated, when the image storage unit is built in the external server, any of the drawing unit 252, the management unit 152 and an extra function block function as the image reference unit. Similarly, as shown in FIG. 44, if the motion storage unit is built in the terminal device 20, the setting unit 258 functions as the motion reference unit, whereas if the motion storage unit is built in the management server 10 as shown in FIG. 56, the management unit 152 functions as the motion reference unit. Note that although it is not particularly illustrated, when the motion storage unit is built in the external server, any of the setting unit 258, the management unit 152 and the extra function block functions as the motion reference unit.

Thus, it may be freely decided whether or not each function block is built in the management server 10 or in the terminal device 20. Furthermore, if a display from the first function to the fourth function is finally displayed on the display unit 211 of the terminal device 20 which the main person operates, it does not matter whether or not each function block is built in the management server 10 or in the terminal device 20.

Note that because the service from the first function to the fourth function is provided to a user with a display screen of the display unit 211 mainly by the drawing unit 252, the drawing unit 252 and the display unit 211 function as a service providing unit.

In the embodiment, although it is explained that a subset of users among members registered in the SNS in the SNS server 50 receive services from the first function to the fourth function, the present invention is not limited to the embodiment. For example, it may be configured so that a browsing service of posts and responses are provided to a user who have completed a predetermined procedure among registered members in the SNS, so that any or all of services from the second function to the fourth function according to the posts and the responses are provided as the second service, whereas a service of the first function, namely, a service relating to registration, editing, and a display of a group is provided in a place to communicate and interact between the registered members in the SNS. In such a configuration, a large number of groups are formed in the SNS, and a browsing service of messages is provided between multiple users who have completed a predetermined procedure among members constituting a group. At this time, it is a user who has completed the predetermined procedure who can browse messages among the members constituting the group regardless of the intention of the main person. Therefore, a situation may occur in which too many avatars corresponding to users need to be displayed in an arrangement according to posts and responses in the terminal device. Thus, in such a configuration, the assigning unit 254 may select users satisfying a predetermined selection condition among multiple users who can browse messages and are members of a group, for example, nine users, as specific users together with the main person in step Sb13, so that avatars of the specific users may be arranged according to posts or responses. Note that an example of the predetermined selection condition includes one in which a user is within the top nine users having a latest contributed post and a latest provided response among multiple users, or one in which a user is within the top nine users having large numbers of posts and responses. When such a selection condition is introduced, for example, avatars, except for the one for the main person, will change according to an occasional situation. Furthermore, another example of the predetermined selection condition includes that a user is one who the main person selects in advance.

THE INVENTIONS UNDERSTOOD FROM THE EMBODIMENT AND THE VARIATIONS

The following inventions are understood from the above-described embodiment and variations.

To provide a technique to easily grasp relationships between the other users in the post and the response, in one aspect, a message-browsing system of the present invention is for providing a browsing service of messages exchanged through a post and a response to the post among multiple users. The message-browsing system is provided with: an assigning unit that assigns user images corresponding to multiple specific users, who are a subset or all of the multiple users, to respective ones of a number of reference positions that is equal to the number of the user images on a screen, in accordance with a predetermined rule; a position determining unit that determines the reference positions assigned to the user images corresponding to the multiple specific users as display positions displaying the respective user images; and a position changing unit that changes a display position of a user image corresponding to one of the multiple specific users responding to a post, which another user of the multiple specific users has contributed, to a position close to a display position of a user image corresponding to the other user who has contributed the post.

In a preferred embodiment of the message-browsing system, the assigning unit may select the subset of the multiple users that satisfy a predetermined selection condition as the multiple specific users.

In a preferred embodiment of the message-browsing system, the position determining unit may determine as each display position displaying respective ones of the user images corresponding to the multiple specific users, within a predetermined range including a corresponding reference position assigned to each user image and the position changing unit may change the display position of the user image corresponding to the other user who has contributed the post to a position beyond the predetermined range.

In a preferred embodiment, the message-browsing system may include a management unit that manages a storage unit that stores intimacy levels among the multiple users in association with respective pairs of a user being a reference and a user being a target, updates an intimacy level that is stored in the storage unit so that the intimacy level is higher if a first condition occurs, and updates the intimacy level that is stored in the storage unit so that the intimacy level is lower if a second condition occurs. The position determining unit may determine, for each of the multiple specific users, a display position of each specific user on the basis of the intimacy level between each specific user and another user.

In the message-browsing system, the position determining unit may preferably determine the display positions so that, as the intimacy level between one user and another user is higher in the predetermined range corresponding to the one user, a distance between a user image corresponding to the one user and a user image corresponding to the other user is shortened.

In a preferred embodiment of the message-browsing system, the first condition may be that a user being a reference of one of the pairs contributes a response to a post of a user being a target of the same pair, and the management unit may update the intimacy level between the user being the reference and the user being the target so that the intimacy level is higher.

In a preferred embodiment of the message-browsing system, the second condition may be that a predetermined time has elapsed, and the management unit may update the intimacy levels among the multiple users so that the intimacy levels are lowered by the same amount.

In a preferred embodiment of the message-browsing system, the multiple users may include a main person receiving the browsing service and one or more friends having a predetermined relationship with the main person, and the assigning unit may assign one or more reference positions of one or more user images corresponding to the respective one or more friends so that the reference positions are radially arranged around the reference position corresponding to the main person.

In the message-browsing system, in the predetermined rule, correspondence of each of the user images corresponding to the multiple specific users with each of the multiple reference positions may preferably be fixed with respect to time elapsed.

In the message-browsing system, in the predetermined rule, correspondence of each of the user images corresponding to the multiple specific users with each of the multiple reference positions may preferably be changed in an order of update dates of posts by the multiple users.

In the message-browsing system, each of the update dates may preferably be a date and time when each of the posts was contributed. In the message-browsing system, each of the update dates may preferably be a latest date and time among dates and times when the posts were contributed or responses to the posts were contributed.

In the message-browsing system, in the predetermined rule, an update date that is before a predetermined period of time from a current time may be excluded from the update dates of the posts by the multiple users. In the message-browsing system, the position determining unit or the position changing unit may preferably determine or change the display positions of the respective user images corresponding to the multiple specific users in correspondence with grids set on the screen.

To provide a technique to easily grasp relationships between the other users in the post and the response, in another aspect, the server in a message-browsing system of the present invention is for providing a browsing service of messages exchanged through a post and a response to the post among multiple users at a terminal device. The server is provided with: an assigning unit that assigns user images corresponding to multiple specific users, who are a subset or all of the multiple users, to respective ones of a number of reference positions that is equal to the number of the user images on a screen in accordance with a predetermined rule; a position determining unit that determines the reference positions assigned to the user images corresponding to the multiple specific users as display positions displaying the respective user images; and a position changing unit that changes a display position of a user image corresponding to one of the multiple specific users responding to a post, which another user of the multiple specific users has contributed, to a position close to a display position of a user image corresponding to the other user who has contributed the post.

To provide a technique to easily grasp relationships between the other users in the post and the response, in still another aspect, the control method controls a server in a message-browsing system for providing a browsing service of messages exchanged through a post and a response to the post among multiple users at a terminal device. The control method is provided with: assigning user images corresponding to multiple specific users, who are a subset or all of the multiple users, to respective ones of a number of reference positions that is equal to the number of the user images on a screen in accordance with a predetermined rule; determining the reference positions assigned to the user images corresponding to the multiple specific users as display positions displaying the respective user images; and changing a display position of a user image corresponding to one of the multiple specific users responding to a post, which another user of the multiple specific users has contributed, to a position close to a display position of a user image corresponding to the other user who has contributed the post.

To provide a technique to easily grasp relationships between the other users in the post and the response, in still yet another aspect, a non-transitory computer readable recording medium of the present invention with a program stored thereon is provided. The program causes a computer, which provides a browsing service of exchanged through a post and a response to the post among multiple users at a terminal device, to function as: an assigning unit that assigns user images corresponding to multiple specific users, who are a subset or all of the multiple users, respective ones of a number of to reference positions that is equal to the number of the user images on a screen in accordance with a predetermined rule; a position determining unit that determines the reference positions assigned to the user images corresponding to the multiple specific users as display positions displaying the respective images; and a position changing unit that changes a display position of a user image corresponding to one of the multiple specific users responding to a post, which another user of the multiple specific users has contributed, to a position close to a display position of a user image corresponding to the other one who has contributed the post.

REFERENCE SYMBOLS

1: Message-Browsing System
10: Management Server
20: Terminal device
101: CPU
152: Management unit
201: CPU
211: Display Unit
254: Assigning Unit
255: Position Determining Unit
256: Position Changing Unit
257: Determination unit
258: Setting Unit

The invention claimed is:
1. A message-browsing system for providing a browsing service of messages exchanged through a post and a response to the post among multiple users, the message-browsing system comprising:
   a processor configured to execute:
      an assigning unit that assigns user images corresponding to multiple specific users, who are a subset or all of the multiple users, to respective ones of a number of reference positions that is equal to a number of the user images on a screen, in accordance with a predetermined rule;
      a position determining unit that determines the reference positions assigned to the user images corresponding to the multiple specific users as display positions displaying the respective user images; and
      a position changing unit that changes a display position of a user image corresponding to one of the multiple specific users responding to a post, which another user of the multiple specific users has contributed, to a position close to a display position of a user image corresponding to the other user who has contributed the post,
   wherein the multiple users include a main person who receives the browsing service, the multiple users constitute a group, and the messages are exchanged among the multiple users in the group,
   wherein,
      the assigning unit assigns the user images corresponding to the multiple specific users including the main person, to the respective ones of the reference positions of the number equal to the number of the user images, the reference positions being on a screen of a terminal device that is operated by the main person,
      the position determining unit determines each display position displaying a corresponding one of the user images to be within a predetermined range including a corresponding reference position assigned to each user image, and
      the assigning unit assigns reference positions of user images corresponding to the specific users other than the main person, so that all the reference positions are radially arranged around the reference position corresponding to the main person at a circumference having a fixed distance from the reference position corresponding to the main person.

2. The message-browsing system according to claim 1, wherein
   the assigning unit selects the subset of the multiple users that satisfy a predetermined selection condition as the multiple specific users.

3. The message-browsing system according to claim 1, wherein
   the position determining unit determines each display position displaying respective ones of the user images corresponding to the multiple specific users, within a predetermined range on the circumference including a corresponding reference position assigned to each user image; and
   the position changing unit changes the display position of the user image corresponding to the other user who has contributed the post to a position beyond the predetermined range.

4. The message-browsing system according to claim 3, wherein the predetermined range is an area surrounding the reference position,
   wherein said one of the multiple specific users responding to the post is a first user, and the other user of the multiple specific users who has contributed to the post is a second user, and
   wherein the processor is further configured to determine whether the first user responds to the post of the second user, and in response to determining that the first user responds to the post of the second user, the position changing unit changes a distance between the user image of the first user and the user image of the second user to be closer than a previous distance between the user image of the first user and the user image of the second user by moving at least one of the user image of the first user or the user image of the second user to be outside the respective predetermined range.

5. The message-browsing system according to claim 1, t wherein the processor is further configured to execute:
   a management unit that manages a storage unit that stores intimacy levels among the multiple users in association with respective pairs of a user being a reference and a user being a target, updates an intimacy level that is stored in the storage unit so that the intimacy level is higher if a first condition occurs, and updates an intimacy level that is stored in the storage unit so that the intimacy level is lower if a second condition occurs,
   wherein the position determining unit determines, for each of the multiple specific users, a display position of each specific user on the circumference based on an intimacy level between each specific user and another user.

6. The message-browsing system according to claim 5, wherein
   the position determining unit determines the display positions so that, as the intimacy level between one user and the other user is higher in a predetermined range corresponding to the one user, a distance on the circumference between a user image corresponding to the one user and a user image corresponding to the other user is shortened.

7. The message-browsing system according to claim 5, wherein
the first condition is that a user being the reference of one of the pairs contributes a response to a post of a user being the target of the same pair, and
the management unit updates the intimacy level between the user being the reference and the user being the target so that the intimacy level is higher.

8. The message-browsing system according to claim 5, wherein
the second condition is that a predetermined time has elapsed, and
the management unit updates the intimacy levels among the multiple users so that the intimacy levels are lowered by the same amount.

9. The message-browsing system according to claim 1, wherein
the multiple users comprise a main person receiving the browsing service and one or more friends having a predetermined relationship with the main person, and
the assigning unit assigns one or more reference positions of one or more user images corresponding to the respective one or more friends so that the reference positions are radially arranged around the reference position corresponding to the main person.

10. The message-browsing system according to claim 1, wherein
in the predetermined rule, correspondence of each of the user images corresponding to the multiple specific users with each of the multiple reference positions is fixed with respect to time elapsed.

11. The message-browsing system according to claim 1, wherein
in the predetermined rule, correspondence of each of the user images corresponding to the multiple specific users with each of the multiple reference positions is changed in an order of update dates of posts by the multiple users.

12. The message-browsing system according to claim 11, wherein
each of the update dates is a date and time when each of the posts was contributed.

13. The message-browsing system according to claim 11, wherein
each of the update dates is a latest date and time among dates and times when the posts were contributed or each of responses to the posts was contributed.

14. The message-browsing system according to claim 1, wherein
in the predetermined rule, an update date that is before a predetermined period of time from a current time is excluded from the update dates of the posts by the multiple users.

15. The message-browsing system according to claim 1, wherein
the position determining unit or the position changing unit determines or changes the display positions of the respective user images corresponding to the multiple specific users, in correspondence with grids set on the screen.

16. The message-browsing system according to claim 1, wherein said one of the multiple specific users responding to the post is a first user, and the other user of the multiple specific users who has contributed to the post is a second user, and
wherein the processor is further configured to determine whether the first user responds to the post of the second user, and in response to determining that the first user responds to the post of the second user, the position changing unit changes a distance between the user image of the first user and the user image of the second user to be closer than a previous distance between the user image of the first user and the user image of the second user.

17. The message-browsing system according to claim 1, wherein the position changing unit reduces a distance on the circumference between the display position of the user image corresponding to the one of the multiple specific users responding to the post and the display position of the user image corresponding to the other user who has contributed the post.

18. A server in a message-browsing system for providing a browsing service of messages exchanged through a post and a response to the post among multiple users at a terminal device, the server comprising:
a processor configured to execute:
an assigning unit that assigns user images corresponding to multiple specific users, who are a subset or all of the multiple users, to respective ones of a number of reference positions that is equal to the number of the user images on a screen in accordance with a predetermined rule;
a position determining unit that determines the reference positions assigned to the user images corresponding to the multiple specific users as display positions displaying the respective user images; and
a position changing unit that changes a display position of a user image corresponding to one of the multiple specific users responding to a post, which another user of the multiple specific users has contributed, to a position close to a display position of a user image corresponding to the other user who has contributed the post,
wherein the multiple users include a main person who receives the browsing service, the multiple users constitute a group, and the messages are exchanged among the multiple users in the group,
wherein,
the assigning unit assigns the user images corresponding to the multiple specific users including the main person, to the respective ones of the reference positions of the number equal to the number of the user images, the reference positions being on a screen of a terminal device that is operated by the main person,
the position determining unit determines each display position displaying a corresponding one of the user images to be within a predetermined range including a corresponding reference position assigned to each user image, and
the assigning unit assigns reference positions of user images corresponding to the specific users other than the main person, so that all the reference positions are radially arranged around the reference position corresponding to the main person at a circumference having a fixed distance from the reference position corresponding to the main person.

19. A control method for controlling a server in a message-browsing system for providing a browsing service of messages exchanged through a post and a response to the post among multiple users at a terminal device, the control method comprising:

assigning user images corresponding to multiple specific users, who are a subset or all of the multiple users, to respective ones of a number of reference positions that is equal to the number of the user images on a screen, in accordance with a predetermined rule;

determining the reference positions assigned to the user images corresponding to the multiple specific users as display positions displaying the respective user images; and changing a display position of a user image corresponding to one of the multiple specific users responding to a post, which another user of the multiple specific users has contributed, to a position close to a display position of a user image corresponding to the other user who has contributed the post, wherein the multiple users include a main person who receives the browsing service, the multiple users constitute a group, and the messages are exchanged among the multiple users in the group, wherein, the assigning assigns the user images corresponding to the multiple specific users including the main person, to the respective ones of the reference positions of the number equal to the number of the user images, the reference positions being on a screen of a terminal device that is operated by the main person, the determining determines each display position displaying a corresponding one of the user images to be within a predetermined range including a corresponding reference position assigned to each user image, and the assigning assigns reference positions of user images corresponding to the specific users other than the main person, so that all the reference positions are radially arranged around the reference position corresponding to the main person at a circumference having a fixed distance from the reference position corresponding to the main person.

20. A non-transitory computer readable recording medium with a program stored there-on, the program causing a computer, which provides a browsing service of messages exchanged through a post and a response to the post among multiple users at a terminal device, to function as:

an assigning unit that assigns user images corresponding to multiple specific users, who are a subset or all of the multiple users, to respective ones of a number of reference positions that is equal to the number of the user images on a screen, in accordance with a predetermined rule;

a position determining unit that determines the reference positions assigned to the user images corresponding to the multiple specific users as display positions displaying the respective user images; and a position changing unit that changes a display position of a user image corresponding to one of the multiple specific users responding to a post, which another user of the multiple specific users has contributed, to a position close to a display position of a user image corresponding to the other one who has contributed the post, wherein the multiple users include a main person who receives the browsing service, the multiple users constitute a group, and the messages are exchanged among the multiple users in the group, wherein, the assigning unit assigns the user images corresponding to the multiple specific users including the main person, to the respective ones of the reference positions of the number equal to the number of the user images, the reference positions being on a screen of a terminal device that is operated by the main person, the position determining unit determines each display position displaying a corresponding one of the user images to be within a predetermined range including a corresponding reference position assigned to each user image, and the assigning unit assigns reference positions of user images corresponding to the specific users other than the main person, so that all the reference positions are radially arranged around the reference position corresponding to the main person at a circumference having a fixed distance from the reference position corresponding to the main person.

* * * * *